United States Patent [19]
Uraki et al.

[11] Patent Number: 5,977,515
[45] Date of Patent: *Nov. 2, 1999

[54] UNDERWATER LASER PROCESSING DEVICE INCLUDING CHAMBER WITH PARTITIONING WALL

[75] Inventors: Keiichi Uraki, Hitachi; Toshitaka Satsuta, Atsugi; Akira Onuma, Hitachi; Mitsuo Nakamura, Takahagi; Tsutomu Onuma, Hitachi; Toshimi Matsumoto, Tokyo; Yasumasa Tamai, Hitachi; Hiroshi Yamauchi, Hitachi; Eisaku Hayashi, Hitachi; Ren Morinaka, Hitachi, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/539,074

[22] Filed: Oct. 4, 1995

[30] Foreign Application Priority Data

Oct. 5, 1994 [JP] Japan ................................ 6-241002

[51] Int. Cl.⁶ .................................................. B23K 26/12
[52] U.S. Cl. ................................ 219/121.84; 219/121.6; 219/121.86
[58] Field of Search ............................ 219/121.6, 121.63, 219/121.65, 121.67, 121.75, 121.78, 121.79, 121.8, 121.84, 121.86

[56] References Cited

U.S. PATENT DOCUMENTS

| | | | |
|---|---|---|---|
| 3,392,259 | 7/1968 | Meier | 219/121.6 |
| 4,151,393 | 4/1979 | Fenneman et al. | 219/121.6 |
| 4,237,364 | 12/1980 | Lemelson | 219/121.63 |
| 4,491,717 | 1/1985 | Geffroy et al. | 219/121.67 |
| 4,710,604 | 12/1987 | Shirasu et al. | 219/121.78 |
| 5,601,735 | 2/1997 | Kawamoto et al. | 219/121.63 |

FOREIGN PATENT DOCUMENTS

| | | | |
|---|---|---|---|
| 2536573 | 2/1977 | Germany . | |
| 60-223694 | 11/1985 | Japan | 219/121.73 |
| 63-215392 | 9/1988 | Japan . | |
| 63-242483 | 10/1988 | Japan . | |
| 3-110093 | 5/1991 | Japan . | |
| 4-249799 | 9/1992 | Japan . | |
| 4-339587 | 11/1992 | Japan | 219/121.6 |
| 5-31591 | 2/1993 | Japan . | |
| 6-31479 | 2/1994 | Japan | 219/121.6 |
| 6-269975 | 9/1994 | Japan | 219/121.6 |

Primary Examiner—Gregory Mills
Attorney, Agent, or Firm—Antonelli, Terry, Stout & Kraus, LLP

[57] ABSTRACT

An underwater laser processing system has a laser torch; a laser torch driving mechanism for changing a laser emission position of the laser torch; and a chamber with one end opened to an external environment, which contains the laser torch; wherein a partitioning wall for preventing permeation of water is provided between a free end of the chamber and the laser torch. The system is used for detecting a sensitized portion and repairing it at one time using a sensitization detecting arrangement. Moreover, it is used for forming an alloying layer by melting a sprayed coating film, and for forming a new surface layer by emitting a laser beam through a solution containing a metal component.

16 Claims, 24 Drawing Sheets

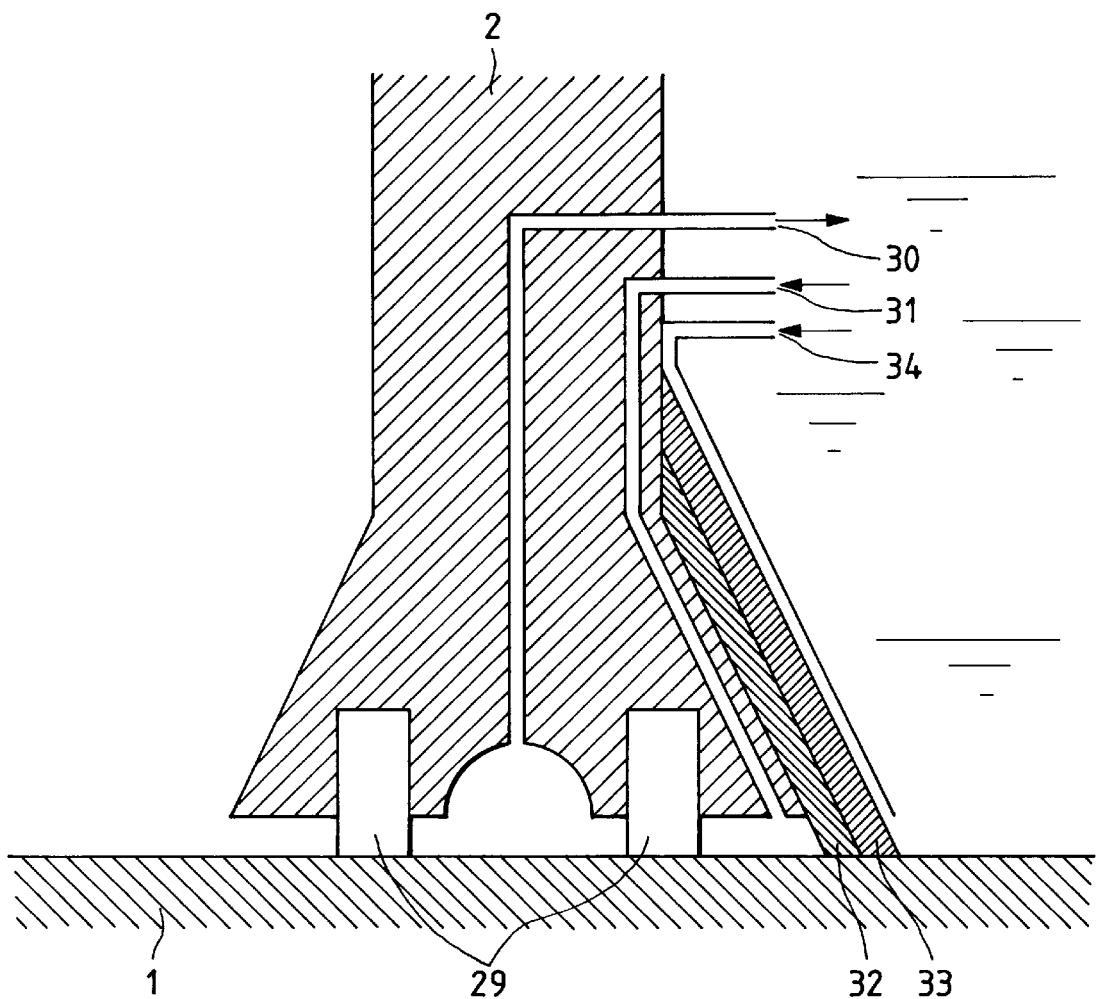

UNDERWATER LASER PROCESSING DEVICE INCLUDING CHAMBER WITH PARTITIONING WALL

BACKGROUND OF THE INVENTION

The present invention relates to a laser processing system used for performing surface treatment or welding of an underwater structure and a method using the system, and particularly to a laser processing system used for repairing a structure in a pressure vessel of a nuclear reactor in a state in which the structure is disposed in water, and a method using the system.

The interior of a nuclear reactor which has operated for a long period of time is high in the dose equivalent of γ-rays, and accordingly, upon thermal repairing of a structure in a nuclear reactor, the apparatus and the operators must be prevented from being exposed to γ-rays. For this reason, the repairing operation should be performed in a state in which the structure is disposed in water capable of shielding γ-rays. Namely, it is desirable to perform the surface reforming and welding for a structure in a pressure vessel of a nuclear reactor in water. Even for bridges and ships, an effective technique for repairing a structure in water has come to be in high demand.

With respect to thermal processing, such as welding or surface treatment applied to an underwater structure, a wet-type thermal processing without removal of the water near a target portion is now in reliability because the target portion tends to generate defects, such as blow-holes, and thereby the quality is deteriorated. In particular, the repairing of a structure in a nuclear reactor by welding or surface treatment must be performed at a high reliability, and thereby a processing method capable of reducing defects is required. For these reasons, there has been proposed a local dry type processing method in which thermal processing is performed in the state in which water in a target portion is partially discharged.

The local dry type processing method, however, is insufficient in the case of using a laser as a thermal source. This is because a laser beam is scattered by hazing and dew formation of the laser emitting optics which are caused by a slight amount of water content remaining near the target portion, causing a reduction in the workability of the laser processing. As a result, for laser processing, it is important to reduce the water content in a chamber of a laser processing system as much as possible. In this regard, various techniques have been examined.

For example, techniques for locally excluding the water content in the neighborhood of a laser torch of a laser processing system used in water and on a target portion to be processed to effect drying of such portions, have been disclosed in Japanese Patent Laid-open Nos. Sho 63-215392, Sho 63-242483, Hei 3-146286, Hei 4-249799 and Hei 5-31591. These repairing techniques are effective to obtain a processed region having less defects as compared with the wet-type processing method.

The above-described techniques, however, do not take into account problems generated during the actual applications. Specifically, in the actual repairing of a structure in a nuclear reactor, the repairing operation is started after an underwater processing system is moved in the water to a target portion. However, in each of these techniques, part of a water shield (chamber) for preventing water from permeating into the interior of the system is opened to a water environment (that is, the shielding mechanism is not a perfectly closed system). Consequently, to prevent permeation of water when the system is moved in water, a water curtain must be formed usually by allowing gas or water to flow. In this case, it may be considered that permeation of water can be prevented by increasing the flow rate of water. However, to increase the flow rate of water, a generator for generating a high pressure gas or high pressure water flow is required, or the water shield (chamber) must have a high strength for withstanding the high pressure gas or high pressure water flow. For the system capable of coping with the above problem, there arises another problem. In the case of processing in a downward posture, for example, for repairing the bottom of a reactor, the permeation of water is not so large; however, in the case of processing the side surface of the interior of a reactor, the processing system must be located with a horizontal posture. In this case, permeation of water becomes larger. The reason for this is that, if the system is not sufficiently close to a wall facing the opened portion of the system, the high pressure gas tends to flow upward because of its light specific gravity, and thereby the formation of the water curtain on the lower side of the system becomes insufficient. Namely, for a horizontal processing using a conventional system, it must be assumed that the facing wall is sufficiently close to the system. For this reason, up on operation of the conventional processing system for a target portion of an underwater structure, there is a fear that permeation of water will occur in the system or that generation of hazing or dew formation will occur in the laser emitting optics.

A slight amount of water content, which has presented no problem in thermal processing using an arc, causes hazing or dew formation of the laser emitting optics of a laser processing system during laser processing. In particular, for processing, such as cutting, welding or surface-treatment using emission of a laser beam, the high energy of the laser beam heats the material to a high temperature, and thereby the laser torch or the surrounding portion thereof is also heated during processing. As a result, the difference in temperature between the exterior and the laser torch becomes large, causing dew formation during processing, thus causing an inconvenience due to the dew formation. Specifically, a laser beam is abnormally scattered due to dew formation on a laser lens, causing reduction in the condensing performance or failure of the system due to heating of the portion of the lens where the dew formation is generated.

SUMMARY OF THE INVENTION

A general object of the present invention is to provide an underwater laser processing system, which is capable of processing an underwater structure having a free shape in any posture, and of enhancing the workability by preventing dew formation from being generated on optical equipment, such as laser emitting optics, and to provide a laser processing method using the system.

A specific object of the present invention is to provide the above-described laser processing system to further include a means for measuring the sensitization of a metal material of an underwater structure, thereby detecting a portion to be repaired (sensitized portion) and for repairing the portion at one time, resulting in a reduced processing time, and to provide a laser processing method using the system.

Another specific object of the present invention is to provide a laser processing method of alloying the surface of an underwater structure by melting a sprayed coating film formed on the surface using a laser beam.

A further specific object of the present invention is to provide a laser processing method of forming a new surface layer on the surface of an underwater structure by emitting a laser beam through a solution containing a metal component.

To achieve the above objects, according to a first aspect of the present invention, there is provided an underwater laser processing system comprising:

a laser torch;

a laser torch driving mechanism for changing a laser emission position of the laser torch; and a chamber with one end opened to an external environment, which contains the laser torch;

wherein a partitioning wall for preventing permeation of water is provided between a free end of the chamber and the laser torch.

In the above system, the partitioning wall may include an opening/closing mechanism, and part of the partitioning wall may be made of a material capable of transmitting a laser beam.

The partitioning wall may include an opening/closing mechanism, and a laser torch driving mechanism may be provided for advancing the laser torch to a surface of a structure to be processed.

The system may include a compartment provided with a mechanism for preventing permeation of water at the free end of the chamber, and a mechanism for substituting water in a space surrounded by the free end, an outer wall of the chamber connected to the free end and the partitioning wall for gas.

According to a second aspect of the present invention, there is provided an underwater laser processing system comprising:

a laser torch;

a laser torch driving mechanism for changing a laser emission position of the laser torch;

a chamber for containing the laser torch, which is enclosable against water; and a chamber having a free end to be placed in contact with the surface of an underwater structure, which includes a mechanism for preventing permeation of water at the free end and also includes a mechanism for substituting water for gas;

wherein the two chambers can be independently moved.

The system may include a mechanism for communicating or shielding inner atmospheres of the two chambers to or from each other.

At least one of the chambers may include at least one of a water discharging mechanism, a gas injecting mechanism, a gas exhausting mechanism, a dust exhausting mechanism, a gas flow rate monitoring mechanism, a pressure monitoring mechanism, a temperature monitoring mechanism, and a moisture monitoring mechanism.

At least one of the chambers may include at least one of a gas injecting mechanism for drying the interior of the chamber, a side gas shield mechanism for removing evaporated matter or fine particles generated from the surface of a target structure upon processing, and a gas injecting mechanism for drying the laser torch.

The system may include a mechanism for holding laser emitting optics at a temperature in the range of ±30° C. on the basis of the temperature of the water around the system.

The system may include a transmission tube for shielding an optical fiber element from water in the range up to a water surface, the optical fiber element being adapted to transmit a laser beam to a main body of the system through the water environment.

In the system, the mechanism provided at the free end of the chamber for preventing permeation of water may comprise at least one of a skirt mechanism formed of an elastic body having a flexibility and deformable in accordance with a shape of an underwater structure to be processed, a curtain mechanism for jetting a high pressure shield gas, and curtain mechanism for jetting a high pressure water.

The inner surface of a chamber, which has the mechanism for preventing permeation of water at a portion to be placed in contact with the surface of an underwater structure and a mechanism for substituting water for gas, preferably has an insulating property.

In the system, a means for detecting the sensitization of a metal material of an underwater structure to be processed may be provided in the chamber provided with the mechanism for preventing permeation of water at the free end and also provided with the mechanism for substituting water for gas.

The system is preferably used for underwater processing for emitting a laser beam to an underwater structure.

The system is preferably used for surface treatment comprising the step of forming an alloying layer on the surface of an underwater structure made of a stainless steel, the alloying layer having the following average composition (wt %) in the region of a depth of 20 μm from the surface:

0≦C≦0.02

0≦Si≦1

0≦Mn≦2

0≦P≦0.045

10.50≦Ni≦15

16.5≦Cr≦24

2≦Mo≦3

0≦N≦0.22

0≦Nb≦0.5

0≦Ti≦0.5

0≦Zr≦0.5

0≦Pt≦0.5

0≦Pd≦0.5

Fe, and inevitable impurities: balance

The system is preferably used for surface treatment, the surface treatment comprising the step of forming an alloying layer on the surface of an underwater structure made of a Ni alloy, the alloying layer having the following average composition (wt %) in the region of a depth of 20 μm from the surface:

0≦C≦0.03

0≦Si≦0.5

0≦Mn≦1

0≦P≦0.03

5.5≦Fe≦10

14≦Cr≦17

0≦Nb≦0.5

0≦Ti≦0.5

0≦Zr≦0.5

0≦Pt≦0.5

0≦Pd≦0.5

Ni and inevitable impurities: balance

The system is preferably used for surface treatment, the surface treatment comprising the steps of:

injecting a solution containing a metal component in the chamber including a mechanism for substituting water for gas;

emitting a laser beam to the surface of an underwater structure to be processed through a shield plate in such a state that the surface of the structure is dipped in the injected solution; and forming a surface layer composed of the component contained in the solution on the surface of the structure.

The solution used in the surface treatment may contain at least one kind of ions of Cr and Pd.

The system is preferably used for an underwater laser processing method for a structure in a pressure vessel of a nuclear reactor, the method comprising the steps of:

mechanically removing part of a surface layer of a target portion of the structure in a state in which water is present in the pressure vessel;

disposing a chamber position adjusting mechanism having an extensible mechanism, and integrating the chamber position adjusting mechanism with the underwater laser processing system;

bringing the underwater laser processing system in close-contact with the surface of the structure; and emitting a laser beam to the surface of the structure for processing the surface of the structure in water.

Preferably, the underwater laser processing method using the system further comprises the steps of:

dividing a target region into a plurality of segments;

setting an algorithm such that, when the segments are sequentially processed or simultaneously processed using a plurality of the systems and a surface-treated region ultimately is formed on the whole target portion, the maximum value of heat input or residual stress generated by the heat input applied to the structure is minimized; and performing a series of processing steps on the basis of the order set by the algorithm.

The underwater laser processing method using the system preferably comprises the steps of:

dividing a laser light oscillated from a laser oscillator into a plurality of beams, and transmitting the divided laser beams; and simultaneously or sequentially emitting the laser beams to a plurality of positions on the surface of a structure in a pressure vessel of a nuclear reactor.

The above and other features and advantages of the present invention will becomes apparent from the following description which will be given with reference to the example illustrated in the accompanying drawings.

BRIEF DESCRIPTION OF THE DRAWINGS

FIG. 3 is a detailed sectional view of a structure of a bottom portion of the chamber, which is to make contact with the surface of the structure;

DETAILED DESCRIPTION OF THE PREFERRED EMBODIMENTS

Hereinafter, preferred embodiments of the present invention will be described with reference to the accompanying drawings.

An underwater laser processing system of the present invention includes a laser torch; a laser torch driving mechanism for changing the laser emission position of the laser torch; and a chamber with one end opened to an external environment, which contains the laser torch; wherein a partitioning wall for preventing permeation of water is provided between a free end of the chamber and the laser torch.

The chamber with one end opened to an external environment consists of a vessel, such as a cup. The vessel may have a cylindrical or polygonal shape. In short, the vessel may be formed such that part of the outer wall of the vessel is cut off and the interior of the vessel is is in communication with the external environment. The free end of the chamber represents a boundary portion between the interior of the vessel and the external environment, for example, an opening end of the cup. The above-described chamber may be considered to be divided into two compartments by the partitioning wall, one containing a laser torch and the other being opened to the external environment.

Figure 4A:
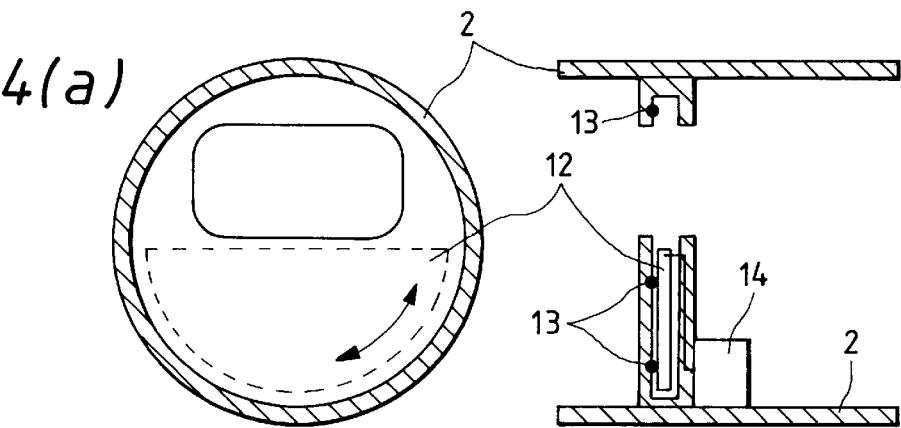
FIGS. 4A to 4C are detailed views of shield plate opening/closing mechanisms.
Figure 4B:
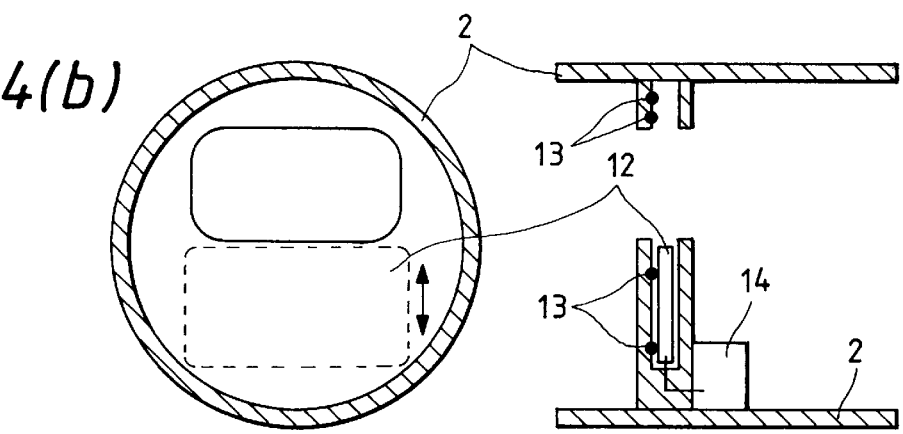
Figure 4C:
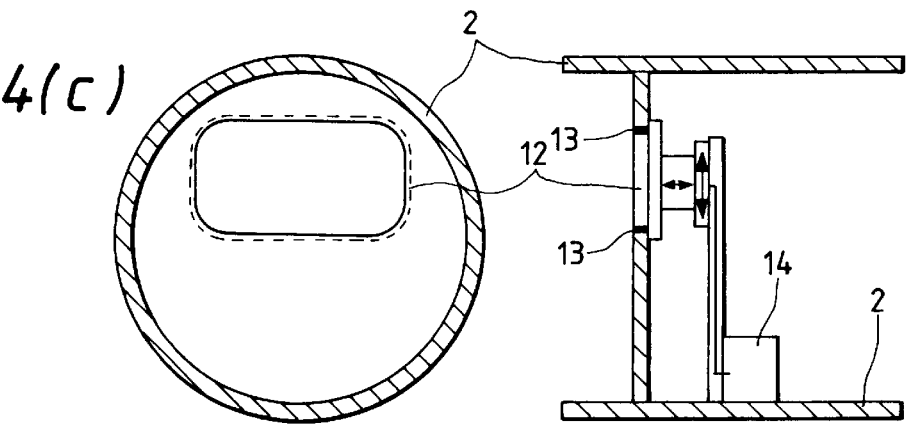
Figure 5:
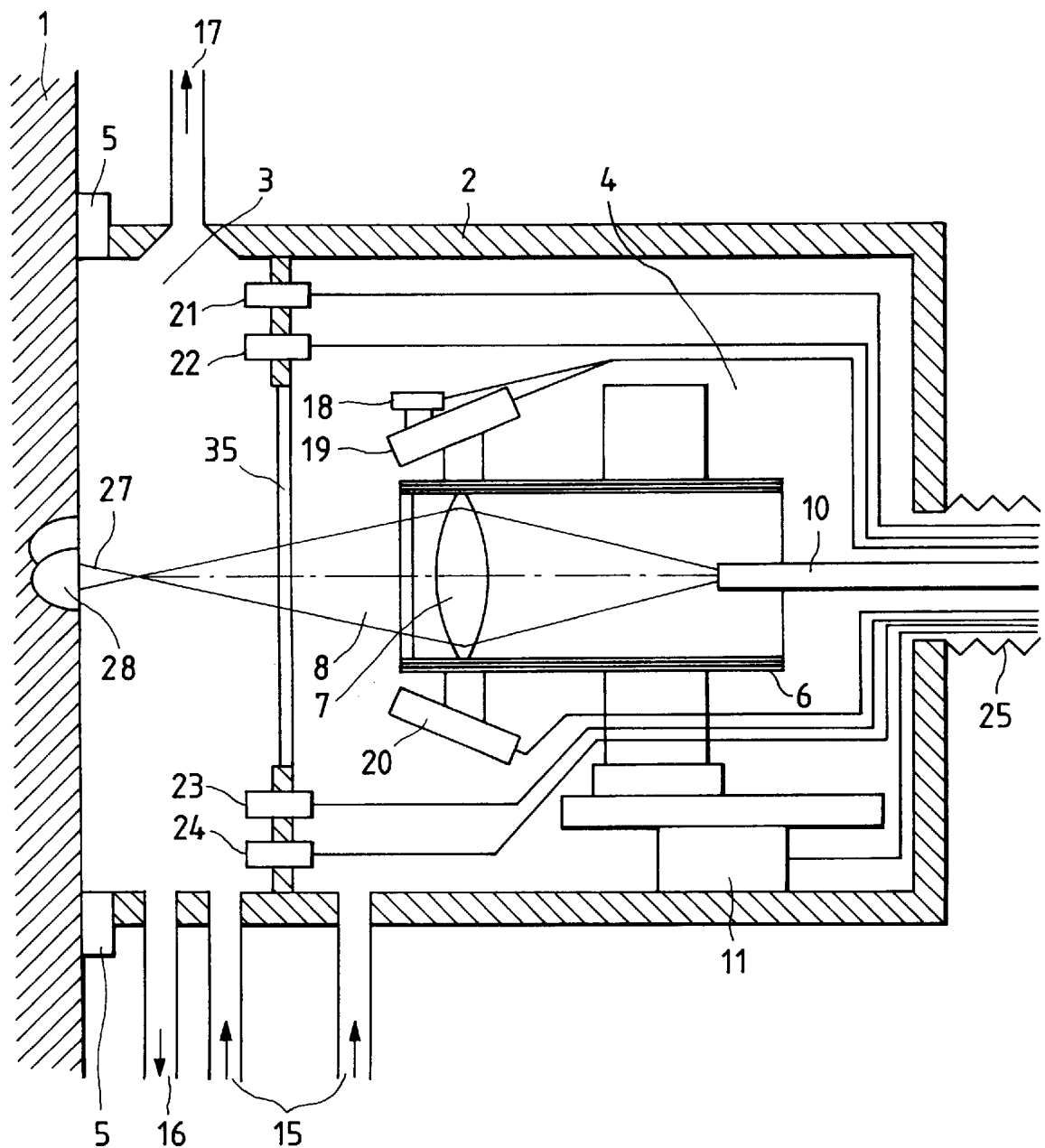
FIG. 5 is a sectional view showing the state in which underwater laser processing is performed using a laser processing system having a chamber divided into two compartments by means of a shield plate capable of transmitting a laser beam.

FIGS. 1 to 5 are sectional views of a laser processing system of the present invention, which has a chamber divided into two compartments. The chamber may be formed to have a cylindrical or polygonal shape. A chamber 2 has compartments 4 and 3. The compartment 4 having a laser torch is enclosed against the surrounding water environment and is usually kept in a gas atmosphere. The compartment 3 has a structure which is open to the water environment, that is, it allows permeation of water when it is not in contact with the surface of an underwater structure 1 (in this case, the inner wall of a nuclear reactor, the surface of which is perpendicular to the ground). In short, an integral chamber 1 has a partitioning wall. The chamber 4, which is usually kept in a gas atmosphere, includes a laser torch 6 containing laser emission optics, a laser torch driving mechanism 11, a shield gas injecting mechanism 15, an optical fiber element 10, and a transmission tube 25 for various transmission systems. The laser torch 6 includes a distance monitoring mechanism 18 for detecting its distance to the structure, a monitor 19 for detecting the emission position of a laser beam and for monitoring a target portion to be processed, a target portion illuminating mechanism 20, and a center gas shield mechanism 26. The chamber 3 to be placed in contact with the surface of the structure includes monitoring mechanisms 21 to 24 for detecting temperature, moisture, pressure and gas flow rate in the chamber, a water discharging mechanism 16, a gas/dust discharging mechanism 17, and a shield gas injecting mechanism 15. The partitioning wall may be mounted with a window 35 for transmitting a laser beam as seen in FIG. 5.

Figure 1:
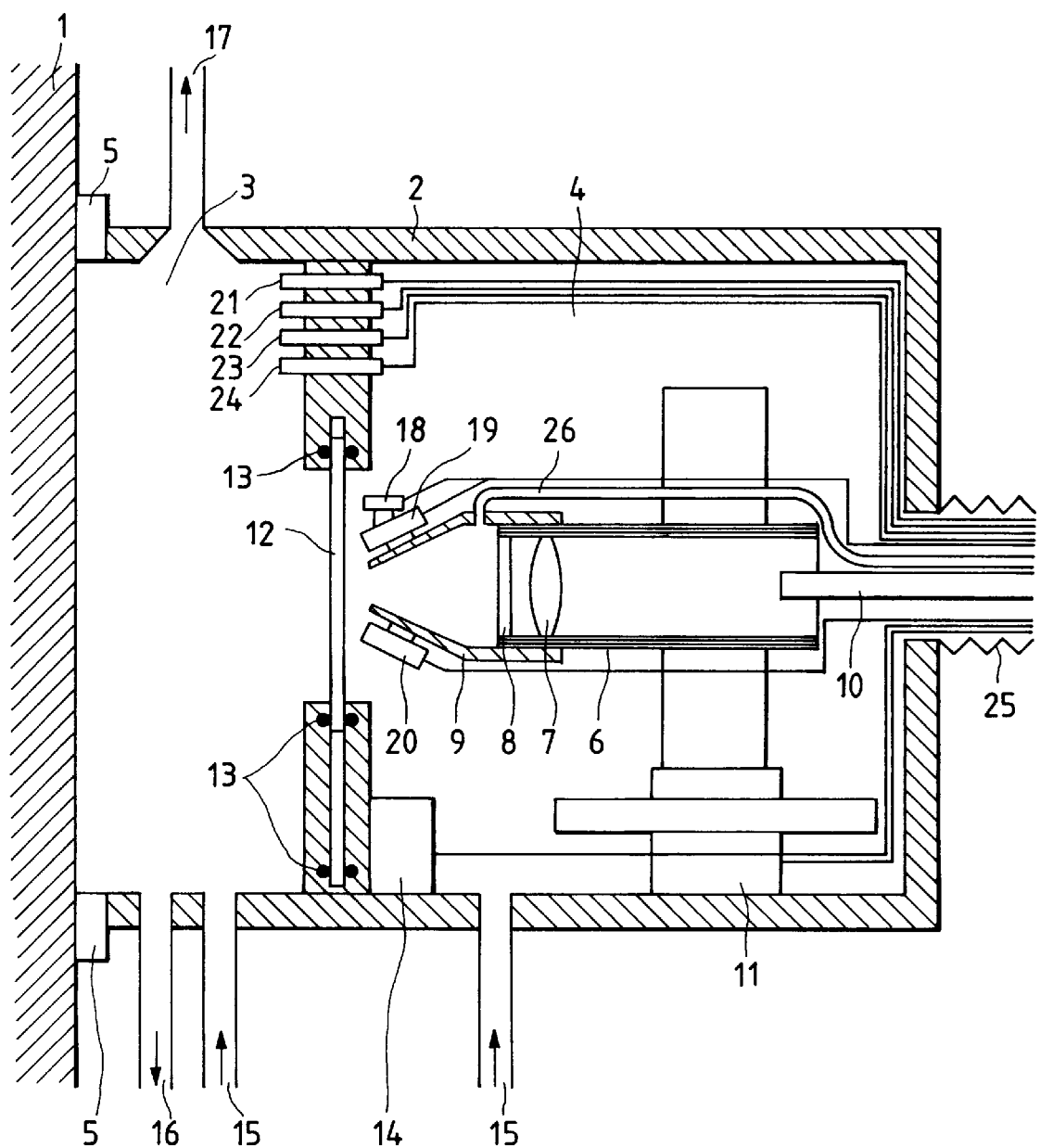
FIG. 1 is a sectional view of a laser processing system having a chamber divided into two compartments by means of a shield plate showing the state in which the system is accessible to an underwater structure while the shield plate is closed.

In access of the chamber 2 to the underwater structure 1, the compartment 4 having the laser torch is usually kept in a gas atmosphere by the shield gas injecting mechanism 15 for protecting the laser torch by use of the gas atmosphere. Accordingly, even when the chamber 2 is accessed in any posture (for example, the horizontal posture shown in the figure), the compartment 4 is prevented from being permeated by water. The compartment 3 is opened to a water environment, and is filled with water at the time the chamber 2 is mounted on the underwater structure 1. Next, the chamber 2 is disposed on a target portion of the structure in such a manner as to closely contact the surface of the structure 1 as shown in FIG. 1. After that, water in the compartment 3 in with the surface of the underwater structure 1 is discharged by the water discharging mechanism 16 such as a vacuum pump and an inert gas is injected into the compartment 3 by the gas injecting mechanism 15. As a result, the interior of the compartment 3 is turned into an inert gas atmosphere. In this case, by injection of a dry gas heated at a high temperature, water present in the compartment 3 and on the surface of the structure 1 can be removed. Thus, the interior of the compartment 3 and the surface of the structure 1 become in a dry state. Here, as shown in FIG. 3, a bottom 5 of the compartment 3 which contacts the surface of the structure 1 may include one of a number of various mechanisms of the type shown in FIG. 3 for preventing permeation of water: a rubber or sponge-like packing mechanism 29; a vacuum mechanism 30; a high pressure air (curtain) shield mechanism 31; a high pressure water shield mechanism 34; a wire brushing curtain mechanism 32; and a skirt mechanism 33 formed of a carbon material (such as carbon fibers). In the compartment 3, the gas flow rate, pressure, temperature and moisture are respectively monitored by the gas flow rate monitoring mechanism 24, pressure monitoring mechanism 23, temperature monitoring mechanism 21 and moisture monitoring mechanism 22, and thus are controlled at values suitable for laser processing. After it is confirmed that the interior of the compartment 3 is turned into a suitable atmosphere, a specified laser processing is performed by emission of a laser beam using the laser torch. In the laser processing shown in FIG. 5, for example, a laser beam is emitted to the surface of the structure 1 through the window 35, which is mounted on the partitioning plate and is capable of transmitting a laser beam. With this arrangement, the hazing and dew formation on the emission optics of the laser torch can be prevented, resulting in increased efficiency in the laser processing.

Figure 6:
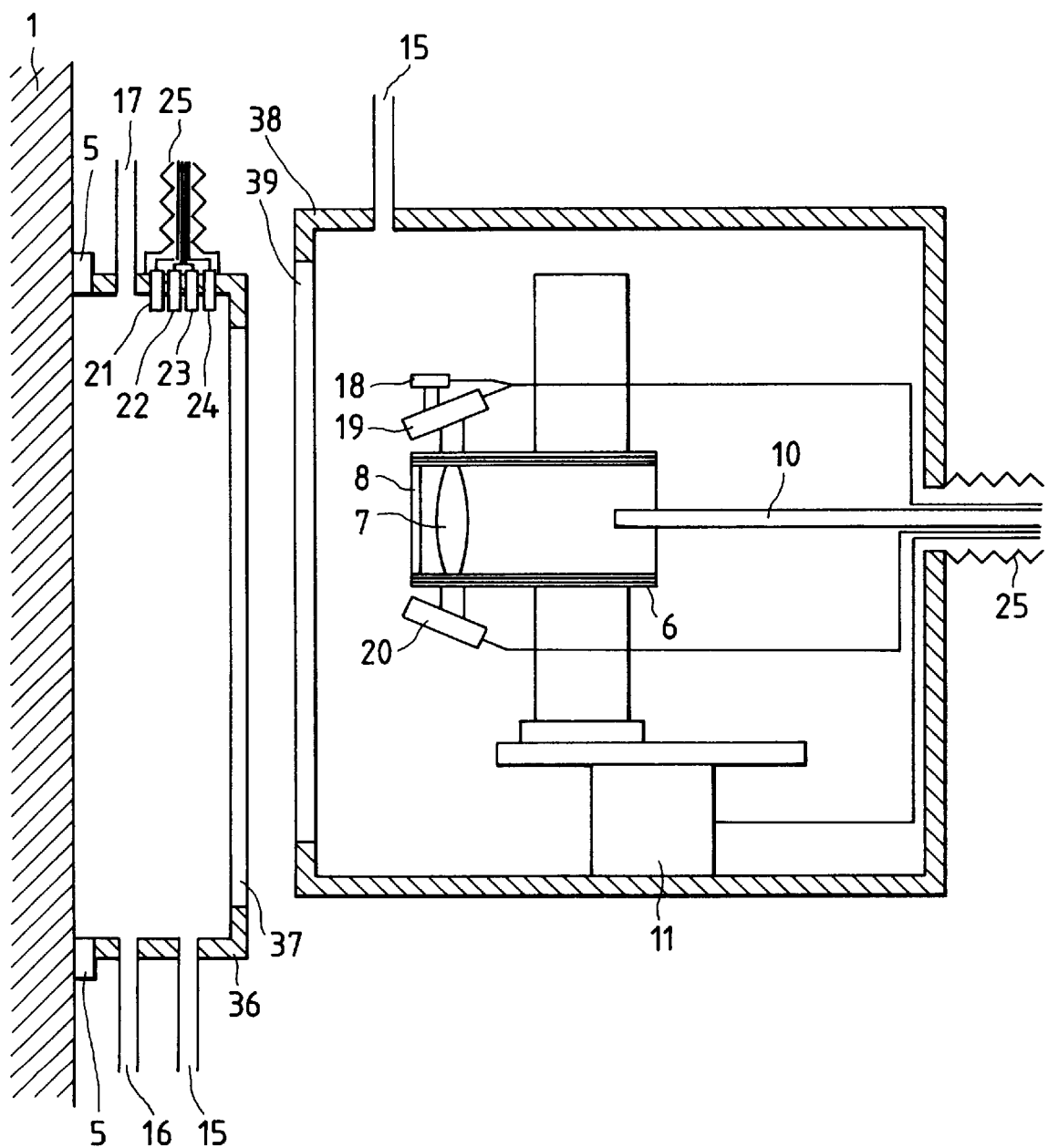
FIG. 6 is a sectional view showing the state in which underwater laser processing is performed using a laser processing system having two independent chambers in which a laser torch driving mechanism is provided in the chamber having a laser torch.
Figure 7:
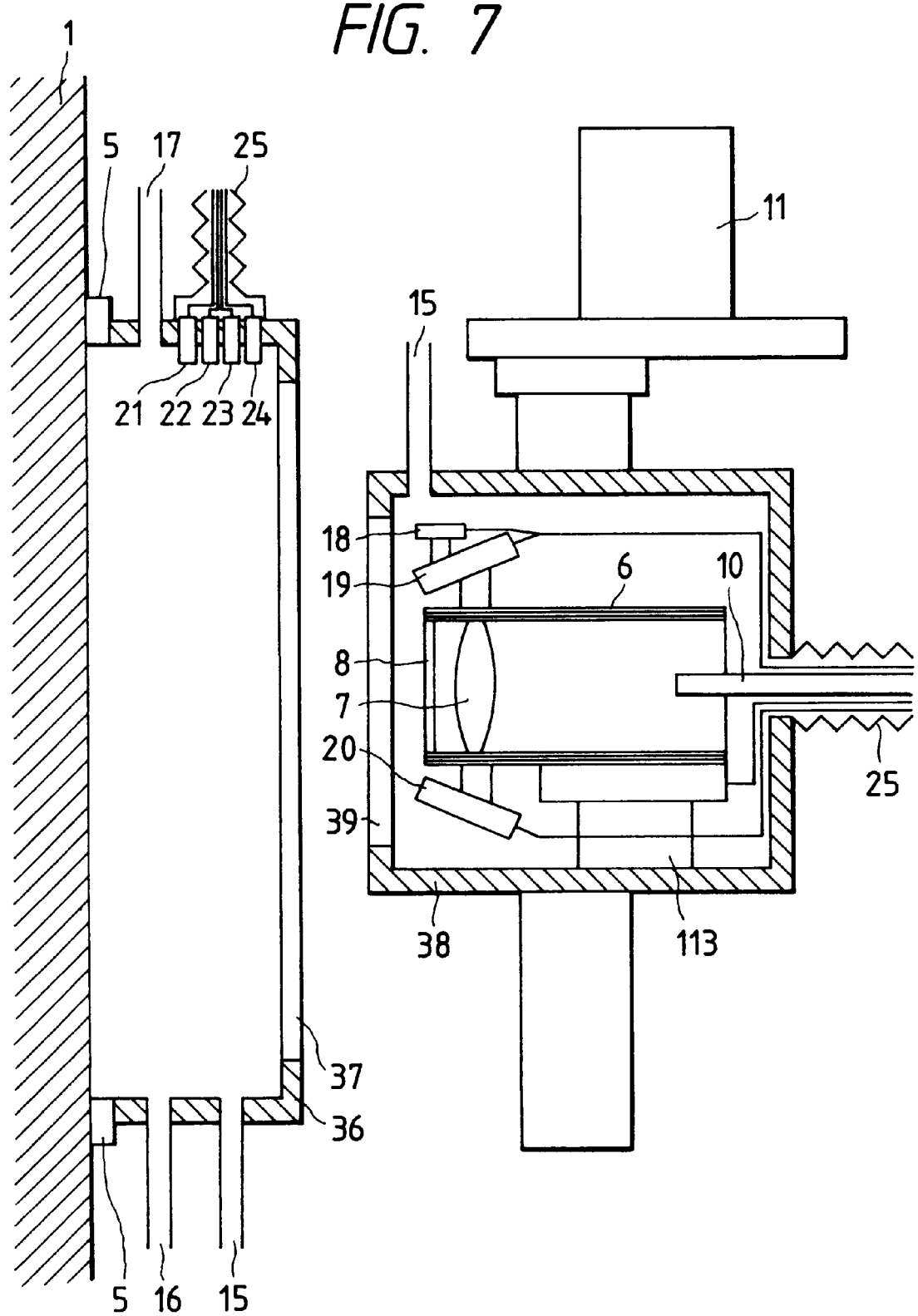
FIG. 7 is a sectional view showing the state in which underwater laser processing is performed using a laser processing system having two independent chambers in which a laser torch driving mechanism is provided outside the chamber having a laser torch.
Figure 8:
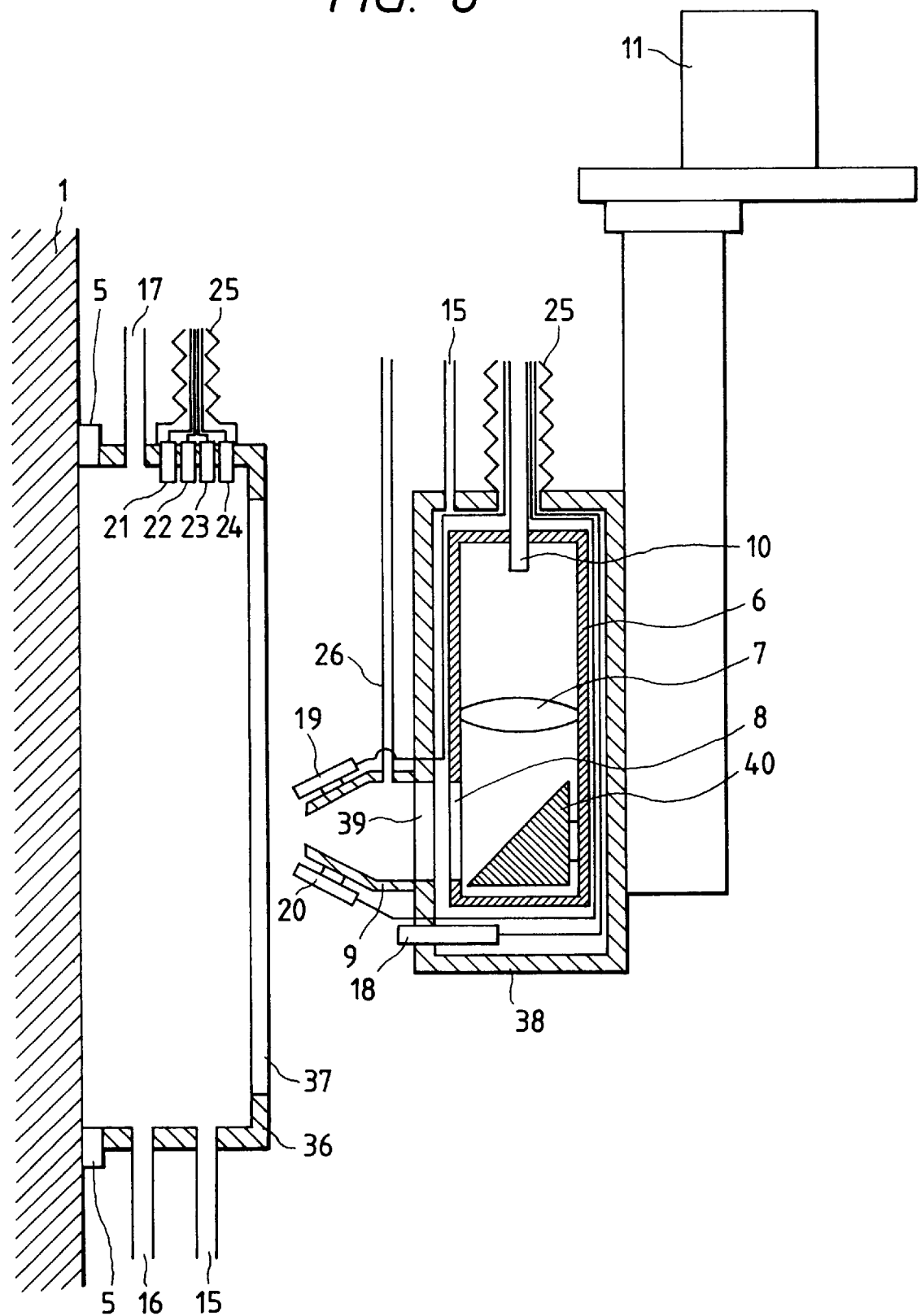
FIG. 8 is a sectional view showing the state in which underwater laser processing is performed using a laser processing system having two independent chambers in which a driving mechanism for laser emitting optics having a reflection mirror is provided outside the chamber having the laser emitting optics.
Figure 19:
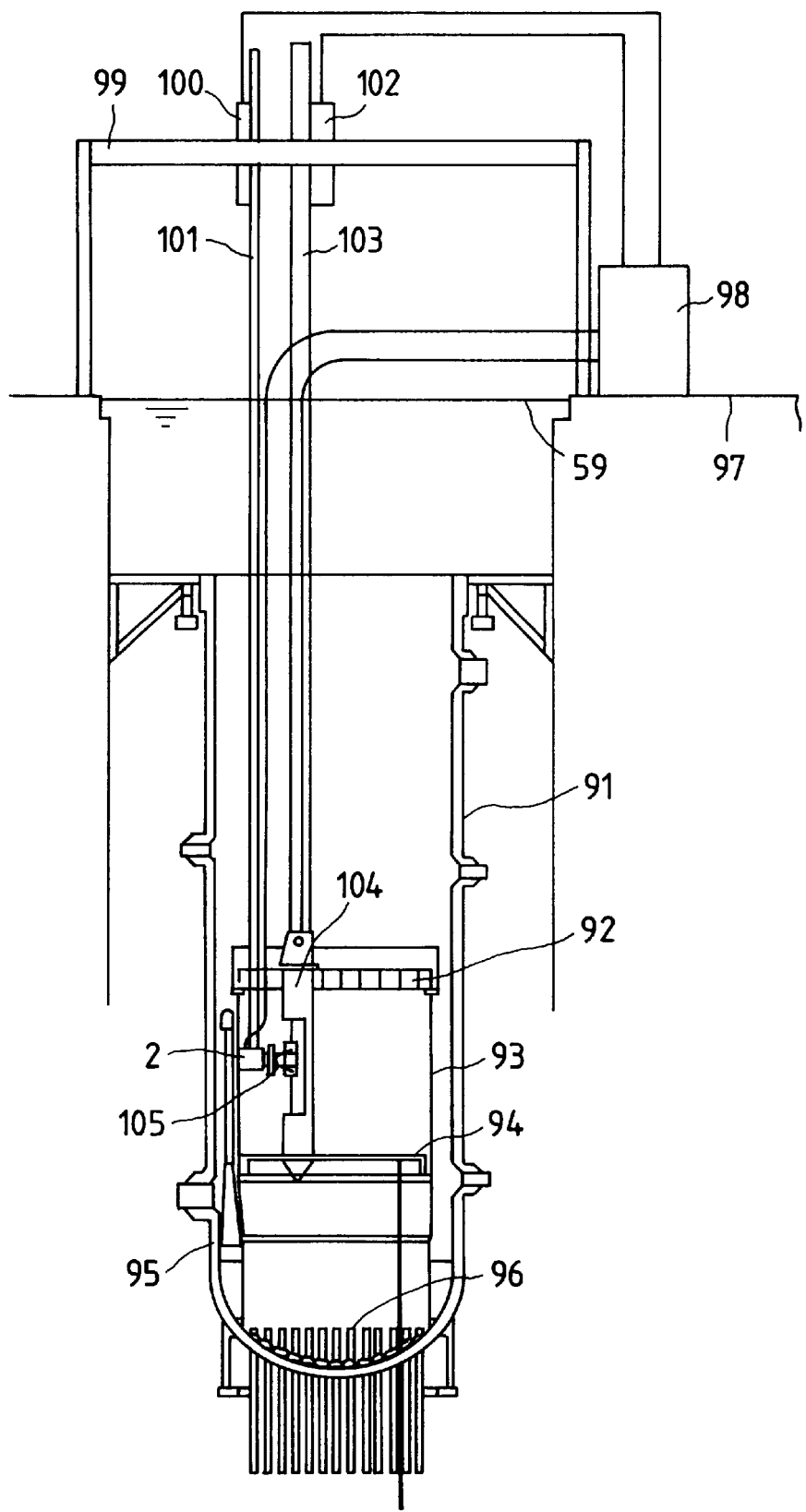
FIG. 19 is a sectional view showing the state in which the laser processing system of the present invention gains access to the inner surface of a BWR shroud.

In the above-described laser processing system, the compartment 3 is not necessarily integrated with the compartment 4. The chamber is only required to be divided into the compartment 3, capable of removing water near a target portion to be processed, and the compartment 4 capable of preventing water from permeating into the laser torch. Accordingly, two chambers having the functions of the compartments 4, 3 may be provided in such a manner as to be separated from each other and independently moved as shown in FIGS. 6 to 8. In this case, each of the facing surfaces of both the chambers may partially include a window capable of transmitting a laser beam. Such a structure has an advantage in making the size of each chamber smaller. For example, for repairing a core portion in a nuclear reactor, as shown in FIG. 19, the system must be inserted in the reactor through an upper grid plate of the reactor. In this case, since the interval between adjacent grids m of the upper grid plate is in the order of several tens of cm, a system having a size greater than this interval cannot pass through the up per grid plate. On the other hand, a system having two chambers independently movable is advantageous in that the two chambers can independently pass through an interval between the grids. In some cases, the system may include a mechanism for integrating the two chambers after passing through the upper grid plate. This makes it easy to effect movement of the system upon laser processing. Incidently, it is desirable to make the distance between the laser torch and a target portion smaller upon laser processing, because if the distance is large, a laser beam is scattered by air in the chamber, resulting in a loss in energy. In this regard, the structure having a chamber divided into two compartments 4, 3 by means of a partitioning plate 12 (see FIG. 1) is effective. In this structure, when the system is moved in water, the partitioning plate 12 is closed to prevent water from permeating into the compartment 4; and when the chamber is in close contact with the target portion and the interior of the compartment 3 is perfectly dry, the partitioning plate 12 is opened and the laser torch obtains access to the target portion through the compartment 3.

The position of a target portion to be repaired is determined by optical observation using a camera or the like, and the target portion is selected from locations where the material is deteriorated. To examine such a deteriorated location, it is effective for the compartment 3 to include a mechanism for examining such a deteriorated location and the degree of the deterioration. The function of the mechanism will be described below.

A structure made of a stainless steel tends to cause intergranular corrosion or stress corrosion cracking when the concentration of Cr at the crystal grain boundaries is reduced (that is, the structure is sensitized). A technique for examining the sensitization of a material has been known, wherein the stability of a passive film formed on the surface of the material dipped in an electrolytic solution is electrochemically examined. The chamber of the present invention can include a means for examining the sensitization of an underwater structure. Specifically, the laser processing system of the present invention has a chamber provided with such a sensitization detecting means and a means for emitting a laser beam onto a sensitized portion for improving the corrosion resistance and stress corrosion cracking resistance of the structure, thus enhancing the efficiency of a series of laser processing steps.

In the actual processing, after the chamber of the system is mounted on surface of a structure, water in the compartment in contact with the surface of the structure is discharged and an electrolytic solution is injected in the compartment. In this case, the surface of the structure within the chamber is coated with the electrolytic solution. In such a state, the surface of the structure starts to be actively dissolved, and a passive potential is applied from an external power supply such that a passive film is formed. Further, a pulse signal having a peak potential, which is changed from the passive potential to the natural potential is applied to the surface of the structure. In the case where the structure is sensitized, the concentration of Cr at the grain boundaries is reduced, so that the passive film at the grain boundaries tends to be destroyed by application of the pulse signal in the range up to an active region. As a result, active dissolution from the grain boundaries advances, and the current due to the active dissolution is observed. On the other hand, in the case where the structure is not sensitized, the concentration of Cr at the grain boundaries is not reduced, so that the passive film is stable even with application of the same pulse signal, and thereby the active dissolution does not advance. As a result, a current due to active dissolution is not observed. The sensitization of a structure within the chamber can be thus detected on the basis of the current thus measured. Specific examples of electrolytic solutions for detecting the sensitization of a stainless steel include a composition containing one or more kinds of material selected from a group consisting of sulfuric acid, nitric acid, hydrochloric acid, perchloric acid, chloric acid, hypochlorous acid, acetic acid, tiocyanic acid, cyanic acid, and salts thereof, carbonic acid, ammonia, ammonium salt, hydroxide, and chloride. Moreover, in the case of using a chamber to be mounted on the surface of a structure, which is made of a material having an electric conductivity, it is desirable for the inner wall of the chamber to be coated with an insulating material for detecting only information from the surface of the structure. The above function of detecting the sensitization of the structure can be achieved using a structure in which the laser emitting optics are enclosed against an external environment. Moreover, the above method can detect the sensitization of a target portion having a large area at one time, and thereby it is particularly effective to shorten the detecting time.

Next, there will be described the function of an example in which the present invention is applied to a structure in a pressure vessel of a nuclear reactor. A structure made of a stainless steel or Ni alloy in a pressure vessel of a nuclear reactor is sometimes sensitized by the effect of precipitation of Cr carbides at grain boundaries at a weld heat-affected zone or emission of neutrons during operation of the plant. In this case, since the structure in a light-water reactor is usually contacted with water, there is a fear of causing intergranular corrosion or stress corrosion cracking, or in causing hair cracks due to stress corrosion cracking on the surface. In some cases, the structure thus sensitized is subjected to laser processing by improving the corrosion resistance or stress corrosion cracking resistance thereof or melting the portion having hair cracks. In this case, however, since $\gamma$-rays are generated from the structure in the reactor by the effect of the emission of neutrons during operation of the plant, laser processing in such an atmosphere is dangerous for an operator, and therefore, it is desirable to perform the process in a water environment capable of reducing $\gamma$-rays. Namely, it is desirable to perform laser processing in a water environment where the core portion is filled with water to a level of the upper grid plate. Such laser processing has a problem that the laser system must be accessible to the structure in a posture corresponding to the shape of the structure. For example, the system must be accessible to the inner surface and the outer surface of a core shroud in a horizontal posture, accessible to an access hole cover in a downward posture, and accessible to a core spray spar jaw or the other piping in an upward posture. According to the present invention, since the laser processing system has a chamber divided into a compartment which is usually kept in a dry atmospheric air or gas atmosphere and a compartment to be mounted in contact with an underwater structure, the system can be accessible to a structure in any posture without any inconvenience due to permeation of water or dew formation around the laser torch. Incidentally, the system is required to be accessible to the inner surface of a shroud, a shroud support or a CRD housing/stub tube through an interval between adjacent grids of the upper grid plate. In this regard, the system of the present invention can be easily mounted on the inner surface of a shroud or the like using a chamber driving mechanism, and a driving mechanism having the functions of adjusting a chamber position and of imparting a load on the chamber. The latter driving mechanism includes a supporting pillar for fixing the position of the chamber to a core supporting plate through the upper grid plate, and a secondary arm provided on the supporting pillar and having an extensible mechanism. The chamber is integrated with the secondary arm by means of an electromagnet or the like under water so as to be movable by the chamber position adjustment mechanism provided on the secondary arm.

A laser region processed by one access of the chamber is limited to an area defined by the chamber. Accordingly, in the case of processing a large area, for example, in surface-treatment of the inner surface of a shroud, the chamber is repeatedly mounted on the structure while being successively shifted by specified pitches. The final processed region can be thus obtained by the sum of a plurality of segments each having a specific area. In this case, however, at each portion where adjacent segments are overlapped and in the neighborhood thereof, residual stresses generated by heat input or a thermal gap between heating and cooling are possibly overlapped. At this time, the portion, where heat input or residual stress is maximized in the final processed region, exerts the largest effect on the quality of the structure being processed. In the present invention, an algorithm is previously set such that the maximum value of the heat input or residual stress applied to each processed region of the structure is minimized, and on the basis of the order of the algorithm, a series of laser processing steps are performed. This is effective to equalize the distribution of the heat input or residual stress in the final processed region, and to enhance the quality of the structure being processed.

In the case of forming a target region having a large area using the above-described laser processing system a chamber divided into two compartments, the chamber must be repeatedly mounted on the target region while being shifted at specified pitches. According to the present invention, a plurality of positions can be simultaneously processed using a plurality of laser processing systems each having the above-described mechanisms. Specifically, a laser light oscillated from a laser oscillator is divided into a plurality of laser beams, and the laser beams thus divided are transmitted through a plurality of transmission systems and simultaneously emitted to a plurality of positions in the reactor by a plurality of the laser processing systems. In this case, the simultaneous processing for a plurality of positions is possible using a plurality of access driving systems and only one oscillator provided in a remote control chamber outside the pressure vessel, to thus significantly shorten the total operating time. Moreover, even when one processing system or transmission system is deteriorated by the effect of γ-rays or the like, processing can be continued using an alternative system, and during processing using the alternative system, the deteriorated system may be repaired or replaced with a new one.

The present invention will be more fully apparent with reference to the following specific embodiments.

EMBODIMENT 1

In this embodiment, as shown in FIGS. 1 to 4, 7, 10 and 15, there is used a laser processing system of a type having a chamber partitioned into two compartments by means of a shield plate 12 having an opening/closing mechanism. The system is accessible to an underwater structure from a water surface and is operated in a horizontal posture to emit a laser beam onto the surface of the structure.

Figure 15:
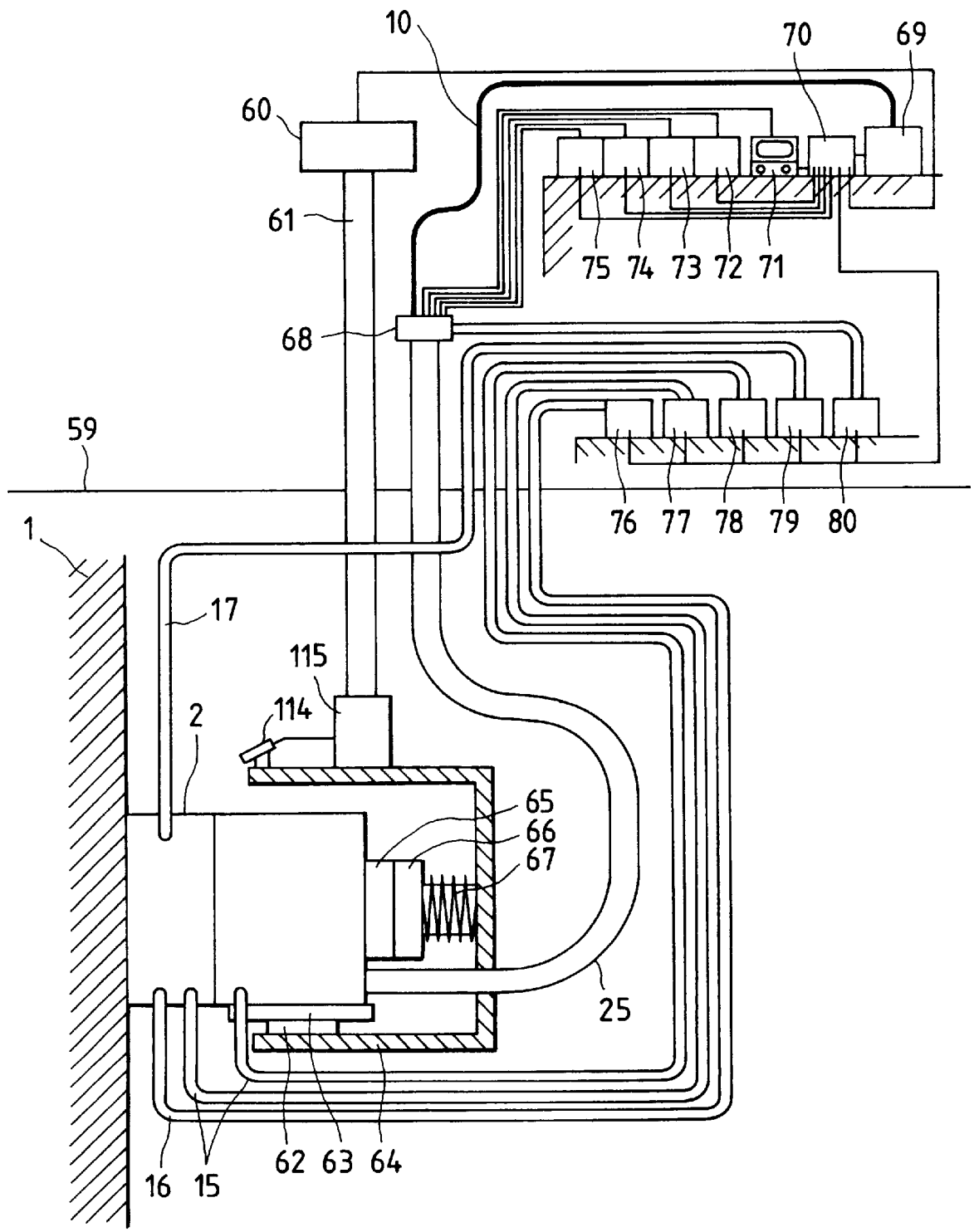
FIG. 15 is a sectional view showing the state in which a laser processing system having a chamber divided into two compartments obtains access to an underwater structure in a horizontal posture.

First, as shown in FIG. 15, a chamber 2 of the laser processing system of the present invention is mounted on an underwater structure 1. Specifically, the chamber 2 is carried to a target portion of the structure 1 by a driving mechanism 60 for driving a chamber driving robot 61. The chamber driving robot 61 has a position monitoring mechanism 114, a vertical position adjusting mechanism 115 and a horizontal position adjusting mechanism 62 (longitudinal direction, in the figure). The chamber 2 is divided into two compartments, as shown in FIG. 1. The compartment including a laser torch and a laser torch driving mechanism is usually kept in an air or a gas atmosphere by injecting air or a dry gas from a gas injecting mechanism 15.

A laser torch 6 shown in FIG. 1 is composed of direct advance type optics; however, it may be composed of mirror-reflection type optics, as shown in FIG. 8.

The chamber 2 is then slid along a slide mechanism 63 by a horizontal load imparting mechanism 66 and a load adjusting mechanism 67, so as to be placed in close contact with the surface of the structure 1. An applied load is measured by a load cell 65, and is suitably controlled. A portion of the chamber 2, which is in contact with the surface of the structure 1, includes one or two or more of the mechanisms shown in FIG. 3a that is, a rubber-like or sponge-like packing mechanism 29, a vacuum mechanism 30, a high pressure air shield mechanism 31, a high pressure water shield mechanism 34, a wire brush mechanism 32, and a skirt mechanism 33 made of a carbon material (such as carbon fibers). With such a mechanism or mechanisms, the above portion of the chamber 2 is mounted in close contact with the surface of the structure so that permeation of water from the surrounding region is prevented.

A water discharging mechanism 16 and the gas injecting mechanism 15 are then operated to discharge water in the compartment in contact with the surface of the structure 1 and to turn the interior of the compartment into a gas atmosphere. The discharge of water and the injection of the gas are adjusted by adjusting systems 76 to 80. The injected gas may be a dry inert gas. Alternatively, a dry gas injecting mechanism may be provided separately from the gas injecting mechanism 15 for substituting a non-inert gas injected in the compartment for an inert gas thereby providing a dry gas atmosphere in the interior of the compartment. As shown in FIG. 1, the atmosphere in the compartment is monitored in terms of the gas flow rate, pressure, temperature and moisture by a gas flow rate monitoring mechanism 24, a pressure monitoring mechanism 23, a temperature monitoring mechanism 21, and a moisture monitoring mechanism 22, and is controlled in a suitable state by measuring/adjusting systems 72 to 75. For example, when the pressure of the gas atmosphere in the compartment is excessively high, it is adjusted as follows: Namely, in the case where the portion of the chamber in contact with the surface of the structure 1 includes the mechanism for discharging a gas or water from the interior of the chamber to the exterior while shielding the flow of a gas or water from the exterior, for example, the high pressure air shield mechanism 31, high pressure water shield 34, wire brush mechanism 32, or skirt mechanism 33 made of a carbon material, excessive gas is discharged to the outside of the chamber through the mechanism. On the other hand, in the case where the above portion of the chamber includes a close-contact mechanism such as the packing mechanism 29 or vacuum mechanism 30 individually or in combination with the above shielding mechanism, excessive gas is discharged to the outside of the chamber through a gas exhausting mechanism 17. Thus, the interior of the compartment in contact with the surface of the structure is turned into a dry gas atmosphere, and at the same time the water content is removed from the surface of the structure.

Next, the shield plate 12 is opened by a shield plate driving mechanism 14, to turn the interior of the chamber into one space. Here, the opening/closing mechanism for the shield plate 12 may be either of four types: the first type being constructed as shown in FIG. 4A, in which the shield plate 12 is rotated in a groove provided on a shield supporting portion and the shield plate 12 is packed with the supporting portion through enclosed type water-proof rings 13; the second type being constructed as shown in FIG. 4B, in which the shield plate 12 is moved in parallel to the shield plate supporting portion in a groove provided in the supporting portion and the shield plate 12 is packed with the supporting portion through the enclosed type water-proof rings 13; the third type being constructed as shown in FIG. 4C, in which the shield plate 12 is sealingly pressed from the inner or outer side of a compartment 4 including laser emitting optics to the shield plate supporting portion through the enclosed type water-proof rings 13; and the fourth type being constructed so that the shield plate 12 is moved up to the outside of the chamber in parallel with the shield plate supporting portion in a groove provided in the supporting portion and a space between the supporting portion and the shield plate 12 is packed with the supporting portion through the enclosed type water-proof rings 13. When either of the pressure, temperature and moisture of the gas atmosphere is changed after the two compartments of the chamber are turned into one compartment by operation of the opening/closing mechanism, it is controlled to a suitable value by each monitoring mechanism. The above monitoring mechanisms 21 to 24 may be provided in the compartment 4 having the laser emitting optics, wherein the pressure, temperature and moisture of the gas atmosphere may be controlled to suitable values by respective monitoring mechanisms after the two compartments of the chamber are turned into one compartment.

The laser torch 6 is then accessible to the surface of the structure 1. In this case, the distance between the laser torch 6 and the surface of the structure is set at a suitable value by a distance monitoring mechanism 18, and a position of the laser torch 6 is set to a suitable value by a target portion monitoring mechanism 19 and the laser torch driving mechanism 11.

Figure 2:
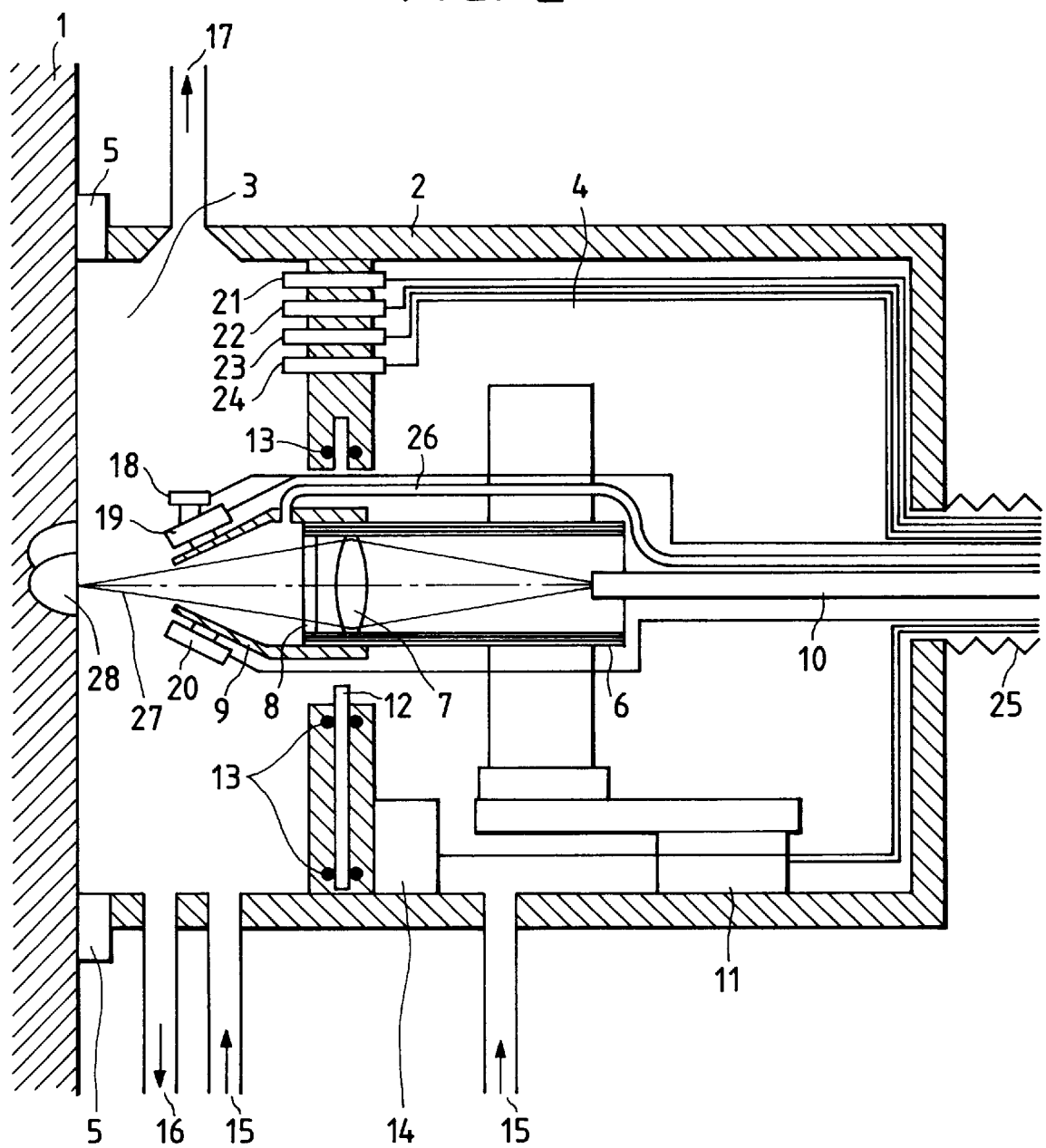
FIG. 2 is a sectional view of the system shown in FIG. 1 showing the state in which after access to the underwater structure, the system opens the shield plate and emits a laser beam to the underwater structure.

Next, as shown in FIG. 2, a laser beam 27 generated by a laser oscillator 69 is transmitted through an optical fiber element 10, and is emitted on the surface of the structure 1. The laser torch 6 is moved by the driving mechanism 11. For surface treatment, the laser torch 6 is moved by a specified distance and then moved at specified pitches for partially overlapping the target portions 28 with respect to each other. Finally, a surface treatment region is formed on the surface of the structure 1 surrounded by the chamber 2. The surface treatment region may be simultaneously processed using a plurality of laser torches.

Figure 10:
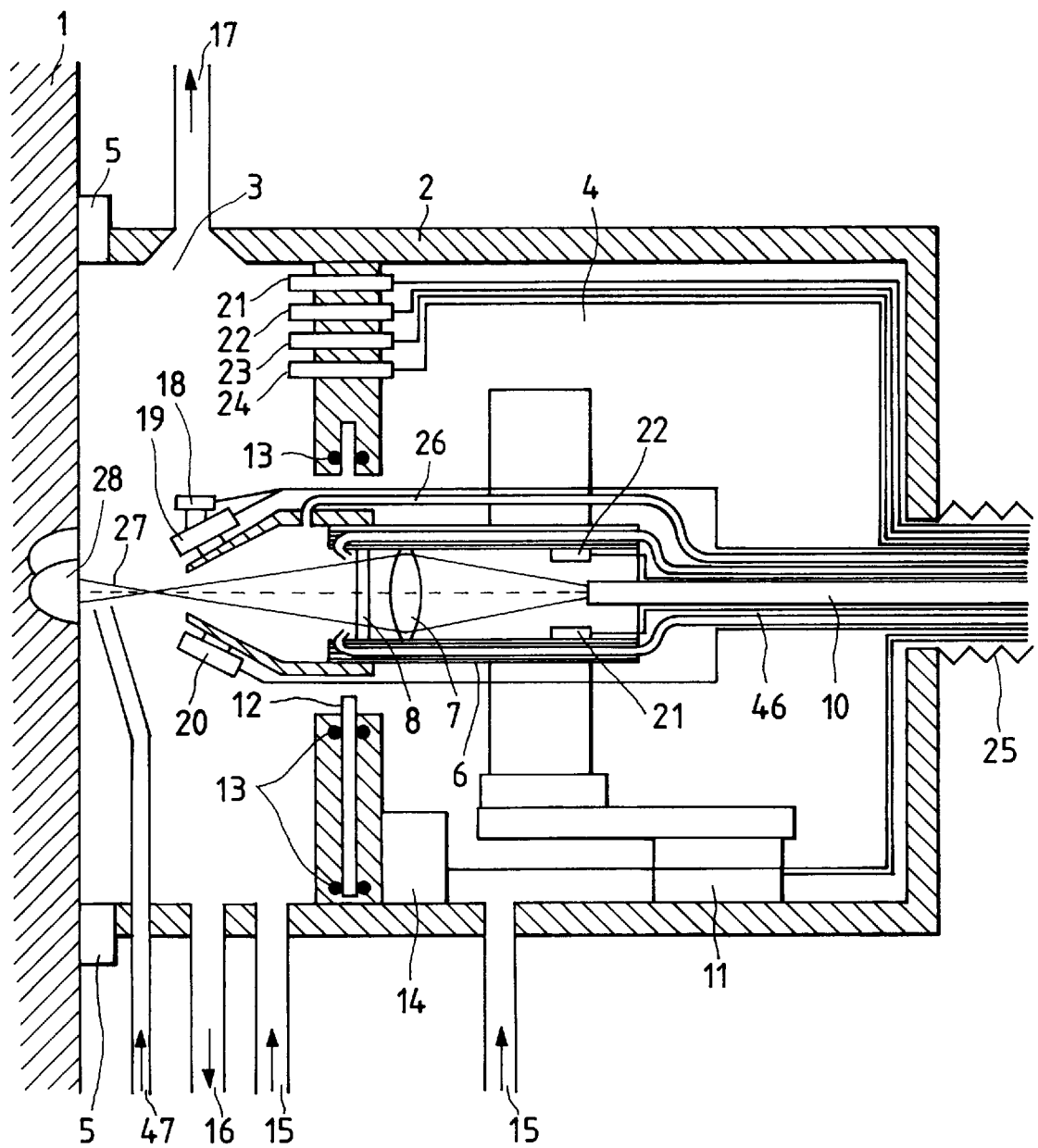
FIG. 10 is a sectional view of a chamber of a laser processing system, which has one or more gas injecting mechanisms for drying the interior of the chamber, a center gas shield mechanism for injecting a center gas from a nozzle at the leading end of a laser torch, and a side gas shield mechanism, and a gas injecting mechanism for controlling a temperature of the laser torch and for drying it.

During laser processing, a center gas is blown to the surface of the structure 1 through a nozzle 9 provided at the leading end of the laser emitting optics by a center gas shield mechanism 26 provided in the nozzle 9, for shielding the target portion 28. Incidentally, in a treatment, such as welding or surface treatment, in which the surface of the structure 1 is heated to a temperature more than the melting point or boiling point of the structure, evaporated material or fine particles are generated from the surface of the structure 1 during the treatment. In such a treatment, using only the above-described center gas shield is sometimes insufficient for perfectly removing the evaporated material or fine particles. In this case, there occur inconveniences in that the energy applied to the surface of the structure 1 is reduced by scattering of the laser beam due to the evaporated material or fine particles; the evaporated material or fine particles are deposited on the inner surface of the chamber 2 or the laser torch 6; and impurities are entrapped in the melted portion. To cope such inconveniences, a side gas is injected from the gas injecting mechanism 15 for shielding the target portion 28, and the evaporated material or fine particles are discharged to the outside of the chamber by the gas/duct exhausting mechanism 17. As shown in FIG. 10, a side gas shield mechanism 47 may be provided separately from the dry gas injecting mechanism 15. Moreover, during laser processing, the flow rate of the shield gas is controlled in a suitable range by the gas flow rate monitoring mechanism 24, to thus process the target portion without unevenness.

The center gas shield mechanism 26 is preferably used, as described above, in combination with the side gas shield mechanism 47; however, either of the mechanisms may be used singly if the quality of the processed portion can be ensured only by the one mechanism.

The target portion is monitored by a monitor 71 using the monitoring mechanism 19 during laser processing. The objects to be monitored include the surface of the structure 1, evaporated material or fine particles, or the laser torch. The monitoring mechanism 19 includes a means for detecting optical information generated from the object and a means for converting the optical information into an electric signal. The signal thus detected is processed in the form of either or combination of an image, temperature and spectrum. In addition, the means for detecting optical information may be integrated with the means for converting the optical information into an electric signal; or only the former means may be provided in the chamber 2, and the latter means may be provided outside the chamber 2 and connected to the former means. The above information may be detected while emitting a light beam to the above object from a light source 20.

The optical fiber element 10 for transmitting a laser beam, and respective transmission systems for the above monitoring mechanisms and drive mechanism pass through a transmission tube 25, to be thus shielded from a water environment outside the chamber. As shown in FIG. 1, the transmission tube 25 is formed of extensible bellows. The bellows may be replaced with other extensible members such as a rubber member. The transmission tube 25 is disposed in close contact with the wall of the chamber 2 and is extended up to the surface of the water. The transmission tube 25 and respective transmission systems may be enclosed by a connector 68 to increase the inner pressure of the chamber. With this transmission tube 25, the optical fiber element 10 and respective transmission systems for the monitoring mechanisms and driving mechanism are prevented from intrusion by water due to the capillary phenomenon. The extensible transmission tube 25 also prevents the optical fiber element 10 from being folded when the optical fiber element 10 is moved together with the laser torch during laser processing.

After completion of the laser processing in the chamber 2, the laser torch is returned to the position it occupied before access to the surface of the structure 1, and is further returned into the state shown in FIG. 1 by closing the shield plate 12 by actuation of the opening/closing mechanism 14. Next, the load applied onto the chamber 2 is released, and the contact portion of the chamber 2 is separated from the surface of the structure 1. In the case where the contact portion of the chamber has a vacuum mechanism, the vacuum mechanism is released. The chamber 2 is rendered movable, and is pulled up to the water surface 59 by the driving mechanism 60, as shown in FIG. 15, or is moved to the next access position. With a series of the above-described processing steps, a laser beam 27 is emitted on the structure 1 positioned under the water surface 59 with a horizontal posture, to form a surface treatment portion or welded portion on the surface of the structure 1. The same processing steps as described above are carried out even in the upward posture or downward posture, except that the driving direction or load imparting direction applied by the chamber driving mechanism is changed, as a result of which a surface treatment portion or welded portion can be similarly formed on the surface of the structure 1.

EMBODIMENT 2

In this embodiment, as shown in FIGS. 5 and 15, there is used a laser processing system of a type having a chamber partitioned into two compartments by means of a shield plate capable of transmitting a laser beam. The system is accessible to an underwater structure from a water surface and is operated with a horizontal posture to emit a laser beam onto the surface of the structure.

First, as shown in FIG. 15, a chamber 2 of the laser processing system of the present invention is attached to a structure 1 positioned underwater. Specifically, the chamber 2 is carried to a target portion of the structure 1 by a driving mechanism 60 for driving a chamber driving robot 61. The chamber driving robot 61 has a position monitoring mechanism 114, a vertical position adjusting mechanism 115 and a horizontal position adjusting mechanism 62 (longitudinal direction, in the figure). The chamber 2 is divided into two compartments, as shown in FIG. 1. The compartment including a laser torch and a laser torch driving mechanism is usually kept in air or a gas atmosphere by injecting air or a dry gas from a gas injecting mechanism 15.

A laser torch 6, as shown in FIG. 5, is composed of direct advance type optics; however, it may be composed of mirror-reflection type optics, as shown in FIG. 8.

The chamber 2 is then slid along a slide mechanism 63 by a horizontal load imparting mechanism 66 and a load adjusting mechanism 67, so as to closely contact the surface of the structure 1. An applied load is measured by a load cell 65, and is suitably controlled. A portion of the chamber 2, which is to contact the surface of the structure 1, includes one or two or more mechanisms of the type shown in FIG. 3, that is, a rubber-like or sponge-like packing mechanism 29, a vacuum mechanism 30, a high pressure air shield mechanism 31, a high pressure water shield mechanism 34, a wire brush mechanism 32, and a skirt mechanism 33 made of a carbon material (such as carbon fibers). With such a mechanism or mechanisms, the above portion of the chamber 2 closely contacts the surface of the structure in a watertight manner to prevent permeation of water from the surrounding region.

A water discharging mechanism 16 and the gas injecting mechanism 15 are then operated to discharge water in the compartment in contact with the surface of the structure 1 and to turn the interior of the compartment into a gas atmosphere. The injected gas may be a dry inert gas. Alternatively, a dry gas injecting mechanism may be provided separately from the gas injecting mechanism 15 for substituting a non-inert gas injected in the compartment for an inert gas thereby making the interior of the compartment a dry gas atmosphere. As shown in Fig. 5, the atmosphere in the compartment is monitored in terms of the gas flow rate, pressure, temperature and moisture by a gas flow rate monitoring mechanism 24, a pressure monitoring mechanism 23, a temperature monitoring mechanism 21, and a moisture monitoring mechanism 22, and is controlled to a suitable state by measuring/adjusting systems 72 to 75. For example, when the pressure of the gas atmosphere in the compartment is excessively high, it is adjusted as follows: Namely, in the case where the portion of the chamber in contact with the surface of the structure 1 includes a mechanism for discharging a gas or water from the interior of the chamber to the exterior while shielding the flow of a gas or water from the exterior, for example, the high pressure air shield mechanism 31, high pressure water shield 34, wire brush mechanism 32, or skirt mechanism 33 made of a carbon material, excessive gas is discharged to the outside of the chamber through the mechanism. On the other hand, in the case where the above portion of the chamber includes a close-contact mechanism, such as the packing mechanism 29 or vacuum mechanism 30 individually or in combination with the above shielding mechanism, excessive gas is discharged to the outside of the chamber through a gas exhausting mechanism 17. Thus, the interior of the compartment which contacts the surface of the structure is turned into a dry gas atmosphere, and at the same time water content is removed from the surface of the structure.

The laser torch 6 is then accessible to the surface of the structure 1. In this case, the distance between the laser torch 6 and the surface of the structure is set to a suitable value by a distance monitoring mechanism 18, and a position of the laser torch 6 is set to a suitable value by a target portion monitoring mechanism 19 and the laser torch driving mechanism 11.

A laser beam is emitted on the surface of the structure. In the case of FIG. 5, the laser beam passes through a shield plate 35. The laser torch 6 is moved by the driving mechanism 11. For surface treatment, the laser torch 6 is moved by a specified distance and then moved at specified pitches for partially overlapping the target portions 28 with respect to each other. Finally, a surface treatment region is formed on the surface of the structure 1 surrounded by the chamber 2. The surface treatment region may be simultaneously processed using a plurality of laser torches.

During laser processing, a target portion of the structure 1 is shielded by the gas shield mechanism 15. In the case where evaporated material or fine particles are generated from the surface of the structure 1, a side gas is injected from the gas injecting mechanism 15 for shielding the target portion, and the evaporated material or fine particles are discharged to the outside of the chamber by the gas/duct exhausting mechanism. As shown in FIG. 10, a side gas shield mechanism may be provided separately from the dry gas injecting mechanism 15. Moreover, during laser processing, the flow rate of the shield gas is controlled in a suitable range by the gas flow rate monitoring mechanism, to thus process the target portion without unevenness.

The target portion is monitored by a monitor 71 using the monitoring mechanism 19 during laser processing. The objects to be monitored include the surface of the structure 1, evaporated material or fine particles, or the laser torch. The monitoring mechanism 19 includes a means for detecting optical information generated from the object and a means for converting the optical information into an electric signal. The signal thus detected is processed in the form of either one or a combination of an image, temperature and spectrum. In addition, the means for detecting optical information may be integrated with the means for converting the optical information into an electric signal; or only the former means may be provided in the chamber 2, and the latter means may be provided outside the chamber 2 and connected to the former means. The above information may be detected while emitting a back light beam onto the above object.

After completion of the laser processing in the chamber 2, the laser torch is returned to the position it occupied before access to the surface of the structure 1, and is further returned to the state shown in FIG. 1 by closing the shield plate 12 by actuating the opening/closing mechanism 14. Next, the load applied onto the chamber 2 is released, and the contact portion of the chamber 2 is separated from the surface of the structure 1. In the case where the contact portion of the chamber has a vacuum mechanism, the vacuum mechanism is released. The chamber 2 is rendered movable, and is pulled up to the water surface by the chamber driving mechanism or moved to the next access position.

With a series of the above-described processing steps, a laser beam is emitted on the structure 1 positioned under water with a horizontal posture, to form a surface treatment portion or welded portion on the surface of the structure 1. The same processing steps as described above are carried out even in the upward posture or downward posture, except that the driving direction or load imparting direction applied by the chamber driving mechanism is changed, as a result of which a surface treatment portion or welded portion can be similarly formed on the surface of the structure 1.

EMBODIMENT 3

In this embodiment shown in FIGS. 6 to 8 and 16, there is used a laser processing system having two independent chambers. The system is mounted on an underwater structure from the water surface and is operated in a horizontal posture to emit a laser beam to the surface of the structure.

Figure 16:
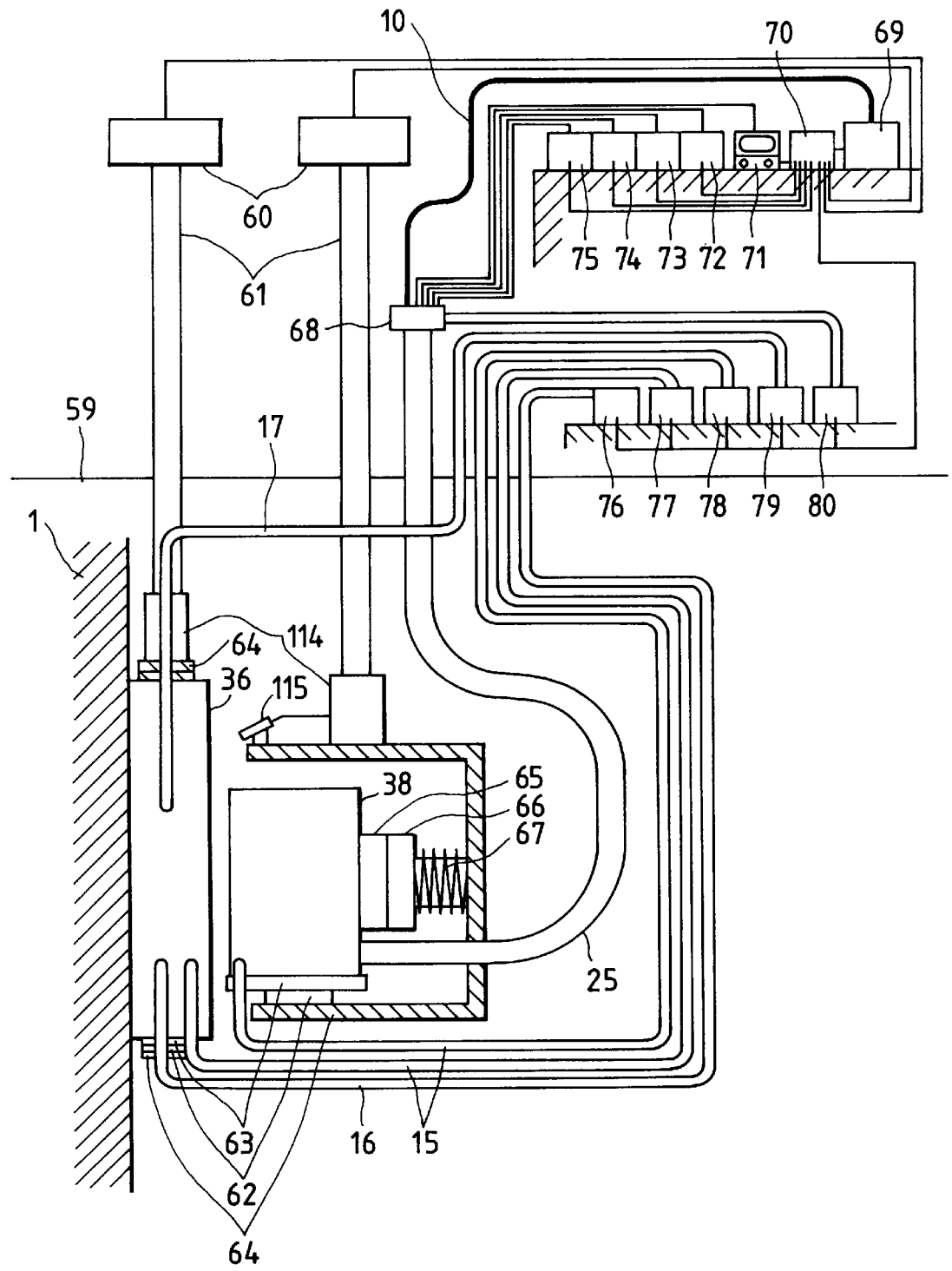
FIG. 16 is a sectional view showing the state in which a laser processing system having two independent chambers obtain access to an underwater structure in a horizontal posture.

First, as shown in FIG. 16, a chamber 36 (hereinafter, referred to as "chamber A") is carried by a chamber driving mechanism 60 so as to be placed in contact with a target portion of an underwater structure.

The chamber A is positioned in close contact with the surface of the structure 1 by a horizontal load imparting mechanism and a load adjusting mechanism provided on a chamber supporting base 64. The applied load is measured by a load cell, and is suitably controlled. A portion of the chamber 2, which is to be mounted in contact with the surface of the structure 1, includes one or two or more mechanisms of the type shown in FIG. 3, that is, a rubber-like or sponge-like packing mechanism 29, a vacuum mechanism 30, a high pressure air shield mechanism 31, a high pressure water shield mechanism 34, a wire brush mechanism 32, and a skirt mechanism 33 made of a carbon material (such as carbon fibers). With such mechanism or mechanisms, the above portion of the chamber 2 can be mounted in close contact with the surface of the structure so as to prevent permeation of water from the surrounding region.

A water discharging mechanism 16 and the gas injecting mechanism 15 are then operated to discharge water from the chamber A in contact with the surface of the structure 1 and to turn the interior of the compartment into a gas atmosphere. The injected gas may be a dry inert gas. Alternatively, a dry gas injecting mechanism may be provided separately from the gas injecting mechanism 15 for substituting a non-inert gas injected in the compartment for an inert gas thereby making the interior of the compartment a dry gas atmosphere. As shown in FIGS. 6 to 8, the atmosphere in the compartment is monitored and suitably controlled in terms of the gas flow rate, pressure, temperature and moisture by a gas flow rate monitoring mechanism 24, a pressure monitoring mechanism 23, a temperature monitoring mechanism 21, and a moisture monitoring mechanism 22. For example, when the pressure of the gas atmosphere in the compartment is excessively high, it is adjusted as follows: Namely, in the case where the portion of the chamber which contacts the surface of the structure 1 includes the mechanism for discharging a gas or water from the interior of the chamber to the exterior while shielding the flow of a gas or water from the exterior, for example, the high pressure air shield mechanism 31, high pressure water shield 34, wire brush mechanism 32, or skirt mechanism 33 made of a carbon material, excessive gas is discharged to the outside of the chamber through the mechanism. On the other hand, in the case where the above portion of the chamber includes a close-contact mechanism such as the packing mechanism 29 or vacuum mechanism 30 individually or in combination with the above shielding mechanism, excessive gas is discharged to the outside of the chamber through a gas exhausting mechanism. Thus, the interior of the compartment which is mounted on the surface of the structure is turned into a dry gas atmosphere, and at the same time water is removed from the surface of the structure.

Next, a chamber 38 (hereinafter, referred to as "chamber B") including a laser torch 6 and a laser torch driving mechanism 11 is disposed near a ceiling portion 37 of the chamber A. The interior of the chamber B is usually kept in an air or a gas atmosphere by the gas injecting mechanism 15. A chamber driving mechanism 60 for driving the chamber B is independent from a chamber driving mechanism 60 for driving the chamber A.

Here, the chamber B may be of a type in which the laser torch driving mechanism 11 is provided in the chamber B as shown in FIG. 6; or of a type in which the laser torch driving mechanism 11 is provided outside the chamber B and a laser torch fine adjustment mechanism 113 is provided in the chamber B. Moreover, as shown in FIG. 8, the laser emitting optics of the laser torch 6 may be of a reflection type using a reflection mirror 40. The following description will be made with respect to the system having the laser torch shown in FIG. 6.

The laser torch is made accessible to the surface of the structure 1 as shown in FIG. 6. For the laser processing performed with the chambers A and B kept independently, the laser torch 6 is accessed in this state. The distance between the laser torch 6 and the surface of the structure 1 is set at a suitable value by a distance monitoring mechanism 18, and the position of the laser torch 6 is set at a suitable value by a target portion monitoring mechanism 19 and the laser torch driving mechanism 11.

On the other hand, for the laser processing performed with the chambers A and B in close contact or integrated with each other, the chamber B is mounted on the ceiling portion 37 of the chamber A in the same manner as that used for bringing the chamber A in close-contact with the surface of the structure 1. In this case, if the ceiling portion 37 of the chamber A and the bottom portion 39 of the chamber B are made of a material capable of transmitting a laser beam, the laser torch 6 is accessed in this state; however, if either or both of the ceiling portion 37 of the chamber A and the bottom portion 39 of the chamber B have opening/closing mechanisms, as shown in FIG. 4, these opening/closing mechanisms are opened before the laser torch 6 is operated.

Next, a laser beam is emitted on the surface of the structure 1.

For the laser processing performed with the chambers A and B kept independently, since the ceiling portion 37 of the chamber A and the bottom portion 39 of the chamber B are made of a material capable of transmitting a laser beam, and also, since a laser beam transmits water when a YSG laser is used, the laser beam is emitted from the chamber B onto the surface of the structure through water and the chamber A. The laser torch 6 is moved by the laser torch driving mechanism 11. For surface treatment, the laser torch 6 is moved by a specified distance and then moved at specified pitches for partially overlapping the target portions with respect to each other. Finally, a surface treatment region is formed on the surface of the structure 1 surrounded by the chamber 2. The surface treatment region may be simultaneously processed using a plurality of laser torches.

For the laser processing performed with the chambers A and B in close contact or integrated with each other, in the case where the ceiling portion 37 of the chamber A and the bottom portion 29 of the chamber B are made of a material capable of transmitting a laser beam, a laser beam is emitted from the chamber B onto the surface of the structure 1 through the chamber A; and in the case where either or both of the ceiling portion 37 of the chamber A and the bottom portion 39 of the chamber B have opening/closing mechanisms, the opening/closing mechanisms are opened to turn the chambers A and B into one chamber as in the embodiment shown in FIG. 2, and then a laser beam is emitted on the surface of the structure 1.

During laser processing, a target portion of the structure 1 is shield by the gas shielded mechanism 15 in the chamber A. In the case where evaporated material or fine particles are generated from the surface of the structure 1, a side gas is injected from the gas injecting mechanism 15 for shielding the target portion, and the evaporated material or fine particles are discharged to the outside of the chamber by the gas/duct exhausting mechanism. A side gas shielded mechanism may be provided separately from the dry gas injecting mechanism 15. Moreover, during laser processing, the flow rate of the shield gas is controlled in a suitable range by the gas flow rate monitoring mechanism, to thus process the target portion without unevenness.

The target portion is monitored by a monitor 71 using the monitoring mechanism 19 during laser processing. The monitoring mechanism 19 may be disposed in a laser torch portion in the chamber B as shown in FIG. 6, or may be disposed in the chamber A.

After completion of the laser processing, the laser torch 6 is returned to the position it occupied before access to the surface of the structure 1, and the shield plate is closed. The load applied onto the chamber B is released, and the contact portion of the chamber B is separated from the chamber A. In the case where the contact portion of the chamber B has a vacuum mechanism, the vacuum mechanism is released. The chamber B is rendered movable, and is pulled up to the water surface 59 by the chamber driving mechanism 60 or moved to the next access position. Next, the contact portion of the chamber A is separated from the surface of the structure 1. In the case where the contact portion of the chamber A has a vacuum mechanism, the vacuum mechanism is released. The chamber A is rendered movable, and is pulled up to the water surface 59 by the chamber driving mechanism 60 or moved to the next access position.

With a series of the above-described processing steps, a laser beam is emitted on the structure 1 positioned under water in a horizontal posture, to form a surface treatment portion or welded portion on the surface of the structure 1. The same processing steps as described above are carried out even in the upward posture or downward posture, except that the driving direction or load imparting direction applied by the chamber driving mechanism is changed, as a result of which a surface treatment portion or welded portion can be similarly formed on the surface of the structure 1.

EMBODIMENT 4

In a laser processing system having laser emitting optics which are controlled in temperature and dried upon emission of a laser beam to the surface of an underwater structure various laser systems may be employed, as seen in FIGS. 9A to 9E.

FIGS. 9A to 9E are sectional views of laser torches each having a means for controlling the temperature of laser emitting optics and drying it upon emission of a laser beam to the surface of an underwater structure.

Figure 9A:
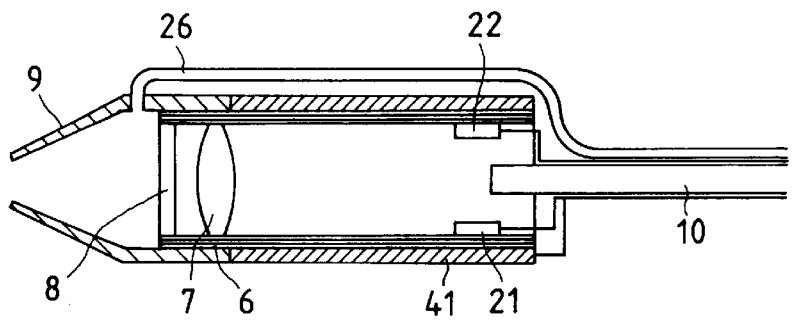
FIGS. 9A to 9E are sectional views of laser torches having mechanisms for controlling the temperature of the laser emitting optics and to effect drying thereof.

FIG. 9A shows a laser torch 6 having a high frequency heating mechanism 41, a temperature monitoring mechanism 21 and a moisture monitoring mechanism 22 provided around the outer periphery of the laser torch 6. The laser emitting optics of the laser torch 6 are heated by the high frequency heating mechanism 41. The temperature of the laser emitting optics is monitored by the temperature monitoring mechanism 21 so as not to be less by 30° C. or more than the temperature of the water environment, or not to be more than 200° C. When it is less by 30° C. or more than the temperature of the water environment, prevention of dew formation becomes insufficient. On the other hand, when it is more than 200° C., the laser emitting optics is excessively heated, and consequently, there occurs an inconvenience in laser processing due to deformation of a condensing lens or the like. The laser emitting optics are also monitored for moisture by the moisture monitoring mechanism 22 and controlled to be in a suitable dry state. With these mechanisms, the dew formation or the like of the laser emitting optics can be prevented upon access of the laser processing system or upon laser processing using the system.

Figure 9B:
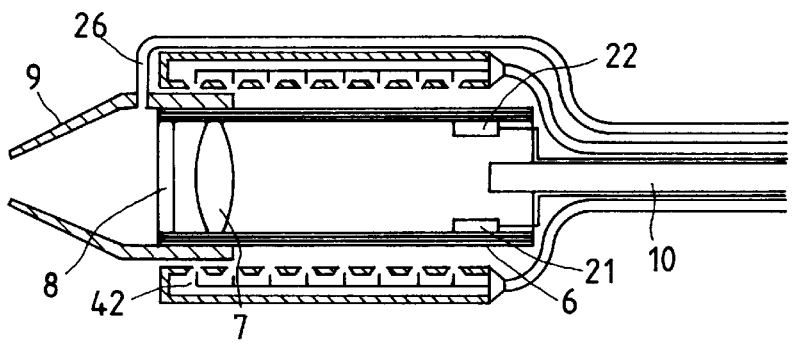
Figure 9C:
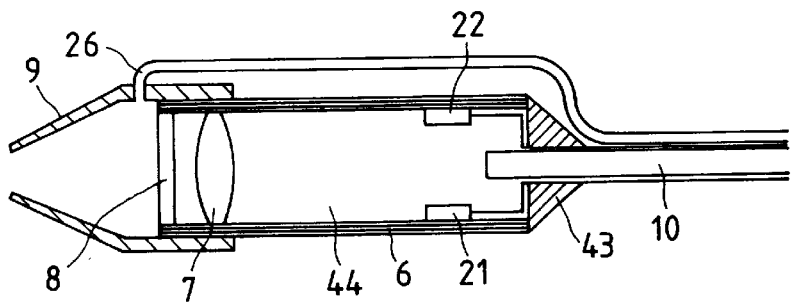

FIG. 9B shows a laser torch 6 including a gas injecting mechanism 42 for blowing, to the outer periphery portion of the laser torch, the same gas as that used for turning the interior of the chamber of the laser processing system into a dry atmosphere, as well as the above temperature monitoring mechanism 21 and moisture monitoring mechanism 42. The laser emitting optics of the laser torch 6 is controlled in temperature and dried by blowing a dry gas controlled in temperature thereto. The laser emitting optics are monitored in temperature by the temperature monitoring mechanism 21 and controlled to be in the above-described temperature range, and they are monitored for moisture by the moisture monitoring mechanism 22 and controlled to be in a suitable dry state. With these mechanisms, the dew formation or the like of the laser emitting optics can be prevented upon access of the laser processing system or upon laser processing using the system.

FIG. 6C shows a laser torch 6 having a mechanism 43 for enclosing the interior of the laser torch 6 filled in a gas atmosphere. The interior of the laser torch 6 is enclosed in such a state as to be filled in a dry gas atmosphere in the above-described temperature range. With this mechanism, the dew formation or the like of the laser emitting optics can be prevented upon access of the laser processing system or upon laser processing using the system.

Figure 9D:
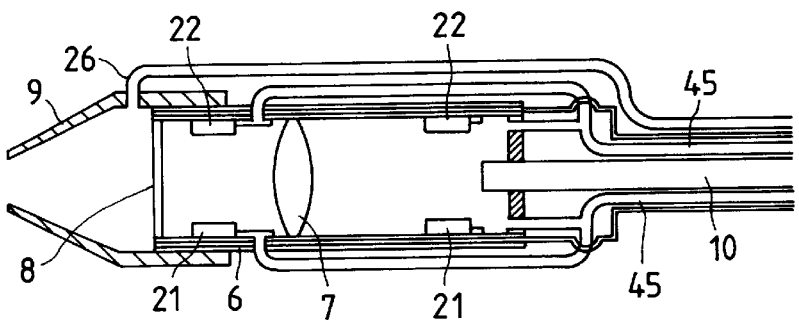

FIG. 9D shows a laser torch 6 having a gas injecting/exhausting mechanism 45 for circulating a gas in the laser torch, and the above temperature monitoring mechanism 21 and moisture monitoring mechanism 22. With this gas injecting/exhausting mechanism 45 for injecting a dry gas into the laser torch 6 and discharging the excessive gas, the interior of the laser torch 6 is turned into a dry gas atmosphere. The laser emitting optics are monitored in temperature by the temperature monitoring mechanism 21 and controlled to be in the above-described temperature range, and they are monitored for moisture by the moisture monitoring mechanism 22 and controlled to be in a suitable dry state. With these mechanisms, the dew formation or the like of the laser emitting optics can be prevented upon access of the laser processing system or upon laser processing using the system.

Figure 9E:
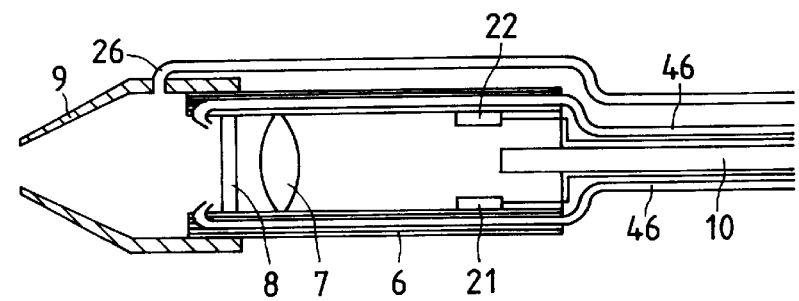

FIG. 9E shows a laser torch 6 including a shield plate 8 capable of transmitting a laser beam, a gas injecting mechanism 46 for blowing a gas onto the shield plate 8, as well as the above temperature monitoring mechanism 21 and moisture monitoring mechanism 22. The shield plate 8, which is capable of transmitting a laser beam, does not exert any adverse effect on laser processing. And, by blowing a dry gas to the shield plate 8, dew formation or the like of laser emitting optics is prevented. The laser emitting optics are monitored in temperature by the temperature monitoring mechanism 21 and controlled to be in the above-described temperature range, and they are monitored for moisture by the moisture monitoring mechanism 22 and controlled to be in a suitable dry state. With these mechanisms, the dew formation or the like of the laser emitting optics can be prevented upon access of the laser processing system or upon laser processing using the system.

Two or more of the above-described arrangements shown in FIGS. 9A to 9E for controlling the temperature of the laser emitting optics and drying it may be used at the same time.

EMBODIMENT 5

In this embodiment shown in FIG. 10, there is used a laser processing system including two or more mechanisms: a gas injecting mechanism for drying the interior of the chamber; the side gas shield mechanism for removing evaporated material or fine particles generated from the surface of an underwater structure; the center gas shield mechanism for injecting a gas from the leading end of the laser torch onto the surface of the structure; and the gas injecting mechanism for drying the interior of the laser torch. The system is mounted in an underwater structure from a water surface and is operated in a horizontal posture to emit a laser beam onto the surface of the structure while injecting a gas from two or more of the above-described mechanisms.

FIG. 10 is a sectional view of a laser processing system including: laser emitting optics; a distance monitoring mechanism 18 and a driving mechanism 11 for the laser emitting optics; a monitoring mechanism 19 and an having a position monitoring mechanism 114, a vertical position adjusting mechanism 115 and a horizontal position adjusting mechanism 62 (longitudinal direction, in the figure). The chamber 2 is divided into two compartments. The compartment which includes a laser torch and a laser torch driving mechanism is usually kept in an air or a gas atmosphere by injecting air or a dry gas from a gas injecting mechanism 15.

The chamber 2 is then slid along a slide mechanism 63 by a horizontal load imparting mechanism 66 and a load adjusting mechanism 67 so as to be in close contact with the surface of the structure 1. An applied load is measured by a load cell 65, and is suitably controlled. A contact portion of the chamber 2 is maintained in close contact with the surface of the structure so as to prevent permeation of water from the surrounding region, using the mechanism or mechanisms described in Embodiment 1.

A water discharging mechanism 16 and the gas injecting mechanism 15 are then operated to discharge water in the compartment in contact with the surface of the structure 1 and to turn the interior of the compartment into a gas atmosphere. The atmosphere in the compartment is monitored in terms of the gas flow rate, pressure, illuminating mechanism 20 for a target portion to be processed; a shield plate 12 for partitioning the chamber of the system and a shield plate driving mechanism 14; a water discharging mechanism 16; a gas flow rate monitoring mechanism 24; a pressure monitoring mechanism 23; a temperature monitoring mechanism 21; a moisture monitoring mechanism 22; a gas injecting mechanism 15 for drying the interior of a compartment 4 having a laser torch 6; a center gas shield mechanism 26 for injecting a gas from a nozzle 9 provided at the leading end of the laser torch 6; a gas injecting mechanism 46 for controlling the temperature of the laser torch 6 and drying it; a gas injecting mechanism 15 for drying a compartment 3 to be mounted in contact with the surface of an underwater structure; a side gas shield mechanism 47 for removing evaporated material or fine particles generated from the surface of the structure upon laser processing; and a gas/dust exhausting mechanism 17.

First, as in the embodiment shown in FIG. 15, a chamber 2 of the laser processing system of the present invention is attached to a structure 1 positioned underwater. Specifically, the chamber 2 is carried to a target portion of the structure 1 by a driving mechanism 60 with the bottom portions having shapes corresponding to those of the surfaces of the structures; however, they can be effectively processed using only one kind of chamber mounted with each of the above-described jigs.

EMBODIMENT 7

In this embodiment, one example of applications of the laser processing methods described in Embodiments 1 to 6 to surface treatment for a structure in a pressure vessel of a nuclear reactor, which is performed by remote control from the exterior of the pressure vessel, will be described with reference to FIGS. 1 and 19 to 23. More specifically, when a weld heat-affected zone near a peripheral weld portion on the inner side of a core shroud in the pressure vessel is sensitized, the sensitized portion is subjected to surface treatment by laser processing for improving the corrosion resistance or stress corrosion cracking resistance of the sensitized portion.

The pre-treatment for laser processing and the access of the laser processing system of the present invention to the inner surface of a shroud 93 will be described with reference to FIG. 19. First, an upper lid of a pressure vessel 91 is taken out, followed by sequential removal of a steam seasoning apparatus, a steam separator and a fuel temperature and moisture by a gas flow rate monitoring mechanism 24, a pressure monitoring mechanism 23, a temperature monitoring mechanism 21, and a moisture monitoring mechanism 22. When the pressure of the gas atmosphere in the compartment is excessively high, the excessive gas is discharged to the outside of the chamber through the gas exhausting mechanism. Thus, the interior of the compartment in contact with the surface of the structure is turned into a dry gas atmosphere, and at the same time water is removed from the surface of the structure.

Next, as shown in FIG. 4, the shield plate 12 is opened by a shield plate driving mechanism 14, to turn the interior of the chamber into one space. When either of the pressure, temperature and moisture of the gas atmosphere is changed after the two compartments of the chamber are turned into one compartment by operation of the opening/closing mechanism 14, it is controlled to a suitable value by each monitoring mechanism.

The laser torch 6 is then accessible to the surface of the structure 1. The laser torch 6 is controlled in temperature and dried by the gas injecting mechanism 46 for controlling the temperature of the laser torch and drying it, and accordingly, as described in Embodiment 4, the laser emitting optics are protected from dew formation and hazing. Moreover, the distance between the laser torch 6 and the surface of the structure is set at a suitable value by a distance monitoring mechanism 18, and a position of the laser torch 6 is set at a suitable value by a target portion monitoring mechanism 19 and the laser torch driving mechanism 11.

Next, a laser beam is emitted on the surface of the structure 1. The laser torch 6 is moved by the driving mechanism 11. For surface treatment, the laser torch 6 is moved by a specified distance and then moved at specified pitches for partially overlapping the target portions with respect to each other. Finally, a surface treatment region is formed on the surface of the structure 1 surrounded by the chamber 2. The surface treatment region may be simultaneously processed using a plurality of laser torches.

In a treatment, such as welding or surface treatment, the surface of the structure 1 is heated to a temperature more than the melting point or boiling point of the structure, and evaporated material or fine particles are generated from the surface of the structure 1 during the treatment. In such a treatment, only the above-described center gas shield is sometimes insufficient for perfectly removing the evaporated material or fine particles. In this case, there occur inconveniences in that an energy applied to the surface of the structure 1 is reduced by scattering of a laser beam due to the evaporated material or fine particles; the evaporated material or fine particles are deposited on the inner surface of the chamber 2 or the laser torch 6; and impurities are entrapped in the melted portion. To cope such inconveniences, a side gas is injected from the side gas injecting mechanism 47 for shielding the target portion 28, and the evaporated material or fine particles are discharged to the outside of the chamber by the gas/duct exhausting mechanism 17. With this center gas shield mechanism 16 used in combination with the side gas shield mechanism 47, the target portion is shielded and also the contamination in the chamber 2 is prevented.

EMBODIMENT 6

Figure 11A:
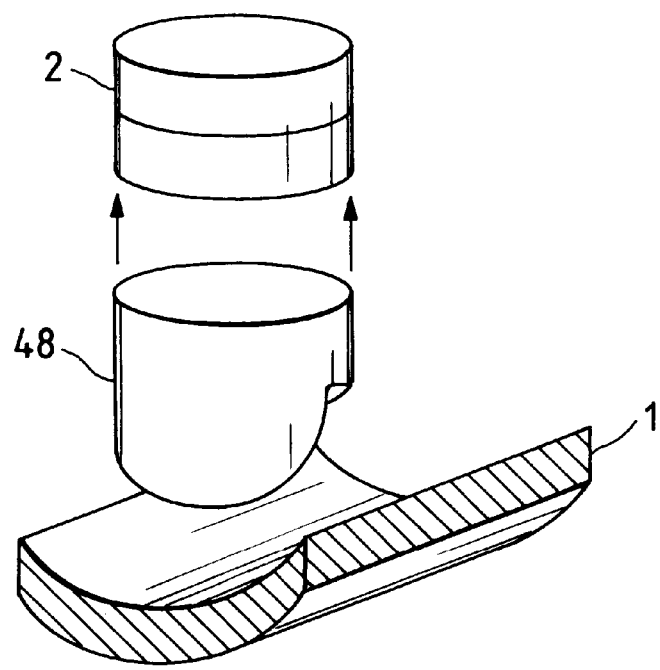
FIGS. 11A and 11B are schematic views each showing the state in which a chamber mounted with a chamber jig is accessed through a tubular structure.
Figure 11B:
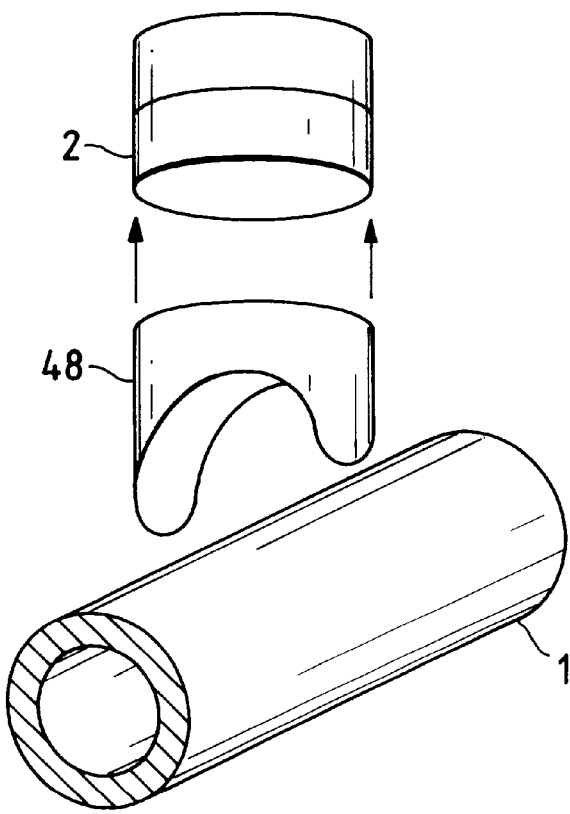

In this embodiment shown in FIGS. 11A and 11B, there is used a laser processing system for emitting a laser beam onto the surface of an underwater structure, which includes a jig removably provided on a base member of a chamber of the system, wherein the bottom of the jig to be mounted in contact with the surface of an underwater structure is formed in a shape having a curvature corresponding to that of the surface of the structure.

FIGS. 11A and 11B show a jig used to obtain access to the inner side of a tubular structure, such as a shroud in a pressure vessel of a nuclear reactor, and a jig used to be accessible to the outer periphery of a tubular weld structure such as a fillet weld portion between a CRD housing and a CRD stub tube, respectively. The chamber of the system has the same structure as shown in FIGS. 1 to 10, except that the mechanism shown in FIG. 3 is provided not on the bottom portion of the chamber but on the bottom portion of the jig.

The jig 48 is in close contact and integrated with the base member 2 of the chamber by a screw, packing or magnetic means before laser processing. The bottom portion of the jig 48 has a shape corresponding to that of the surface of the structure 1, so that it can be mounted in tight contact with the surface of the structure 1; and further it has the mechanism shown in FIG. 3, so that the permeation of water is prevented when the jig is in contact with the surface of the structure 1.

Structures may be processed using respective chambers channel, and a control rod is pulled from the lower side of the pressure vessel 91. A neutron detector is also pulled from the lower side of the pressure vessel 91, as needed. Thus, as shown in FIG. 19, a core portion is filled with water. A target portion on the inner surface of the shroud is then pre-treated by mechanically removing an oxide film and a metallic luster portion on the surface of the target portion using a motor-driven sanding device.

The laser processing system is then mounted on the target portion. Here, the laser processing system is of a type described in Embodiment 1 which has a chamber divided into two compartments by a shield plate 12 provided with an opening/closing mechanism 14. Also, the laser processing in this embodiment can be carried out using a chamber driving mechanism having a load imparting mechanism described in Embodiment 1, and in such a case, the laser processing can be performed using the same steps as described in Embodiment 1. In this embodiment, however, the size of the chamber and the chamber driving mechanism of the system is limited to a value which will allow it to pass through an interval between grids of an upper grid plate. Accordingly, in this embodiment, the load imparting mechanism having a relatively large space is removed from the chamber driving mechanism, and instead a supporting pillar including a secondary arm is provided for imparting a load on the chamber by an extensible mechanism of the secondary arm. With this mechanism, the size of the chamber can be enlarged by removal of the load imparting mechanism, to increase the movement range of a laser torch in the chamber, thus shortening the processing time.

Figure 20:
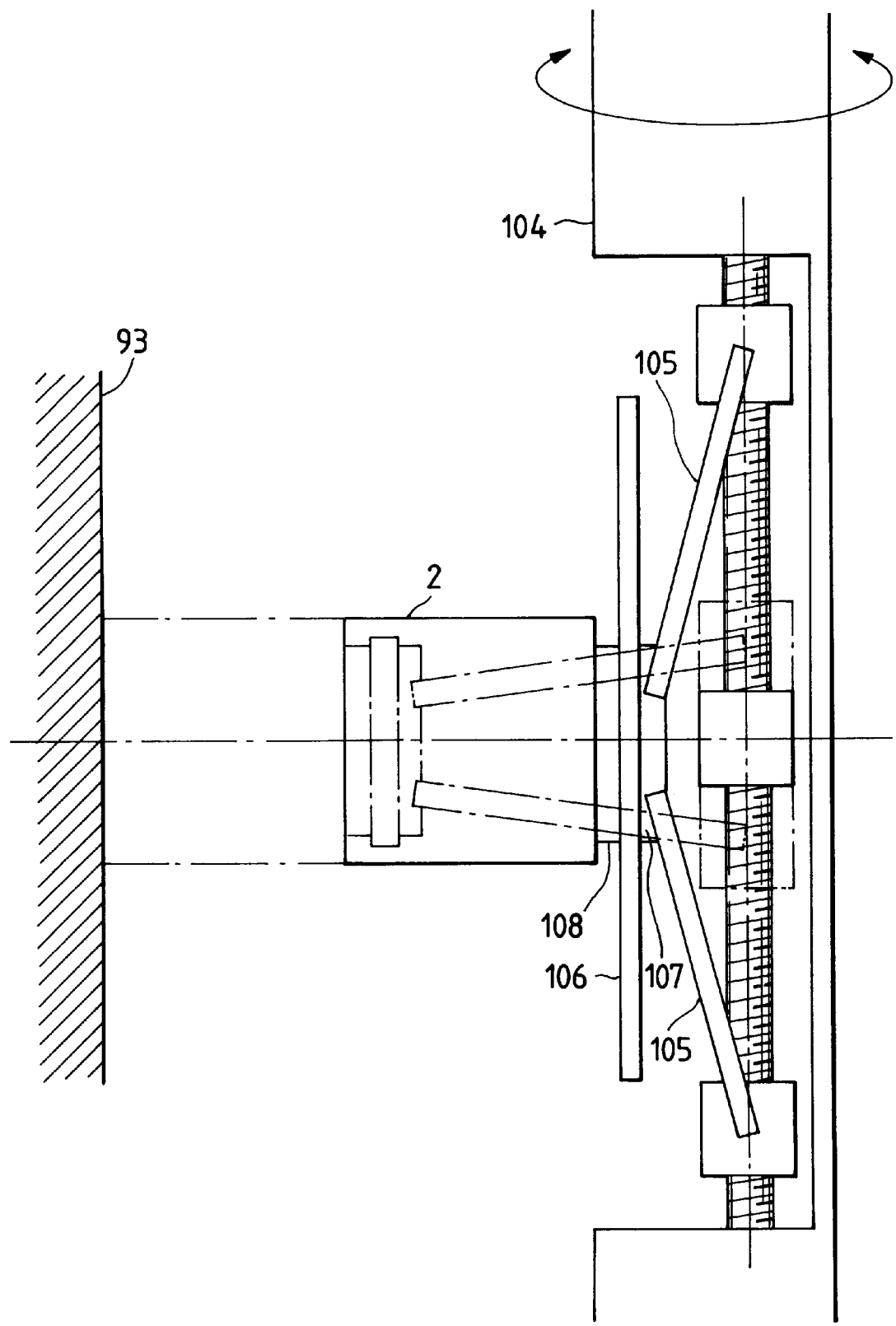
FIG. 20 is a side view of a structure in which a chamber is integrated with a secondary arm provided on a supporting pillar.
Figure 21:
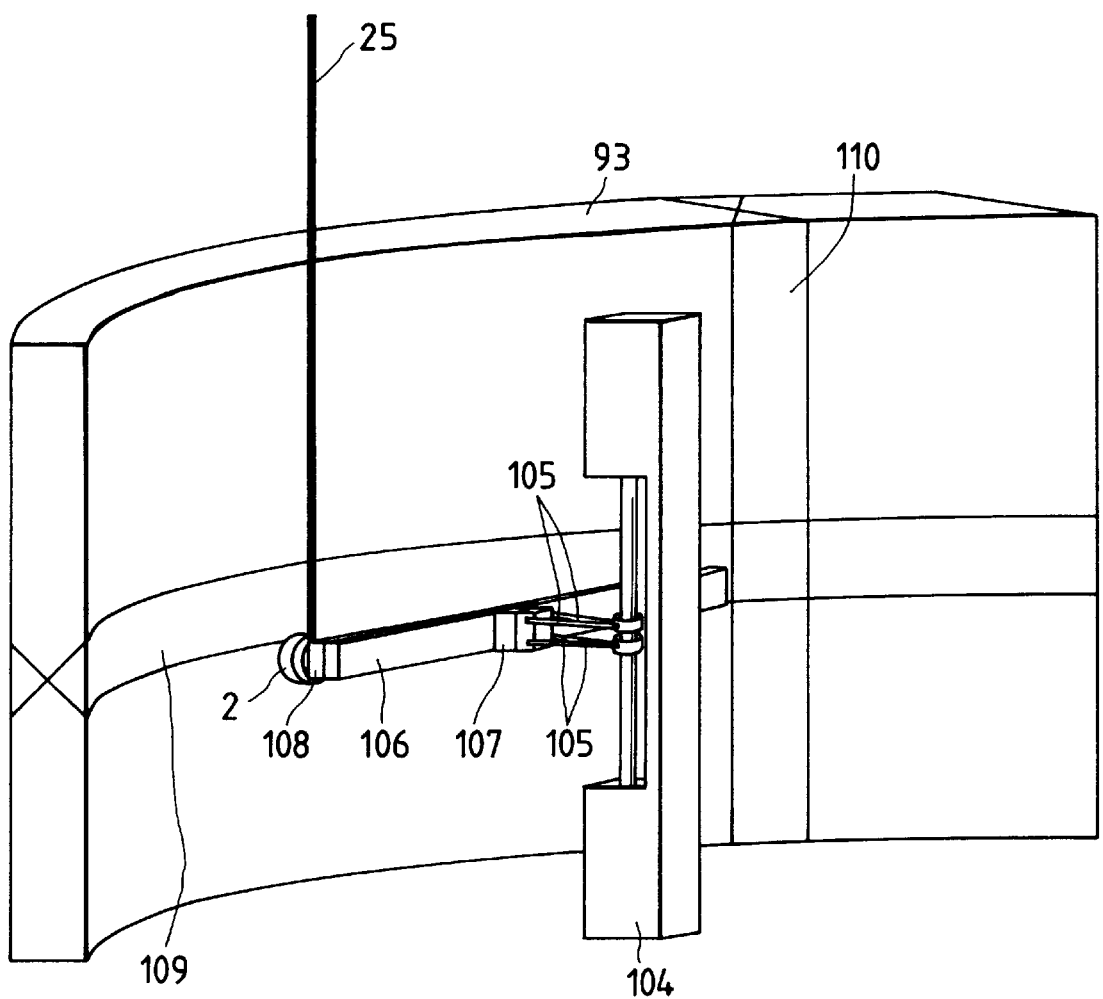
FIG. 21 is a schematic side view showing the state in which a chamber integrated with the secondary arm gains access to the inner surface of a shroud.

Referring to FIGS. 19 to 21, a supporting pillar 104 having a secondary arm 105 is inserted in the core portion. Here, the thickness of the supporting pillar 104 is set at a value which will allow it to pass through an interval between grids of an upper grid plate 92. The secondary arm 105 has an extensible mechanism which is extensible in the direction perpendicular to the supporting pillar 104. The leading end of the secondary arm 105 can be integrated with the chamber 2 by means of an electromagnet mechanism 108. The secondary arm 105 also has a slide mechanism 106 along which the chamber 2 integrated with the secondary arm 105 can be slid, and a turning mechanism 107 for turning the slide mechanism 106, which is introduced in the vertical posture, in the direction where the chamber 2 is slid along a peripheral weld portion 109 of the shroud 93.

The chamber 2 having laser emitting optics is disposed on a target portion on the inner surface of the shroud 93 by a chamber driving mechanism 100. The chamber 2 is integrated with a chamber driving robot 101 by an electromagnet mechanism. The laser processing system used for surface treatment in this embodiment has, as in the embodiment shown in FIG. 1, a chamber divided into two compartments by means of a shield plate having an opening/closing mechanism. One compartment, which is usually kept in an air or gas atmosphere, includes the laser emitting optics, a position adjustment/driving mechanism for the laser emitting optics, a shield plate opening/closing mechanism, a shield gas injecting mechanism, a target portion monitoring mechanism, and a target portion illuminating mechanism. The other compartment, which is to be mounted in contact with the surface of a structure in a water environment, includes a water discharging mechanism, a gas injecting mechanism, a gas/dust exhausting mechanism, a gas flow rate monitoring mechanism, a gas pressure monitoring mechanism, a temperature monitoring mechanism, and a moisture monitoring mechanism. The driving/control of these mechanisms are performed in a remote control chamber. The remote control chamber provided outside the pressure vessel contains, as shown in FIG. 15, a laser oscillator 69, each control system 70, measuring/adjusting systems 72 to 75 for measuring/adjusting the temperature, moisture, pressure and gas flow rate in the chamber, adjusting systems 76 to 80 for adjusting the water discharging mechanism, gas/dust exhausting mechanism and various gas mechanisms, and a monitor 71. A laser beam is generated by the laser oscillator, being transmitted to an optical fiber element through incoming optics, and is emitted from the laser emitting optics through a fiber connecting mechanism. The introduction of the supporting pillar, driving of the secondary arm, driving of the chamber, position adjustment/ driving of the laser emitting optics, opening/closing of the shield plate, injection of a shield gas, monitoring of the target portion, illumination of the target portion, discharge of water, injection of a gas, exhaustion of gas/dust, monitoring of a gas flow rate, monitoring of a gas pressure, monitoring of a temperature, and monitoring of moisture are also remotely controlled by respective control mechanisms provided in the remote control chamber. In addition, as described in Embodiment 6, it is effective to previously mount a jig 48 having a shape corresponding to that of the inner surface of the shroud 93 on the bottom of the chamber 2.

As shown in FIG. 20, the secondary arm 105 provided on the supporting pillar 104 is extended to integrate the leading end of the arm 105 with the chamber 2 by means of the electromagnet mechanism 108. The chamber 2 is then imparted with a load by the extensible mechanism of the secondary arm 105, so as to be placed in close contact with the surface of the shroud 93. The load is measured by a load cell and is controlled in a suitable value, as described in Embodiment 1. After the chamber 2 is integrated with the leading end of the arm 105, the chamber driving robot 101 is separated from the chamber 2 by turn-off of the electromagnet mechanism, and is then returned to the water surface. After that, the chamber 2 is moved by the driving mechanism of the secondary arm and the slide mechanism at the leading end of the arm. As shown in FIG. 21, for laser processing performed along the peripheral weld portion 109 on the inner surface of the shroud 93, after the secondary arm 105 is extended, the slide mechanism 106 is turned in the direction along the weld portion 109 by the turning mechanism 107.

Next, a series of processing steps such as discharge of water in the chamber, injection of a shield gas, control of the atmosphere, opening of the shield plate, access of a laser torch, and emission of a laser beam are performed in the same manner as described in Embodiment 1 shown in FIGS. 1 and 15.

As is well-known, laser processing performed in a specified condition (emission energy density: 1.0 to 100 J/mm, cooling rate: 103 to 107° C./s, or solidified cell size: 0.1 to 3.0 μm) is effective to recover the sensitization of a target portion and improve the corrosion resistance or stress corrosion cracking resistance thereof, and to prevent the seasonal deterioration in corrosion resistance or stress corrosion cracking resistance for an operational period of a plant after laser processing. Moreover, in this embodiment, the method of gas-shielding the laser emitting optics or the method of controlling the temperature of the laser emitting optics and drying it, described in Embodiments 4 and 5, may be additionally used for preventing inconveniences such as dew formation during laser processing.

After a surface-treated region 112 is formed within the chamber 2 by laser processing, the chamber 2 is rendered movable in the same manner as described in Embodiment 1, and is then moved to the next target portion by the slide mechanism 106 at the leading end of the secondary arm 105. Thus, a series of the above-described processing steps are repeated until a final surface-treated region is formed on the inner surface of the shroud 93.

Figure 22:
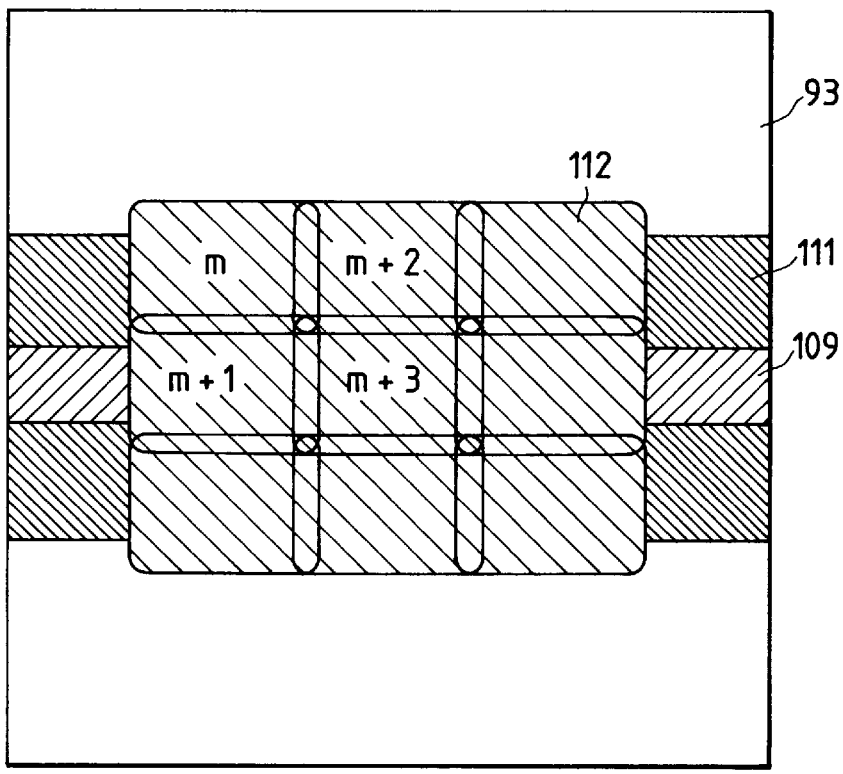
FIG. 22 is a schematic diagram of the surface of a shroud on which laser processed segments are partially overlapped.
Figure 23:
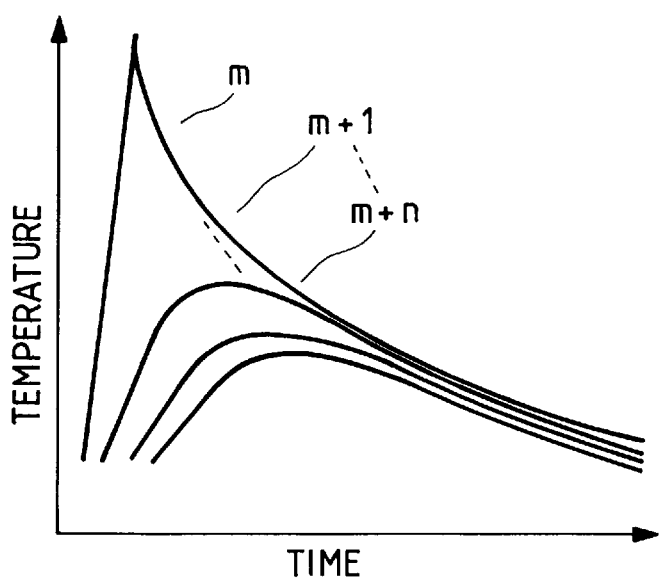
FIG. 23 is a graph showing a thermal history in which the thermal effects upon processing are superimposed in a segment unit.

The chamber 2 may be continuously moved such that the surface-treated regions 112 are partially overlapped with respect to each other as shown in FIG. 22. However, a portion 116 where the adjacent surface-treated regions 112 are overlapped with respect to each other receives an excessive heat input, and in some cases, the residual tensile strength at the portion 116 is increased. In such a case, the surface-treated region 112 in the chamber 2 is taken as a segment, and the chamber 2 is discontinuously moved for finally forming a processed region without any gap by partially overlapping the segments with respect to each other. At this time, an algorithm is set such that the maximum value of the heat input of each portion 116 where the adjacent segments are overlapped with respect to each other, that is, the total of heat histories applied during a period from m-th processing to (m+n)-th processing, is minimized (see FIG. 23). Here, for surface treatment for sensitization due to precipitation of Cr carbides, the total of the heat histories in a temperature range of from 500 to 850° C. is minimized; while for surface treatment for embrittlement at grain boundaries due to aggregation of He at grain boundaries, the total of the heat histories in a temperature range of from 900 to 1100° C. is minimized. Moreover, in terms of residual tensile stress, an algorithm is set such that the maximum value of the generated residual stresses is minimized. By carrying out a series of processing steps on the basis of the order determined by the above-described algorithm, it becomes possible to reduce the sensitivity against deterioration in corrosion or stress corrosion cracking at the portion where the adjacent surface-treated regions are overlapped with respect to each other.

After the chamber 2 is moved up to the movement limit of the slide mechanism 106 provided at the leading end of the secondary arm 105, it is returned to the original position. When the chamber 2 is accessed to the next target portion, a series of the above-described processing steps may be repeated after turning of the supporting pillar 104. However, when the processing is performed along the weld heat-affected zone 111 near the peripheral weld portion 109 of the shroud 93 by moving the chamber 2 around the inner surface of the shroud 93, there sometimes occurs a fear that the transmission tube 25 passing through an interval between grids of the upper grid plate 92 at the time of the first access will contact the upper grid plate 92 and become damaged, or there sometimes occurs a necessity of replacing components for a long period of processing. At this time, the processing is carried out in the following manner.

First, the chamber driving robot 101 shown in FIG. 19 is attached to the chamber 2 again, to be integrated therewith. The leading end of the secondary arm 105 shown in FIG. 20 is then separated from the chamber 2. The chamber 2 is allowed to pass through an interval between grids of the upper grid plate 92 by the chamber driving mechanism 100, and is returned to the remote control chamber 98 located outside the pressure vessel 91. When a component such as the optical fiber element is deteriorated, it is replaced with a new one.

The chamber driving robot 101 is moved again, and is accessed from such a position of the upper grid plate 92 as to be desirable for the subsequent processing, to dispose the chamber 2 on a target portion (not processed) on the inner surface of the shroud 93.

The secondary arm 105 is extended again to integrate the leading end of the arm 105 with the chamber 2 by means of the electromagnet mechanism 108, and after the chamber 2 is imparted with a load, the chamber driving robot 101 is separated from the chamber 2. Thereafter, the above-described processing steps are repeated.

With the above-described processing steps, the surface-treated portions 112 are formed on the whole weld heat-affected zone 111 near the peripheral weld portion 109 around the inner surface of the shroud 93, to thus improve the corrosion resistance and stress corrosion cracking resistance of the weld heat-affected zone 111.

Even in the case of using the laser processing system having a chamber divided into two compartments by means of a shield plate capable of transmitting a laser beam as described in Embodiment 2, surface-treated portions can be similarly formed on the whole weld heat-affected zone near the peripheral weld portion around the inner surface of the shroud in the same manner as described above.

In the case of using the laser processing system having two independent chambers described in Embodiment 3, the chamber to be mounted in contact with the surface of a structure is placed in contact with a target portion by the above-described chamber driving mechanism, and the chamber including a laser torch and a laser torch driving mechanism mounted on the leading end of the secondary arm provided on the supporting pillar is positioned so as to be accessible to the target portion. After access of the chambers, by the same processing steps as described above, surface-treated portions are formed on the whole weld heat-affected zone near the peripheral weld portion around the inner surface of the shroud.

EMBODIMENT 8

In this embodiment, another example of applications of the laser processing methods described in Embodiments 1 to 6 to surface treatment for a structure in a pressure vessel of a nuclear reactor, which is performed from the exterior of the pressure vessel, will be described with reference to FIGS. 19, 20, and 22 to 24. More specifically, in this embodiment, when a weld heat-affected zone near an axial weld portion on the outer side of a core shroud in the pressure vessel is sensitized, the sensitized portion is subjected to surface treatment using the laser processing system including a chamber driving mechanism having a load imparting mechanism for improving the corrosion resistance or stress corrosion cracking resistance of the sensitized portion.

The pre-treatment for laser processing and the access of the laser processing system to the outer surface of a shroud 93 will be described. First, an upper lid of a pressure vessel is taken out, followed by sequential removal of a steam seasoning apparatus, a steam separator and a fuel channel, and a control rod is pulled from the lower side of the pressure vessel. A neutron detector is also pulled from the lower side of the pressure vessel, as needed. The core portion is thus filled with water. Next, as described in Embodiment 7, a target portion on the outer surface of the shroud 93 is pre-treated by mechanically removing an oxide film and a metallic luster portion on the surface of the target portion using a motor-driven sanding device.

The laser processing system is then mounted on the target portion. In the case of laser processing for the outer surface of the shroud 93, the size of the chamber 2 and the chamber driving mechanism 101 is not limited to a value which will allow it to pass through an interval between grids of the upper grid plate. Accordingly, in place of the means, described in Embodiment 7, of imparting a load on the chamber 2 using the extensible mechanism of the secondary arm provided on the supporting pillar, the chamber 2 can be previously mounted on the supporting pillar on the basis of the same principle as described in Embodiments 1 or 2.

Figure 24:
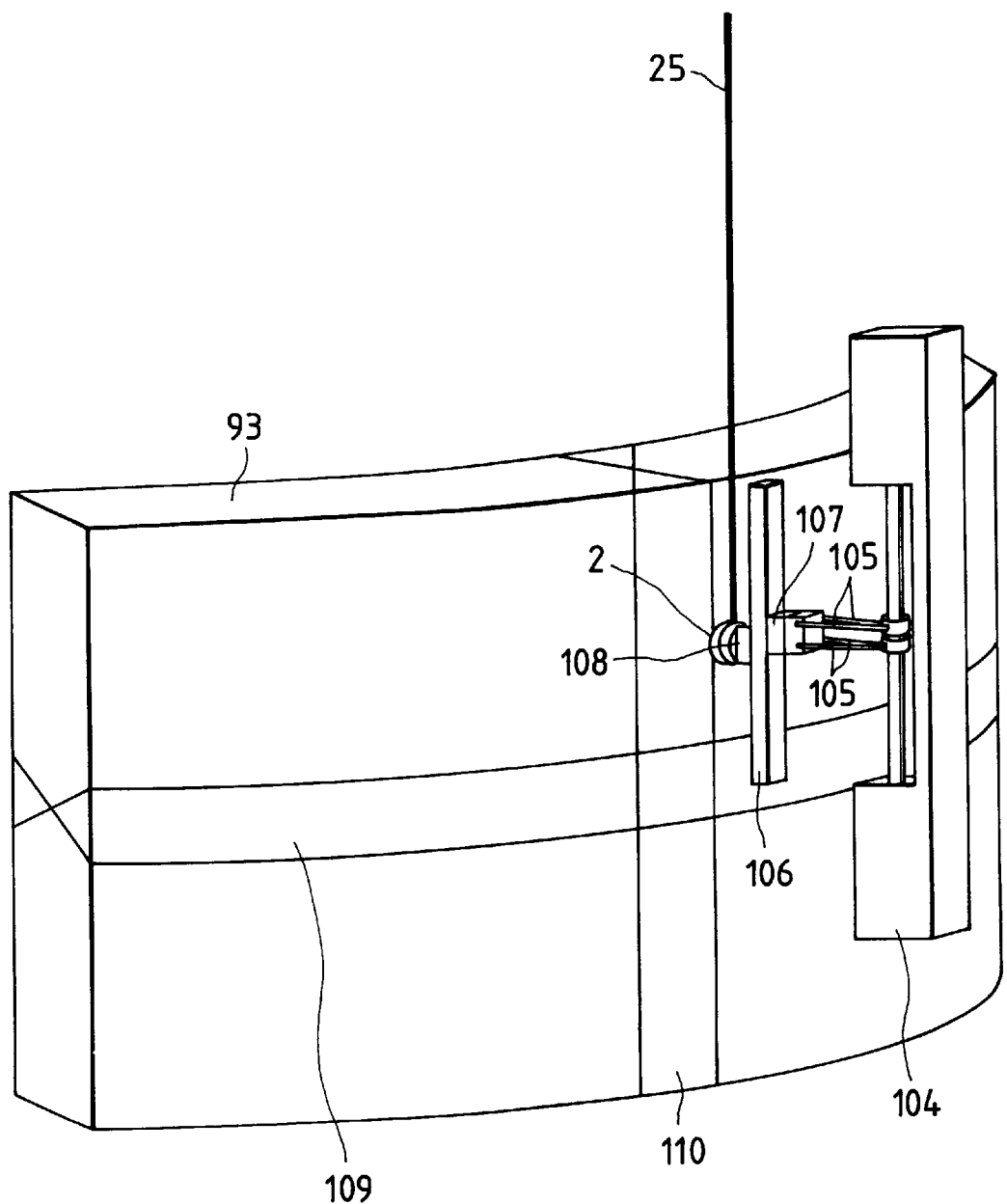
FIG. 24 is a schematic side view showing the state in which a laser beam is emitted to an axial weld portion on the outer surface of a BWR shroud.

Specifically, the chamber 2 is disposed on a target portion on the outer surface of the shroud 3 by a supporting pillar driving mechanism 103 shown in FIG. 19, and is placed in close contact with the outer surface of the shroud 93 using the secondary arm driving mechanism shown in FIG. 20. As described in Embodiment 6, it is effective to previously mount a jig 48 having a shape corresponding to that of the outer surface of the shroud 93 on the bottom of the chamber 2. FIG. 24 shows the state in which the chamber 2 is accessible to a weld heat-affected zone around an axial weld portion 110 on the outer surface of the shroud 93. The chamber 2 is accessible to the axial weld portion 110 without turning of the slide mechanism 106. After that, by the processing steps described in Embodiment 1 or 2 or in combination with the processing steps described in Embodiment 4 or 5, surface-treated portions are formed on a region containing the weld heat-affect zone near the axial weld portion 110 on the outer surface of the shroud 93 as in Embodiment 7, to thus improve the corrosion resistance or stress corrosion cracking resistance of the region.

EMBODIMENT 9

Figure 25:
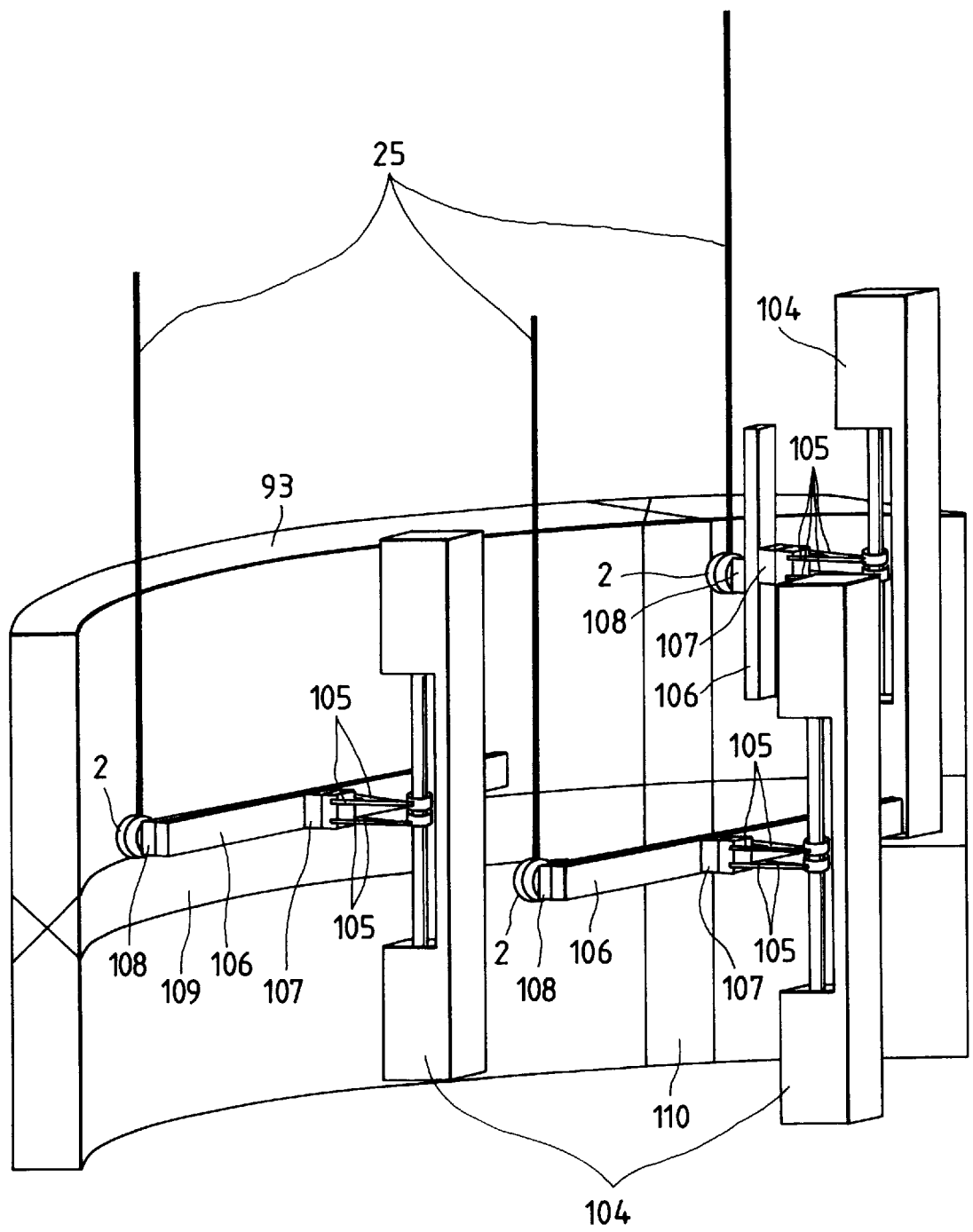
FIG. 25 is a schematic side view showing the state in which laser processing is performed on three points on the inner surface of a BWR shroud at one time.

In this embodiment, a further example of applications of the laser processing methods described in Embodiments 1 to 6 to surface treatment for a structure in a pressure vessel of a nuclear reactor, which is performed from the exterior of the pressure vessel, will be described with reference to FIGS. 19, 20, and 25. More specifically, in this embodiment, when a weld heat-affected zone near a peripheral weld portion on the inner side of a core shroud in the pressure vessel is sensitized, the sensitized portion is subjected to surface treatment by dividing a laser light oscillated from a laser oscillator into a plurality of laser beams, transmitting the divided laser beams, and simultaneously or sequentially emitting the divided laser beams onto a plurality of positions on the sensitized portion, thereby improving the corrosion resistance or stress corrosion cracking resistance of the sensitized portion.

First, as in Embodiment 7, the core portion is filled with water, and an oxide film or metallic luster portion on the surface of the target portion on the inner side of a shroud 93 is mechanically removed. After that, the laser processing system having a means for dividing a laser light into three laser beams is mounted on the target portion, as shown in FIG. 25. The laser processing system includes a laser oscillator provided in a remote control chamber; a laser dividing system; three pieces of laser incoming optics; three optical fiber elements; a chamber 2 including laser emitting optics, a laser torch driving mechanism, and various monitoring mechanisms as described in Embodiment 1 and having the functions described in Embodiments 1 to 5; three sets of the chamber driving mechanisms 100 and driving robots 101 as shown in FIG. 19; three supporting pillars 104; three secondary arms 105; transmission systems for various driving mechanisms; various control mechanisms described in Embodiment 1; and transmission systems for the control mechanisms. Here, three sets of laser torch driving mechanisms, chamber driving mechanisms as, secondary arm driving mechanisms, and the above monitoring mechanisms and control mechanisms, are independently driven or controlled.

First, three supporting pillars 104, each having a secondary arm 105, are inserted in a core portion. The secondary arm 105 has an extensible mechanism perpendicular to the supporting pillar 104. The leading end of the arm 105 can be integrated with one chamber 2 by means of an electromagnetic mechanism 108. The secondary arm 105 has a slide mechanism 106 along which the chamber 2 integrated with the arm 105 can be slid, and a turning mechanism 107 for turning the slide mechanism 106.

Three chambers 2, each having laser emitting optics, are disposed on three target portions on the inner surface of the shroud 93 using three chamber driving mechanisms. The chamber driving mechanism is integrated with the chamber 2 by means of an electromagnet mechanism. FIG. 25 shows the state in which, on the inner surface of the shroud 93, two chambers are disposed on a peripheral weld portion 109 and one chamber is disposed on an axial weld portion 110. As described in Embodiment 6, it is effective to previously mount a jig having a shape corresponding to that of a target portion on the bottom of the chamber 2.

Next, the secondary arm 105 provided on the supporting pillar 104 is extended to integrate the leading end of the arm 105 with the chamber 2 by means of the electromagnet mechanism 108. The chamber 2 is then imparted with a load by the extensible mechanism of the secondary arm 105, so as to be positioned in close contact with the surface of the shroud 93. Each load imparting mechanism provided at the leading end of each secondary arm 105 is independently driven. The load is, as described in Embodiment 1, measured by a load cell and is adjusted at a suitable value. After the chamber 2 is integrated with the leading end of the secondary arm, the chamber driving robot is separated from the chamber 2 as described in Embodiment 7, and is returned to the water surface. After that, each chamber 2 is independently moved by the slide mechanism 107 of each secondary arm 105.

Next, a series of processing steps are performed, such as discharge of water in each chamber, gas shielding, control of atmosphere, opening of a shield plate in the chamber, access of a laser torch of each chamber, and emission of a laser beam. The processing method is carried out in the same manner as described in Embodiment 7, except that the above-described driving/control mechanisms in a series of the processing steps are independent from each other and adjusted in accordance with respective processing states. The laser light oscillated from the laser oscillator is divided into three laser beams by the dividing system and the divided laser beams are each transmitted through the optical fiber elements. Namely, three portions can be simultaneously emitted by three laser beams for each oscillation of a laser light.

After completion of laser processing for forming a surface-treated region within each chamber 2, the chamber 2 is rendered movable in the manner described in Embodiment 1, and is moved to the next target portion by the slide mechanism at the leading end of the secondary arm. After movement of each chamber 2, a series of the above-described processing steps are repeated, to thus form a final surface-treated region on the inner surface of the shroud 93.

After each chamber 2 is moved up to the movement limit of the slide mechanism at the leading end of each secondary arm, the chamber 2 is returned to the original position as in Embodiment 7. The chamber driving robot 101 is then attached to the chamber 2 again to be integrated therewith, and the leading end of the secondary arm 105 is separated from the chamber 2. Thus, each chamber 2 passes through an interval between grids of the upper grid plate 92 using each chamber driving mechanism 100, to be returned to the remote control chamber 98 located outside the pressure vessel. If a component such as the optical fiber element is deteriorated, it is replaced with new one.

Next, each chamber driving robot 101 is moved again and is accessed from such a position of the upper grid plate 92 as to be desirable for the subsequent processing, to dispose each chamber on a target portion (not processed) on the inner surface of the shroud 93. For example, in the case of access to the peripheral weld portion 109, the chamber driving robot 101 must be moved to a different position of the upper grid plate 92 before the access; while in the case of access to the axial weld portion 110, the chamber driving robot 101 is accessed from the same position of the upper grid plate 92 and then adjusted in height by the chamber driving mechanism 100.

The secondary arm 105 is extended again to integrate the leading end of the arm 105 with the chamber 2 by means of the electromagnet mechanism 108, and after the chamber 2 is imparted with a load, the chamber driving robot 101 is separated from the chamber 2. After that, the above-described processing steps are repeated.

With the above-described processing steps, it becomes possible to shorten the processing time required for forming surface-treated portions on the whole weld heat-affected zone near the peripheral weld portion 109 or the axial weld portion 110 on the inner surface of the shroud 93.

EMBODIMENT 10

Figure 12:
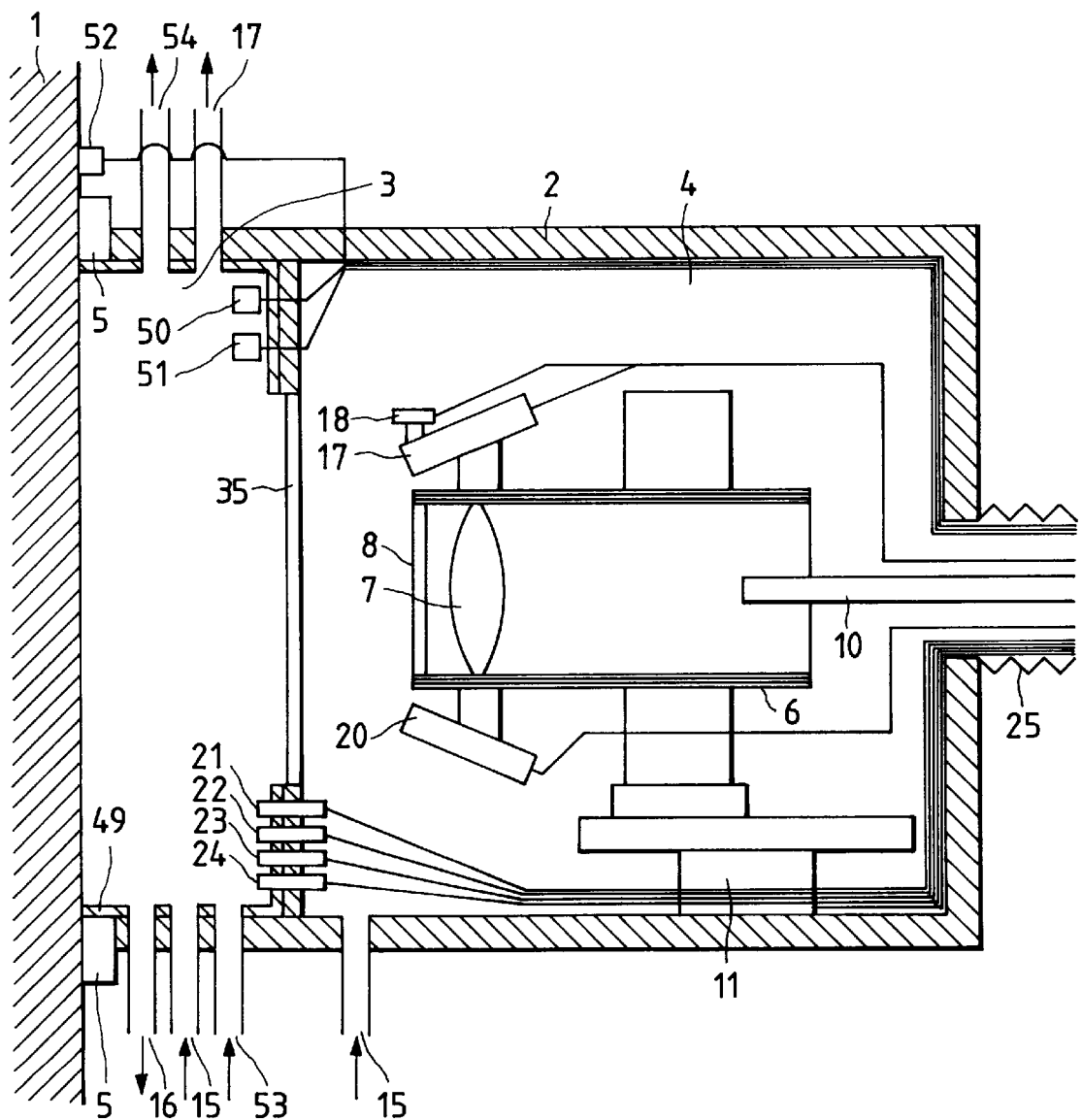
FIG. 12 is a sectional view of a laser processing system having a chamber provided with a mechanism for electro-chemically detecting the sensitization of a metal material of a structure.
Figure 17:
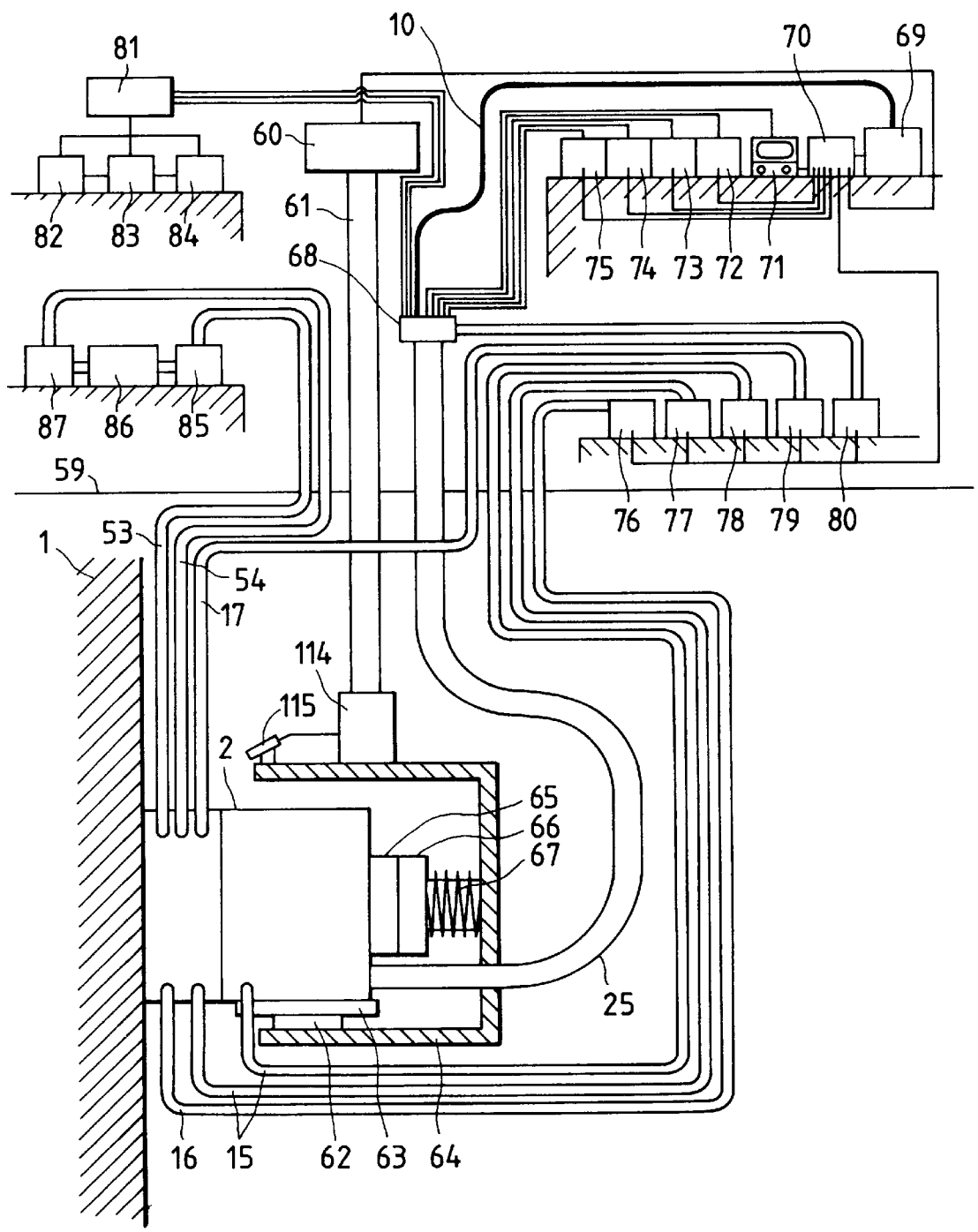
FIG. 17 is a sectional view showing the state in which a laser processing system having a chamber provided with a sensitization detecting mechanism obtains access to an underwater structure.

FIGS. 12 and 17, the surface of a structure is subjected to surface treatment by laser processing using a laser processing system including a chamber having a means for emitting a laser beam and a means for detecting the sensitization of a structure, wherein the chamber is disposed on a target portion of the structure; the sensitization of the structure is detected and a region to be processed is determined on the basis of the detected result; a laser beam is emitted to the region; and the sensitization of the region thus processed is detected again to check the quality of the structure. The laser processing system has a structure similar to that used in Embodiment 2, that is, it has a chamber divided into two compartments by means of a shield plate capable of transmitting a laser beam, wherein one compartment includes a laser torch and a laser torch driving mechanism and is usually kept in a dry atmosphere or gas atmosphere; while the other compartment to be disposed in contact with the surface of a structure includes means for detecting the sensitization of the structure in addition to the mechanisms described in Embodiment 2. In this embodiment, however, there can be used the same laser processing system as described in each of Embodiments 1 and 3 to 6, except that the chamber is additionally provided with the sensitization detecting mechanism.

FIG. 17 shows the laser processing system for surface treatment, which is moved from the water surface to an underwater structure and is operated in a horizontal posture. The laser processing system has a chamber 2 divided into compartments 4, 3 by means of a shield plate 35 capable of transmitting a laser beam, as in the embodiment shown in FIG. 12. The compartment 4, which is usually kept in an air or gas atmosphere, includes a laser torch 6 including laser emitting optics, position adjustment/driving mechanism 11 for the laser emitting optics, a shield gas injecting mechanism 15, a distance monitoring mechanism 18, a target portion monitoring mechanism 19 and a target portion illuminating mechanism 20. The other compartment 3 to be contacted with the surface of a structure under a water environment includes a water discharging mechanism 16, a gas injecting mechanism 15, a gas/dust exhausting mechanism 17, a gas flow rate monitoring mechanism 24, a pressure monitoring mechanism 23, a temperature monitoring mechanism 21, and a moisture monitoring mechanism 22. The compartment 3 further includes a means for detecting the sensitization of the surface of a structure. The sensitization detecting means includes an electrolytic solution injecting mechanism 53, an electrolytic solution discharging mechanism 54, a counter electrode 51 and a reference electrode 50. The above mechanisms 53, 54 are respectively connected to an electrolytic solution injection adjusting system 85, and an electrolytic solution discharge adjusting system 87 which are provided outside the chamber so as to be connected to each other through an electrolytic solution bath 86. A terminal 52 electrically connected to the counter electrode 51 and the reference electrode 50 is provided outside the chamber. When the chamber 2 is accessed to the surface of a structure, the terminal 52 is electrically connected to the surface of the structure. The terminal 52, counter electrode 51 and reference electrode 50 are electrically connected to a waveform generator 82, a potential regulator 83 and a current measuring device 84 through a connector 81. The inner wall of the compartment 3 to be placed in contact with the surface of a structure is coated with an insulating material 49.

First, as shown in FIG. 17, the chamber 2 is disposed so as to be mounted in close contact with the surface of a structure, as in Embodiment 1.

The water in the compartment 3 is discharged by the water discharging mechanism 16, and an electrolytic solution is injected in the compartment 3 by the electrolytic solution injecting mechanism 53. In this embodiment, a ($H_2SO_4$+ KSCN) solution is used as the electrolytic solution.

After the compartment 3 is filled with the electrolytic solution and the natural potential of the surface of the structure is stabilized, the passive potential of the structure is instantly applied to the surface of the structure by the waveform generator 82 and the potential regulator 83, and is kept for a specified time.

Next, a plurality of pulse signals different in peak potential are applied to the surface of the structure using the waveform generator 82 and the potential regulator 83. The peak potential of each pulse signal is set to be changed from the above passive potential to the natural potential of the surface of the structure. A current flowing when each pulse signal is applied is measured by the current measuring device 84.

In this embodiment, the current thus measured is converted into a current density by dividing the current by an area of the surface of the structure contacted by the electrolytic solution in the chamber, and on the basis of the maximum value of the current density measured at each potential, the sensitization of the target portion of the structure is determined. Here, the larger the maximum current density is, the higher the sensitization of the target portion is.

After measurement of the maximum current density, the electrolytic solution is discharged by the electrolytic solution discharging mechanism 54 and the gas injecting mechanism 15, to turn the interior of the compartment 3 into a gas atmosphere.

The sensitization of the target portion of the structure is detected by the above-described method, and on the basis of the detected result, it is judged whether or not the target portion should be subjected to surface treatment. In the case where the degree of the sensitization is low and the necessity of surface treatment is not recognized, the chamber 2 is moved in the same manner as described in Embodiment 2 and is mounted on the next target portion. On the other hand, in the case where the degree of the sensitization is high and the necessity of surface treatment is recognized, the laser processing is performed in the same manner as described in Embodiment 2. After completion of the surface treatment within the chamber by laser processing, the sensitization of the target portion thus processed is detected again in the same manner as described above, to confirm the quality of the target portion. At this time, when the sensitization thus detected is high, it is judged that the laser processing is undesirably performed or the region measured in terms of sensitization exceeds the surface-treated region. As a result, the laser processing is performed again, or an adjacent portion overlapping the surface-treated region is processed by moving the chamber.

With the above-described processing steps, it becomes possible to accurately determine a target region of the structure, onto emit a laser beam only to a necessary region, and to confirm the quality of the structure after laser processing. Thus, the surface-treated portions without any failure are formed on the target portion, to thereby prevent corrosion and stress corrosion cracking due to sensitization of the structure.

EMBODIMENT 11

In this embodiment, one example of applications of the laser processing method described in Embodiment 10 to surface treatment for a structure in a pressure vessel of a nuclear reactor, which is performed from the exterior of the pressure vessel, will be described with reference to FIGS. 12, and 19 to 23. More specifically, in this embodiment, a laser processing system is mounted on the inner surface of a core shroud for detecting a sensitization of the inner surface of the shroud thereby determining a target portion to be processed; a laser beam is emitted to the target portion; and the sensitization of the target portion thus processed is detected again for checking the quality of the shroud.

A pre-treatment is performed in the same manner as in Embodiments 7 to 9. First, an upper lid of a pressure vessel 91 is taken out, followed by sequential removal of a steam seasoning apparatus, a steam separator and a fuel channel, and a control rod is pulled from the lower side of the pressure vessel 91. A neutron detector is also pulled from the lower side of the pressure vessel 91, as needed. The core portion is thus filled with water. Next, a target portion on the inner surface of a shroud 93 is pre-treated, as in Embodiment 7, by mechanically removing an oxide film and a metallic luster portion on the surface of the target portion using a motor-driven sanding device.

After the above mechanical pre-treatment, the laser processing system having a sensitization detecting function is mounted on the target portion. Here, the laser processing system is of a type having a chamber divided into two compartments by a shield plate capable of transmitting a laser beam as in Embodiment 10, and the movement of the chamber into the reactor is performed using a supporting pillar and a secondary arm having an extensible mechanism as in Embodiment 7.

Referring to FIG. 19, a supporting pillar 104 including a secondary arm 105 is inserted in the core portion. Here, the thickness of the supporting pillar 104 is set at a value which will allow it to pass through an interval between grids of an upper grid plate 92. The secondary arm 105 has an extensible mechanism which is extensible in the direction perpendicular to the supporting pillar 104. The leading end of the secondary arm 105 can be integrated with the chamber 2 by an electromagnet mechanism 108. The secondary arm 105 also has a slide mechanism 106 along which the chamber 2 integrated with the secondary arm 105 can be slid, and a turning mechanism 107 for turning the slide mechanism 106.

The chamber 2 having laser emitting optics is disposed, as shown in FIG. 21, on the target portion on the inner surface of the shroud 93 using a chamber driving mechanism 100. The chamber 2 is integrated with a chamber driving robot 101 by an electromagnet mechanism. The laser processing system for surface treatment in this embodiment has, as in Embodiment 10 shown in FIG. 12, a chamber divided into two compartments 4, 3 by means of a shield plate capable of transmitting a laser beam. One compartment 4, which is usually kept in an air or gas atmosphere, includes a laser torch 6 containing the laser emitting optics, a position adjustment/driving mechanism 11 for the laser emitting optics, a shield gas injecting mechanism 15, a distance monitoring mechanism 18, a target portion monitoring mechanism 19, and a target portion illuminating mechanism 20. The other compartment 3 to be positioned in contact with the surface of a structure in a water environment includes a water discharging mechanism 16, a gas injecting mechanism 15, a gas/dust exhausting mechanism 17, a gas flow rate monitoring mechanism 24, a gas pressure monitoring mechanism 23, a temperature monitoring mechanism 21 and a moisture monitoring mechanism 22. The driving/control for these mechanisms are performed in a remote control chamber The remote control chamber contains a laser oscillator 69; each control system 70; measuring/adjusting systems 72 to 75 for measuring/adjusting the temperature, moisture, pressure and gas flow rate in the chamber; adjusting systems 76 to 80 for adjusting the water discharging mechanism, gas/dust exhausting mechanism and various gas mechanisms; a monitor 71; a connector 81 for a sensitization detecting system; a waveform generator 82; a potential regulator 83; a current measuring device 84; an electrolytic solution injection adjusting system 85, an electrolytic solution bath 86 and an electrolytic solution discharging system 87. A laser beam is generated by the laser oscillator, being transmitted to an optical fiber element through incoming optics, and is emitted from the laser emitting optics through a fiber connecting mechanism. The introduction of the supporting pillar, driving of the secondary arm, driving of the chamber, position adjustment/driving of the laser emitting optics, opening/closing of the shield plate, injection of a shield gas, monitoring of the target portion, illumination of the target portion, discharge of water, injection of a gas, exhaustion of gas/dust, monitoring of a gas flow rate, monitoring of a gas pressure, monitoring of a temperature, and monitoring of moisture are also remotely controlled by respective control mechanisms provided in the remote control chamber. As the sensitization detecting means, the compartment 3 to be contacted with the surface of a structure contains an electrolytic solution injecting mechanism 53, an electrolytic solution discharging mechanism 54, a counter electrode 51 and a reference electrode 50 (see FIG. 12). A terminal 52, which is electrically connected to the counter electrode 51 and the reference electrode 50, is provided outside the chamber 2. When the chamber is mounted on the surface of the structure, the terminal 52 is electrically connected with the surface of the structure. The injection/discharge of an electrolytic solution is also remotely controlled by a control mechanism provided in the remote control chamber. The terminal 52, counter electrode 51 and reference electrode 50 are electrically connected to the waveform generator 82, potential regulator 83 and current measuring device 84 through the connector 81. The inner wall of the compartment 3 to be mounted in contact with the surface of the structure is coated with an insulating material 49. As described in Embodiment 6, it is effective to previously mount a jig having a shape corresponding to that of the inner surface of the shroud 93 on the bottom of the chamber 2.

The secondary arm 105 provided on the supporting pillar 104 is extended to integrate the leading end of the arm 105 with the chamber 2 by means of the electromagnet mechanism 108. The chamber 2 is imparted with a load by the extensible mechanism of the secondary arm 105, to be thus positioned in close contact with the surface of the shroud 93. As described in Embodiment 1, the load is measured by a load cell and is adjusted to a suitable value. After the chamber 2 is integrated with the leading end of the arm 105, the chamber driving robot 101 is separated from the chamber by de-energizing the electromagnet mechanism, and is returned to the water surface 59. After that, the chamber 2 is moved by the slide mechanism 106 provided at the leading end of the secondary arm 105.

The water in the compartment 3 is discharged by the water discharging mechanism 16, and an electrolytic solution is injected in the compartment 3 by the electrolytic solution injecting mechanism 53. As in Embodiment 10, a ($H_2SO_4$+ KSCN) solution is used as the electrolytic solution.

After the compartment 3 is filled with the electrolytic solution and the natural potential of the surface of the shroud is stabilized, the passive potential of stainless steel is instantly applied to the surface of the shroud by the waveform generator 82 and the potential regulator 83, and is kept for a specified time.

Next, a plurality of pulse signals different in peak potential are applied to the surface of the structure using the waveform generator 82 and the potential regulator 83. The peak potential of each pulse signal is set to be changed from the above passive potential to the natural potential of the surface of the shroud. A current flowing when each pulse signal is applied is measured by the current measuring device 84.

In this embodiment, the current thus measured is converted into a current density by dividing the current by an area of the surface of the shroud contacted by the electrolytic solution in the chamber, and on the basis of the maximum value of the current density measured at each potential, the sensitization of the target portion of the shroud is determined. Here, the larger the maximum current density is, the higher the sensitization of the target portion is.

After measurement of the maximum current density, the electrolytic solution is discharged by the electrolytic solution discharging mechanism 54 and the gas injecting mechanism 15, to turn the interior of the compartment 3 contacted with the surface of the shroud into a gas atmosphere.

The sensitization of the target portion of the shroud is detected by the above-described method, and on the basis of the detected result, it is judged whether or not the target portion should be subjected to surface treatment. In the case where the degree of sensitization is low and the necessity of surface treatment is not recognized, the chamber 2 is moved in the same manner as described in Embodiment 2 to access the next target portion. On the other hand, in the case where the degree of the sensitization is high and the necessity of surface treatment is recognized, laser processing is performed in the same manner as described in Embodiment 7. Namely, a series of processing steps such as gas shielding, control of atmosphere, access of a laser torch and emission of a laser beam are performed as in Embodiment 2. As described in Embodiment 7, laser processing performed in a specified condition (emission energy density: 1.0 to 100 J/mm, cooling rate: 103 to 107° C./s, or solidified cell size: 0.1 to 3.0 $\mu$m) is effective to recover the sensitization of a target portion and improve the corrosion resistance or stress corrosion cracking resistance thereof, and to prevent the seasonal deterioration in corrosion resistance or stress corrosion cracking resistance for an operational period of a plant after laser processing. Moreover, in this embodiment, the method of gas-shielding the laser emitting optics or the method of controlling the temperature of the laser emitting optics and drying it, as described in Embodiments 4 and 5, may be additionally used for preventing inconveniences such as dew formation during laser processing.

After completion of the surface treatment within the chamber 2 by laser processing, the sensitization of the target portion thus processed is detected again in the same manner as described above, to confirm the quality of the target portion. At this time, when the sensitization thus detected is high, it is judged that the laser processing is undesirably performed or the region measured in terms of sensitization exceeds the surface-treated region. As a result, the laser processing is performed again, or an adjacent portion overlapped to the surface-treated region is processed by moving the chamber.

After a surface-treated region is formed within the chamber 2 by laser processing and the quality of the surface-treated region is confirmed, the chamber 2 is rendered movable in the same manner as described in Embodiment 2, and is then moved to the next target portion by the slide mechanism 106 at the leading end of the secondary arm 105. Thus, a series of the above-described processing steps are repeated until a final surface-treated region is formed on the inner surface of the shroud 93.

The chamber 2 may be continuously moved such that the surface-treated regions 112 are partially overlapped with respect to each other as shown in FIG. 22. However, a portion 116 where the adjacent surface-treated regions 112 are overlapped with respect to each other receives an excessive heat input, and in some cases, the residual tensile strength at the portion 116 is increased. In such a case, the surface-treated region 112 in the chamber 2 is taken as a segment, and the chamber 2 is discontinuously moved for finally forming a processed region without any gap by partially overlapping the segments. At this time, an algorithm is set such that the maximum value of the heat input of each portion 116 where the adjacent segments are overlapped, that is, the total of heat histories applied during a period from m-th processing to (m+n)-th processing, is minimized (see FIG. 23). Here, for surface treatment for sensitization due to precipitation of Cr carbides, the total of the heat histories in a temperature range of from 500 to 850° C. is minimized; while for surface treatment for embrittlement at grain boundaries due to aggregation of He at grain boundaries, the total of the heat histories in a temperature range of from 900 to 1100° C. is minimized. Moreover, in terms of residual tensile stress, an algorithm is set such that the maximum value of the generated residual stresses is minimized. By carrying out a series of processing steps on the basis of the order determined by the above-described algorithm, it becomes possible to reduce the sensitivity against deterioration in corrosion or stress corrosion cracking at the portion where the adjacent surface-treated regions are overlapped.

After the chamber 2 reaches the movement limit of the slide mechanism 106 provided at the leading end of the secondary arm 105, it is returned to the original position. When the chamber 2 is moved to the next target portion, a series of the above-described processing steps may be repeated after turning of the supporting pillar 104. However, when the processing is performed along the weld heat-affected zone 111 near the peripheral weld portion 109 of the shroud 93 by moving the chamber 2 around the inner surface of the shroud 93, there sometimes occurs a fear that the transmission tube 25 passing through an interval between grids of the upper grid plate 92 at the time of the first access will contact the upper grid plate 92 and become damaged, or there sometimes occurs a necessity of replacement of components after a long period of processing. At this time, the processing is carried out in the following manner.

First, the chamber driving robot 101 is coupled to the chamber 2 again, to be integrated therewith. The leading end of the secondary arm 105 is then separated from the chamber 2. The chamber 2 is allowed to pass through an interval between grids of the upper grid plate 92 by the chamber driving mechanism 100, and is returned to the remote control chamber 98 located outside the pressure vessel 91. When a component such as the optical fiber element is deteriorated, it is replaced with a new one.

The chamber driving robot 101 is moved again, and is accessed from such a position of the upper grid plate 92 as to be desirable for the subsequent processing, to dispose the chamber 2 on a target portion (not processed) on the inner surface of the shroud 93.

The secondary arm 105 is extended again to integrate the leading end of the arm 105 with the chamber 2 by means of the electromagnet mechanism 108, and after the chamber 2 is imparted with a load, the chamber driving robot 101 is separated from the chamber 2. Thereafter, the above-described processing steps are repeated.

With the above-described processing steps, the surface-treated portions are formed on the whole sensitized region on the inner surface of the shroud 93, to thus improve the corrosion resistance and stress corrosion cracking resistance of the region.

Even in the case of using the laser processing system having a chamber divided into two compartments by means of a shield plate having an opening/closing mechanism described in Embodiment 1, surface-treated portions can be similarly formed on the whole sensitized region on the inner surface of the shroud, to thus improve the corrosion resistance and stress corrosion cracking resistance of the region.

In the case of using the laser processing system having two independent chambers described in Embodiment 3, the chamber 36 (chamber A) to be placed in contact with the surface of a shroud is, as shown in FIG. 16, mounted on a target portion by the above-described chamber driving mechanism, and the chamber 38 (chamber B) including a laser torch and a laser torch driving mechanism is initially mounted on the leading end of the secondary arm 105 provided on the supporting pillar 104 and is made accessible to the target portion. After positioning of the chambers, by the same processing steps as described above, surface-treated portions are formed on the whole sensitized region on the inner surface of the shroud, to thus improve the corrosion resistance and stress corrosion cracking resistance of the region.

EMBODIMENT 12

In this embodiment, laser processing for a surface formed with a sprayed coating film on an underwater structure made of a stainless steel using the laser processing system described in Embodiment 1 will be described with reference to FIGS. 13 and 15. Specifically, the system is mounted on a target portion on the surface formed with a sprayed coating film, of the underwater structure made of a stainless steel, to form a surface alloying layer on the target portion, thereby improving corrosion resistance or stress corrosion cracking resistance of the target portion.

Figure 13:
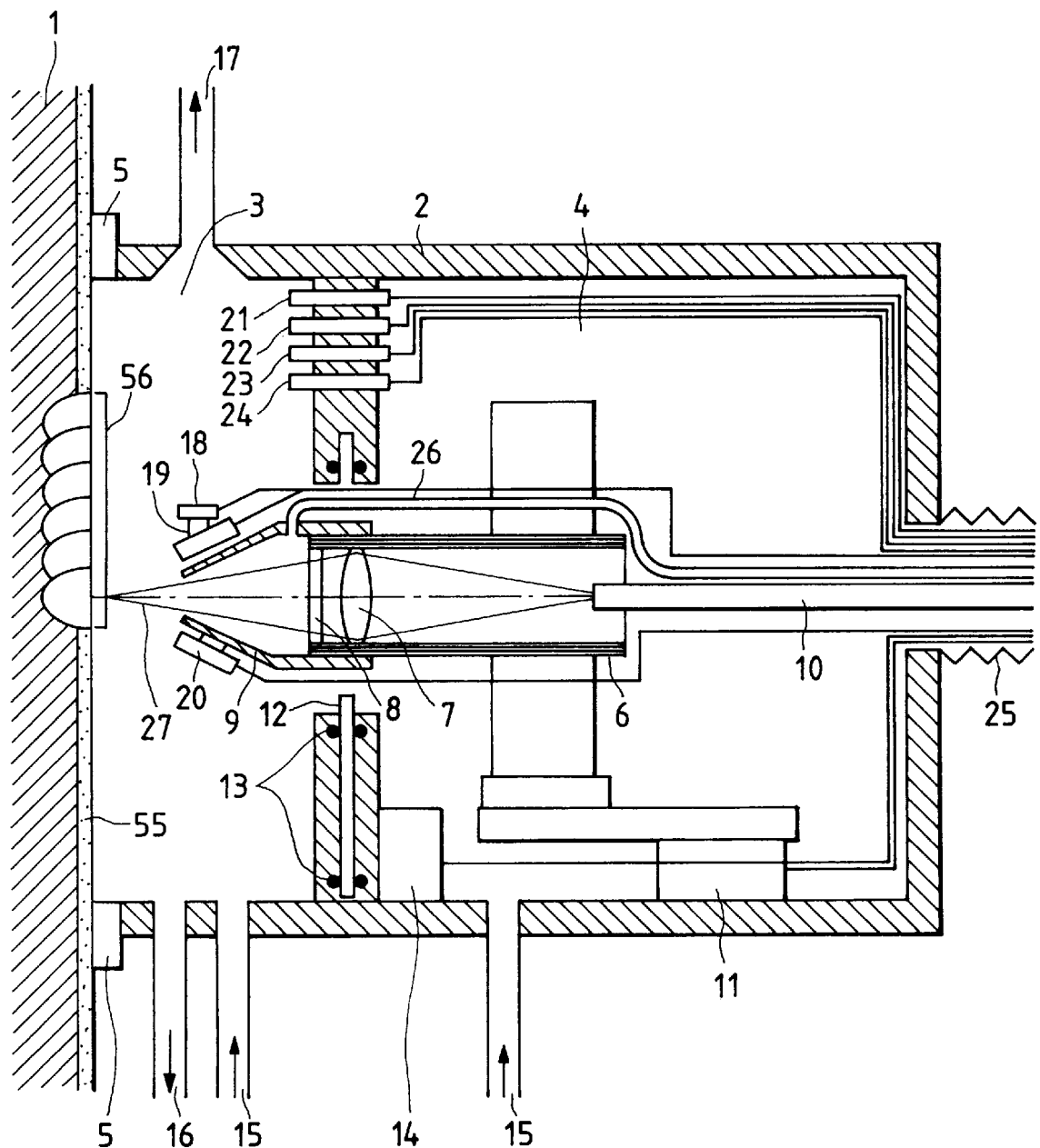
FIG. 13 is a sectional view showing the state in which a laser beam is emitted onto a sprayed coating film on the surface of an underwater structure by a laser processing system having a chamber divided into two compartments.

FIG. 13 shows the state in which the laser processing system of the present invention is moved to an underwater structure 1 made of a stainless steel (SUS304) from the water surface and is operated in a horizontal posture. A sprayed coating film 55 having a thickness of from 50 to 200 $\mu$m has been formed on the surface of the structure 1 by plasma arc spraying. The composition (wt %) of the sprayed coating film 55 is in the following range:

$0 \leq C \leq 0.02$
$0 \leq Si \leq 1.00$
$0 \leq Mn \leq 2.00$
$0 \leq P \leq 0.045$
$10.50 \leq Ni \leq 15.00$
$16.50 \leq Cr \leq 24.00$
$2.00 \leq Mo \leq 3.00$
$0 \leq N \leq 0.22$
$0 \leq Nb \leq 0.50$
$0 \leq Ti \leq 0.50$
$0 \leq Zr \leq 0.50$
$0 \leq Pt \leq 0.50$
$0 \leq Pd \leq 0.50$
Fe:bal.

The laser processing system used for surface treatment in this embodiment has a chamber 2 divided into compartments 4 and 3 by means of a shield plate 12 having an opening/closing mechanism 14, as in Embodiment 1. The compartment 4, which is usually kept in an air or gas atmosphere, includes a laser torch 6 containing laser emitting optics, a position adjustment/driving mechanism 11 for the laser emitting optics, a shield plate opening/closing mechanism 14, a shield gas injecting mechanism 15, a distance monitoring mechanism 18, a target portion monitoring mechanism 19, and a target portion illuminating mechanism 20. The compartment 3 to be positioned in contact with the surface of a structure in a water environment includes a water discharging mechanism 16, a gas/duct exhausting mechanism 17, a shield gas injecting mechanism 15, a gas flow rate monitoring mechanism 24, a pressure monitoring mechanism 23, a temperature monitoring mechanism 21, and a moisture monitoring mechanism 22.

First, as in Embodiment 1, the chamber 2 is disposed on a target portion (see FIG. 15), and the bottom portion of the chamber 2 prevents permeation of water into the chamber.

Water in the compartment 3 in contact with the surface of the structure is discharged by the water discharging mechanism 16 and the gas injecting mechanism 15, to turn the interior of the compartment 3 into a dry gas atmosphere and also to dry the surface formed with the sprayed coating film 55, of the structure. By drying the surface of the structure, water present in pores contained in the sprayed coating film 55 or present at the interface between the base material of the structure 1 and the sprayed coating film 55 will be removed.

The shield plate 12 is then opened by the shield plate driving mechanism 14, to turn the interior of the chamber 2 into one space.

The laser torch 6 is accessible to the surface of the structure. In this case, the distance between the laser torch 6 and the surface of the structure is set at a suitable value by the distance monitoring mechanism 18, and the position of the laser torch 6 is set at a suitable value by the target portion monitoring mechanism 19 and the laser torch driving mechanism 11.

A laser beam 27 is emitted onto the surface of the structure. The sprayed coating film 55 and the surface portion of the base material of the structure 1 are melted by the emission of the laser beam 27, and both solidified, to form a surface alloying layer 56 having a composition of the sprayed coating film 55 alloyed with the base material (SUS 304) of the structure. Particles of the sprayed coating film 55 or other evaporated material scattered from the target portion are removed from the target portion by a shield gas, and discharged outside the chamber by the gas/duct discharging mechanism 17.

A condition of emitting the laser beam 27 is dependent on the thicknesses of the sprayed coating film 55 and the base material, and the like. For the sprayed coating film (thickness: about 50 to 200 $\mu$m) having the above composition, an alloying layer having a thickness of from about 60 to 500 $\mu$m is formed in the condition described in Embodiment 7 (emission energy density: 1.0 to 100 J/mm, cooling rate: 103 to 107° C./s, or solidified cell size: 0.1 to 3.0 $\mu$m). An average composition (wt %) of the alloying layer 56 in a depth of about 20 $\mu$m from the surface is in the following range:

$0 \leq C \leq 0.03$
$0 \leq Si \leq 1.00$
$0 \leq Mn \leq 2.00$
$0 \leq P \leq 0.045$
$7.50 \leq Ni \leq 15.00$
$16.50 \leq Cr \leq 23.00$
$1.0 \leq Mo \leq 3.00$
$0 \leq N \leq 0.22$
$0 \leq Nb \leq 0.50$
$0 \leq Ti \leq 0.50$
$0 \leq Zr \leq 0.50$
$0 \leq Pt \leq 0.50$
$0 \leq Pd \leq 0.50$
Fe:bal.

Since water present in pores contained in the sprayed coating film 55 or at the interface between the base material of the structure 1 and the sprayed coating film 55 has been already removed, water is not entrapped in the alloying layer 56.

The laser torch 6 is moved by the laser torch driving mechanism in the same manner as described in Embodiment 1, that is, it is moved at specified pitches, to form a region of the alloying layer 56 having the above composition on the surface of the structure within the chamber. The alloying layer 56 thus formed is effective to suppress the precipitation of chromium carbides or reduction in Cr concentration at the grain boundaries due to emission of neutrons, or to suppress an increase in the concentration of dissolved oxygen near the surface of the structure in a water environment. Consequently, the alloying layer 56 has an effect of improving the corrosion resistance and stress corrosion cracking resistance of the structure.

EMBODIMENT 13

In this embodiment, laser processing for the surface formed with a sprayed coating film, of an underwater structure made of a Ni alloy using the laser processing system described in Embodiment 1 will be described with reference to FIG. 13 and 15. Specifically, the system is applied to a target portion on the surface formed with a sprayed coating film on the underwater structure made of a stainless steel, to form a surface alloying layer on the target portion, thereby improving corrosion resistance or stress corrosion cracking resistance of the target portion.

FIG. 13 shows the state in which the laser processing system of the present invention is moved to an underwater structure 1 made of a Ni alloy (NCF600) from the water surface 59 and is operated in a horizontal posture. A sprayed coating film 55 having a thickness of from 50 to 200 $\mu$m has been formed on the surface of the structure 1 by plasma arc spraying. The composition (wt %) of the sprayed coating film 55 is in the following range:

$0 \leq C \leq 0.02$
$0 \leq Si \leq 0.50$
$0 \leq Mn \leq 1.00$
$0 \leq P \leq 0.03$
$5.00 \leq Fe \leq 10.00$
$14.00 \leq Cr \leq 17.00$
$0 \leq Nb \leq 0.50$
$0 \leq Ti \leq 0.50$
$0 \leq Zr \leq 0.50$
$0 \leq Pt \leq 0.50$
$0 \leq Pd \leq 0.50$
Ni:bal.

The laser processing system used for surface treatment in this embodiment has a chamber 2 divided into compartments 4 and 3 by means of a shield plate 12 having an opening/closing mechanism 14, as in Embodiment 1. The compartment 4, which is usually kept in an air or gas atmosphere, includes a laser torch 6 containing laser emitting optics, a position adjustment/driving mechanism 11 for the laser emitting optics, a shield plate opening/closing mechanism 14, a shield gas injecting mechanism 15, a distance monitoring mechanism 18, a target portion monitoring mechanism 19, and a target portion illuminating mechanism 20. The compartment 3 to be positioned in contact with the surface of a structure in a water environment includes a water discharging mechanism 16, a gas/duct exhausting mechanism 17, a shield gas injecting mechanism 15, a gas flow rate monitoring mechanism 24, a pressure monitoring mechanism 23, a temperature monitoring mechanism 21, and a moisture monitoring mechanism 22.

First, as in Embodiment 1, the chamber 2 is disposed on a target portion (see FIG. 15), and the bottom portion of the chamber 2 is prevented from permeation of water.

Water in the compartment 3 in contact with the surface of the structure is discharged by the water discharging mechanism 16 and the gas injecting mechanism 15, to turn the interior of the compartment 3 into a dry gas atmosphere and also to dry the surface formed with the sprayed coating film 55, of the structure. By drying the surface of the structure, water present in pores contained in the sprayed coating film 55 or present at the interface between the base material of the structure 1 and the sprayed coating film 55 is removed.

The shield plate 12 is then opened by the shield plate driving mechanism 14, to turn the interior of the chamber 2 into one space.

The laser torch 6 is now accessible to the surface of the structure. In this case, the distance between the laser torch 6 and the surface of the structure is set at a suitable value by the distance monitoring mechanism 18, and the position of the laser torch 6 is set at a suitable value by the target portion monitoring mechanism 19 and the laser torch driving mechanism 11.

A laser beam 27 is emitted on the surface of the structure. The sprayed coating film 55 and the surface portion of the base material of the structure 1 are melted by the emission of the laser beam 27, and both solidified, to form a surface alloying layer 56 having a composition of the sprayed coating film 55 alloyed with the base material (NCF600) of the structure. Particles of the sprayed coating film 55 or other evaporated material scattered from the target portion are removed from the target portion by a shield gas, and discharged outside the chamber by the gas/duct discharging mechanism 17.

A condition of emitting the laser beam 27 is dependent on the thicknesses of the sprayed coating film 55 and the base material, and the like. For the sprayed coating film (thickness: about 50 to 200 $\mu$m) having the above composition, an alloying layer having a thickness of from about 60 to 500 $\mu$m is formed under the condition described in Embodiment 7 (emission energy density: 1.0 to 100 J/mm, cooling rate: $10^3$ to $10^{7°}$ C./s, or solidified cell size: 0.1 to 3.0 $\mu$m). An average composition (wt %) of the alloying layer 56 in a depth of about 20 $\mu$m from the surface is in the following range:

$0 \leq C \leq 0.03$
$0 \leq Si \leq 0.50$
$0 \leq Mn \leq 1.00$
$0 \leq P \leq 0.03$
$5.50 \leq Fe \leq 10.00$
$14.00 \leq Cr \leq 17.00$
$0 \leq Nb \leq 0.50$
$0 \leq Ti \leq 0.50$
$0 \leq Zr \leq 0.50$
$0 \leq Pt \leq 0.50$
$0 \leq Pd \leq 0.50$
Ni:bal.

Since water present in pores contained in the sprayed coating film 55 or at the interface between the base material of the structure 1 and the sprayed coating film 55 has been already removed, water is not entrapped in the alloying layer 56.

The laser torch 6 is moved by the laser torch driving mechanism in the same manner as described in Embodiment 1, that is, it is moved at specified pitches, to form a region of the alloying layer 56 having the above composition on the surface of the structure within the chamber. The alloying layer 56 thus formed is effective to suppress the precipitation of chromium carbides or reduction in Cr concentration at the grain boundaries due to emission of neutrons, or to suppress an increase in the concentration of dissolved oxygen near the surface of the structure in a water environment. Consequently, the alloying layer 56 has an effect of improving the corrosion resistance and stress corrosion cracking resistance of the structure.

EMBODIMENT 14

In this embodiment, there will be described a laser processing used for surface treatment applied to a surface of an underwater structure made of a stainless steel with reference to FIGS. 14, 18, wherein a laser processing system of the present invention is accessed to a target portion on the surface of the structure; a laser beam is emitted to the target portion in a state in which a solution containing a metal component contacts the surface of the structure for forming on the target portion a surface layer composed of the metal component or the like contained in the solution, to thereby improve the corrosion resistance or stress corrosion cracking resistance of the target portion.

Figure 18:
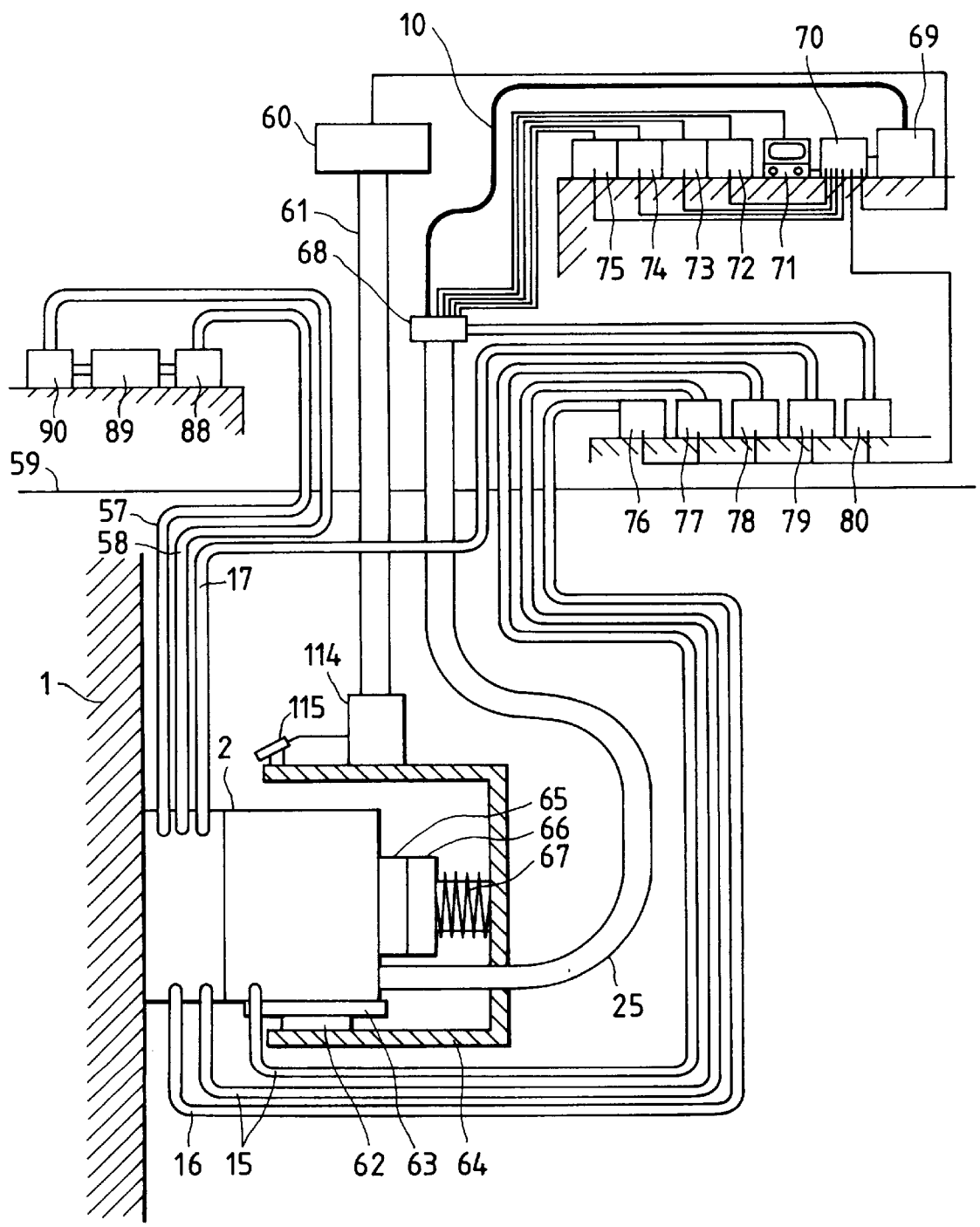
FIG. 18 is a sectional view showing the state in which a laser processing system capable of emitting a laser beam through a solution in the chamber gains access to an underwater structure.

FIG. 18 shows the state in which the processing system of the present invention is accessible to an underwater structure 1 made of SUS304 from the water surface 59 and is operated in a horizontal posture.

Figure 14:
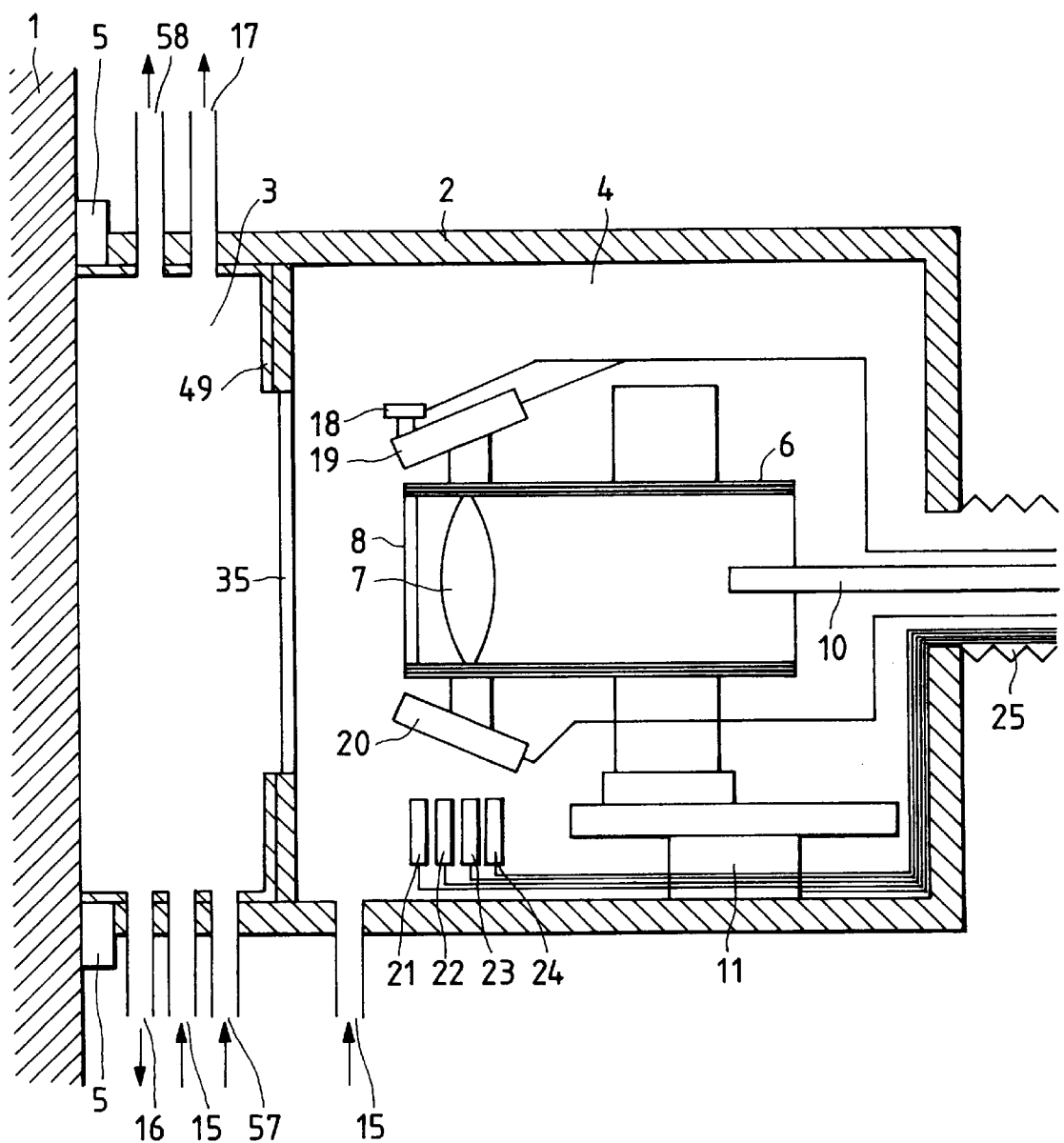
FIG. 14 is a sectional view showing the state in which laser processing is performed using a laser processing system having a chamber divided into two compartments, in which the inner surface of the compartment to be contacted with the surface of a structure is coated with an insulating material.

The laser processing system used for surface treatment in this embodiment has a chamber 2 divided into compartments 4 and 3 by means of a shield plate 12 capable of transmitting a laser beam, as shown in FIG. 14. The compartment 4, which is usually kept in an air or gas atmosphere, includes a laser torch 6 containing laser emitting optics, a position adjustment/driving mechanism 11 for the laser emitting optics, a shield gas injecting mechanism 15, a distance monitoring mechanism 18, a target portion monitoring mechanism 19, and a target portion illuminating mechanism 20, a gas flow rate monitoring mechanism 24, a pressure monitoring mechanism 23, a temperature monitoring mechanism 21, and a moisture monitoring mechanism 22. The compartment 3 to be placed in contact with the surface of a structure in a water environment includes a water discharging mechanism 16, a gas/duct exhausting mechanism 17, a shield gas injecting mechanism 15, a solution injecting mechanism 57 and a solution discharging mechanism 58. Moreover, as in Embodiment 2, on the water surface, there are provided a chamber driving robot 61; a chamber driving mechanism 60; a position monitoring mechanism 114, a vertical position adjusting mechanism 115 and a horizontal position adjusting mechanism 62 provided on the chamber driving mechanism 60; a laser oscillator 69; various control systems 70; measuring/adjusting systems 72 to 75 for measuring/adjusting the gas flow rate, pressure, temperature and moisture in the chamber; a water discharging mechanism; a gas/dust discharging mechanism; adjusting systems 76 to 80 for various gas mechanisms; a solution injection adjusting system 88; a solution bath 89; and a solution discharge adjusting mechanism 90. First, as in Embodiment 2, the chamber is disposed so as to be in contact with the surface of the structure (see FIG. 15).

Next, water in the compartment 3 in contact with the surface of the structure is discharged by the water discharging mechanism 16, and a solution is injected into the compartment 3 by the solution injecting mechanism 57. The solution thus injected is a water solution containing ions of Cr or Pd.

After the compartment 3 in contact with the surface of the structure is filled with the above water solution, the laser torch 6 is directed to the surface of the structure for emitting a laser beam thereto. In this embodiment, the surface of the structure is not required to be heated to a temperature of a melting point or more.

The surface of the structure receiving a laser beam has its passive film destroyed so as to be activated. At this time, ions of Cr or Pd in the water solution are precipitated, so that a film containing Cr or Pd is formed on the surface of the structure.

The laser torch 6 is moved by the laser torch driving mechanism 11 in the same manner as described in Embodiment 2, that is, it is moved at specified pitches, to form a region of the above coating film layer on the surface of the structure within the chamber. The film thus formed becomes a stable passive film, which is stable even when Cr carbides are precipitated or the concentration of Cr at grain boundaries is reduced due to neutron emission. The film is also effective to suppress an increase in the concentration of dissolved oxygen near the surface of the structure in a water environment. Consequently, the coating film has an effect of improving the corrosion resistance or stress corrosion cracking resistance of the structure.

EMBODIMENT 15

In this embodiment, one example of the applications of the processing method described in Embodiment 14 to surface treatment for a core shroud in a pressure vessel of a nuclear reactor, which is performed by remote control outside the pressure vessel, will be described with reference to FIGS. 14, and 18 to 21

First, a pre-treatment is performed in the same manner as in Embodiments 7 to 9, and 11. First, an upper lid of a pressure vessel is taken out, followed by sequential removal of a steam seasoning apparatus, a steam separator and a fuel channel, and a control rod is pulled from the lower side of the pressure vessel. A neutron detector is also pulled from the lower side of the pressure vessel 91, as needed. The core portion is thus filled with water. Next, a target portion on the inner surface of a shroud is pre-treated, as in Embodiment 7, by mechanically removing an oxide film and a metallic luster portion on the surface of the target portion using a motor-driven sanding device.

After the above mechanical pre-treatment, the chamber having the solution injecting mechanism and solution discharging mechanism described in Embodiment 14 is moved to the target portion. The access of the chamber into the reactor is performed using a supporting pillar and a secondary arm having an extensible mechanism as in Embodiment 7.

Referring to FIG. 19, a supporting pillar 104 including a secondary arm 105 is inserted in the core portion. Here, the thickness of the supporting pillar 104 is set at a value which will allow it to pass through an interval between grids of an upper grid plate 92. As shown in FIG. 20, the secondary arm 105 has a mechanism which is extensible in the direction perpendicular to the supporting pillar 104. The leading end of the secondary arm 105 can be integrated with the chamber 2 by an electromagnet mechanism 108. The secondary arm 105 also has a slide mechanism 106 along which the chamber 2 integrated with the secondary arm 105 can be slid, and a turning mechanism 107 for turning the slide mechanism 106.

The chamber 2 having laser emitting optics is disposed on the target portion on the inner surface of the shroud by a chamber driving mechanism 100. The chamber 2 is integrated with a chamber driving robot 101 by an electromagnet mechanism. The laser processing system for surface treatment in this embodiment has, as in Embodiment 14 shown in FIG. 14, a chamber divided into two compartments 4, 3 by means of a shield plate 35 capable of transmitting a laser beam. One compartment 4, which is usually kept in an air or gas atmosphere, includes a laser torch 6 containing the laser emitting optics, a position adjustment/driving mechanism 11 for the laser emitting optics, a shield gas injecting mechanism 15, a distance monitoring mechanism 18, a target portion monitoring mechanism 19, and a target portion illuminating mechanism 20. The other compartment 3 to be placed in contact with the surface of a structure in a water environment includes a water discharging mechanism 16, a gas injecting mechanism 15, a gas/dust exhausting mechanism 17, a gas flow rate monitoring mechanism 24, a gas pressure monitoring mechanism 23, a temperature monitoring mechanism 21 and a moisture monitoring mechanism 22. The driving/control for these mechanisms is performed in a remote control chamber 98 shown in FIG. 19. The remote control chamber 98 contains a laser oscillator 69; each control system 70; measuring/adjusting systems 72 to 75 for measuring/adjusting the temperature, moisture, pressure and gas flow rate in the chamber; adjusting systems 76 to 80 for adjusting the water discharging mechanism, gas/dust exhausting mechanism and various gas mechanisms; a monitor 71; a solution injection adjusting system 85, a solution bath 86 and a solution discharging system 87. A laser beam is generated by the laser oscillator, being transmitted to an optical fiber element through incoming optics, and is emitted from the laser emitting optics through a fiber connecting mechanism. The introduction of the supporting pillar, driving of the secondary arm, driving of the chamber, position adjustment /driving of the laser emitting optics, opening/closing of the shield plate, injection of a shield gas, monitoring of the target portion, illumination of the target portion, discharge of water, injection of a gas, exhaustion of gas/dust, monitoring of a gas flow rate, monitoring of a gas pressure, monitoring of a temperature, and monitoring of moisture are also remotely controlled by respective control mechanisms provided in the remote control chamber. Also, as shown in FIG. 12, the compartment 3 contains an solution injecting mechanism 57, and a solution discharging mechanism 58. The injection/discharge of solution is remotely controlled by a control mechanism provided in the above remote control chamber 98.

The secondary arm 105 provided on the supporting pillar 104 is extended to integrate the leading end of the arm 105 with the chamber 2 by means of the electromagnet mechanism 108. The chamber 2 is imparted with a load by the extensible mechanism of the secondary arm 105, to be thus placed in close contact with the surface of the shroud 93. As described in Embodiment 1, the load is measured by a load cell and is adjusted at a suitable value. After the chamber 2 is integrated with the leading end of the arm 105, the chamber driving robot 101 is separated from the chamber by de-energizing the electromagnet mechanism, and is returned to the water surface 59. After that, the chamber 2 is moved by the slide mechanism 106 provided at the leading end of the secondary arm 105.

Next, water in the compartment 3 in contact with the surface of the shroud is discharged by the water discharging mechanism 16, and a solution is injected into the compartment 3 by the solution injecting mechanism 57. The solution thus injected is a water solution containing ions of Cr or Pd.

After the compartment 3 in contact with the surface of the shroud is filled with the above water solution, the laser processing is performed. The laser beam passes through the shield glass 35 and the solution and is emitted on the surface of the shroud. In this embodiment, the surface of the shroud is not required to be heated to a temperature of a melting point or more.

The surface of the structure receiving a laser beam has its passive film destroyed, so as to be activated. At this time, ions of Cr or Pd in the water solution are precipitated, so that a film containing Cr or Pd is formed on the surface of the structure. The laser torch 6 is moved by the laser torch driving mechanism 11 in the same manner as described in Embodiment 14, that is, it is moved at specified pitches, to form a region of the above coating film layer on the surface of the structure within the chamber. The film thus formed becomes a stable passive film, which is stable even when Cr carbides are precipitated or the concentration of Cr at grain boundaries is reduced due to neutron emission. The film is also effective to suppress an increase in the concentration of dissolved oxygen near the surface of the structure in a water environment. Consequently, the coating film has an effect of improving the corrosion resistance or stress corrosion cracking resistance of the structure.

After a surface-treated region is formed within the chamber 2 by laser processing and the quality of the surface-treated region is confirmed, the solution is discharged into the solution bath 89 outside the chamber 2 by the solution discharging mechanism 58, and the compartment 3 in contact with the surface of the shroud is turned into a gas atmosphere by the gas injecting mechanism. After that, the chamber 2 is rendered movable in the same manner as described in Embodiment 2, and is then moved to the next target portion by the slide mechanism 106 at the leading end of the secondary arm 105. Thus, a series of the above-described processing steps are repeated until a final surface-treated region is formed on the inner surface of the shroud 93. Moreover, as shown in FIG. 22, the chamber is continuously moved such that the surface-treated regions are partially overlapped with respect to each other, and then a series of the processing steps are performed.

After the chamber 2 reaches the movement limit of the slide mechanism 106 provided at the leading end of the secondary arm 105, it is returned to the original position. When the chamber 2 is moved to the next target portion, a series of the above-described processing steps may be repeated after turning of the supporting pillar 104. However, when the processing is performed along the weld heat-affected zone 111 near the peripheral weld portion 109 of the shroud 93 by moving the chamber 2 around the inner surface of the shroud 93, there sometimes occurs a fear that the transmission tube 25 passing through an interval between grids of the upper grid plate 92 at the time of the first access will contact the upper grid plate 92 and be damaged, or there sometimes occurs a necessity of replacement of components after a long period of processing. At this time, the processing is carried out in the following manner.

First, the chamber driving robot 101 is coupled to the chamber 2 again, to be integrated therewith. The leading end of the secondary arm 105 is then separated from the chamber 2. The chamber 2 is allowed to pass through an interval between grids of the upper grid plate 92 by the chamber driving mechanism 100, and is returned to the remote control chamber 98 located outside the pressure vessel 91. When a component such as the optical fiber element is deteriorated, it is replaced with a new one.

The chamber driving robot 101 is moved again, and is accessed from such a position of the upper grid plate 92 as is desirable for the subsequent processing, to dispose the chamber 2 on a target portion (not processed) on the inner surface of the shroud 93.

The secondary arm 105 is extended again to integrate the leading end of the arm 105 with the chamber 2 by means of the electromagnet mechanism 108, and after the chamber 2 is imparted with a load, the chamber driving robot 101 is separated from the chamber 2. Thereafter, the above-described processing steps are repeated.

With the above-described processing steps, the surface-treated portions are formed on the whole sensitized region on the inner surface of the shroud 93, to thus improve the corrosion resistance and stress corrosion cracking resistance of the region.

In the case of using the laser processing system having two independent chambers as described in Embodiment 3, the chamber 36 (chamber A) to be mounted in contact with the surface of a shroud is, as shown in FIG. 16, moved to a target portion by the above-described chamber driving mechanism, and the chamber 38 (chamber B) including a laser torch and a laser torch driving mechanism mounted on the leading end of the secondary arm 105 provided on the supporting pillar 104 is moved to the target portion. After access of the chambers, by the same processing steps as described above, surface-treated portions are formed on the whole sensitized region on the inner surface of the shroud, to thus improve the corrosion resistance and stress corrosion cracking resistance of the region.

Although the present invention has been described hereinabove with reference to the preferred embodiments thereof, it is to be understood that the invention is not limited to such embodiments alone, and a variety of other modifications and variations will be apparent to those skilled in the art without departing from the spirit and the invention.

The scope of the invention, therefore, is to be determined solely by the appended claims.

What is claimed is:

1. An underwater laser processing system comprising:
    a laser torch including a condenser lens;
    a laser torch driving mechanism for changing an emission position of said laser torch; and
    a laser torch containing chamber for containing said laser torch and said laser torch driving mechanism;
    wherein said chamber for containing said laser torch has, at a portion for emitting laser light, a water-tight partitioning plate movable for allowing said laser torch to come in or go out of said chamber for containing said laser torch;
    a processing chamber provided at a portion for emitting laser light and processing a structure to be processed in such a manner as to be in contact with said structure to be processed in order not to allow water to flow in said processing chamber; and
    said processing chamber is provided integrally with, or independently from, said chamber for containing said laser torch, and is provided with an inert gas injection mechanism, an inert gas exhausting mechanism, and a water discharging mechanism.

2. An underwater laser processing system according to claim 1, wherein said partitioning plate is mounted so as to be moveable, and further including an opening/closing mechanism for moving said partitioning wall to open said chamber.

3. An underwater laser processing system according to claim 2, further including a laser torch driving mechanism for advancing said laser torch toward a surface of a structure to be processed.

4. An underwater laser processing system according to claim 1, wherein part of said partitioning plate is made of a material capable of transmitting a laser beam.

5. An underwater laser processing system according to claim 1, wherein said chamber includes a compartment having a mechanism for preventing permeation of water at said open end of said chamber when said chamber contacts the surface of an underwater structure, and a mechanism for expelling water from a space bounded by said open end, an outer wall of said chamber connected to said open end and said partitioning plate by introducing gas into a space.

6. An underwater laser processing system according to claim 5, wherein said mechanism provided at said open end of said chamber for preventing permeation of water comprises at least one of a skirt mechanism formed of an elastic body having a predetermined flexibility so as to be deformable in accordance with a shape of an underwater structure to be processed, a curtain mechanism for jetting a high pressure shield gas, and a curtain mechanism for jetting high pressure water.

7. An underwater laser processing system according to claim 5, wherein the inner surface of the chamber, which has said mechanism for preventing permeation of water at a portion to be contacted with the surface of an underwater structure and said mechanism for substituting water for gas, has an insulating property.

8. An under waterlaser processing system according to any of claims 1 to 5, wherein at least one of said chambers includes at least one of a water discharging mechanism, a gas injecting mechanism, a gas exhausting mechanism, a dust exhausting mechanism, a gas flow rate monitoring mechanism, a pressure monitoring mechanism, a temperature monitoring mechanism, and a moisture monitoring mechanism.

9. An underwater laser processing system according to any of claims 1 to 5, wherein at least one of said chambers includes at least one of a gas injecting mechanism for drying the interior of said chamber, a side gas shield mechanism for removing evaporated material and fine particles generated from the surface of a target structure upon processing, and a gas injecting mechanism for drying said laser torch.

10. An underwater laser processing system according to any of claims 1 to 5, further including a mechanism for holding laser emitting optics at a temperature in the range of ±30° C. on the basis of a temperature of water around said system.

11. An underwater laser processing system according to any of claims 1 to 5, further including a transmission tube for shielding an optical fiber element from water in the range up to a water surface, said optical fiber element being adapted to transmit a laser beam to a main body of said system through the water environment.

12. An underwater laser processing system according to any of claims 1 to 5, wherein said system is used for underwater processing for emitting a laser beam to an underwater structure.

13. An underwater laser processing system according to any of claims 1 to 5, wherein said system is used for surface treatment, said surface treatment comprising the step of forming an alloying layer on the surface of an underwater structure made of a stainless steel, said alloying layer having the following average composition (wt %) in the region of a depth of 20 µm from the surface:

$0 \leq C \leq 0.02$ $0 \leq Si \leq 1$ $0 \leq Mn \leq 2$ $0 \leq P \leq 0.045$ $10.50 \leq Ni \leq 15$ $16.5 \leq Cr \leq 24$ $2 \leq Mo \leq 3$ $0 \leq N \leq 0.22$ $0 \leq Nb \leq 0.5$ $0 \leq Ti \leq 0.5$ $0 \leq Zr \leq 0.5$ $0 \leq Pt \leq 0.5$ $0 \leq Pd \leq 0.5$ Fe, and inevitable impurities: balance.

14. An underwater laser processing system according to any of claims 1 to 5, wherein said system is used for surface treatment, said surface treatment comprising the step of forming an alloying layer on the surface of an underwater structure made of a Ni alloy, said an alloying layer having the following average composition (wt %) in the region of a depth of 20 μm from the surface:

$0 \leq C \leq 0.03$ $0 \leq Si \leq 0.5$ $0 \leq Mn \leq 1$ $0 \leq P \leq 0.03$ $5.5 \leq Fe \leq 10$ $14 \leq Cr \leq 17$ $0 \leq Nb \leq 0.5$ $0 \leq Ti \leq 0.5$ $0 \leq Zr \leq 0.5$ $0 \leq Pt \leq 0.5$ $0 \leq Pd \leq 0.5$ Ni and inevitable impurities: balance.

15. An underwater laser processing system comprising:

a laser torch;

a laser torch driving mechanism for changing a laser emission position of said laser torch;

a chamber with one end opened to an external environment, which chamber contains said laser torch;

a partitioning wall for preventing permeation of water to said laser torch being provided between a free end of said chamber and said laser torch, said partitioning wall including an opening/closing mechanism;

a laser torch driving mechanism provided for advancing said laser torch to a surface of a structure to be processed; and wherein an inner surface of said chamber has a mechanism for preventing permeation of water at a portion to be contacted with a surface of an underwater structure, a mechanism for substituting water for gas, and has an insulating property.

16. An underwater laser processing system according to claim 15, wherein:

said laser torch including a condenser lens;

said chamber for containing said laser torch and said laser torch driving mechanism;

said chamber for containing said laser torch has, at a portion for emitting laser light, said partitioning wall movable for allowing said laser torch to come in or go out of said chamber for containing said laser torch, or a fixed laser light transmission shielding plate;

a processing chamber provided at a portion for emitting laser light and processing a structure to be processed in such a manner as to be in contact with said structure to be processed in order not to allow water to flow in said processing portion; and said processing chamber is provided integrally with, or independently from, said chamber for containing said laser torch, and is provided with an inert gas injection mechanism, an inert gas exhausting mechanism, and a water discharging mechanism.

* * * * *